(12) United States Patent
Francis et al.

(10) Patent No.: US 11,067,469 B1
(45) Date of Patent: Jul. 20, 2021

(54) REUSABLE PIPE INTEGRITY TEST HEAD SYSTEMS AND METHODS

(71) Applicant: Trinity Bay Equipment Holdings, LLC, Houston, TX (US)

(72) Inventors: Kirk Spencer Francis, Richmond, TX (US); David Michael Gregory, Houston, TX (US); Jonathan Guerrero, Houston, TX (US); Alexander Lee Winn, Houston, TX (US)

(73) Assignee: Trinity Bay Equipment Holdings, LLC, Houston, TX (US)

( * ) Notice: Subject to any disclaimer, the term of this patent is extended or adjusted under 35 U.S.C. 154(b) by 0 days.

(21) Appl. No.: 16/930,999

(22) Filed: Jul. 16, 2020

Related U.S. Application Data

(63) Continuation of application No. 16/748,538, filed on Jan. 21, 2020, now Pat. No. 10,739,225.

(51) Int. Cl.
*G01M 3/28* (2006.01)
*F16L 55/134* (2006.01)

(52) U.S. Cl.
CPC ......... *G01M 3/2807* (2013.01); *F16L 55/134* (2013.01)

(58) Field of Classification Search
CPC .................................................. F16L 55/175
See application file for complete search history.

(56) References Cited

U.S. PATENT DOCUMENTS

| 3,858,613 | A | * | 1/1975 | Musslewhite | E21B 17/006 138/96 T |
| 4,086,806 | A | | 5/1978 | Covey et al. | |
| 4,173,988 | A | * | 11/1979 | Fowler | F16L 57/005 138/96 T |
| 4,250,926 | A | | 2/1981 | Satterthwaite et al. | |
| 2006/0086400 | A1 | | 4/2006 | Beebe et al. | |
| 2018/0231168 | A1 | | 8/2018 | Barnes | |

* cited by examiner

*Primary Examiner* — Paul M. West
*Assistant Examiner* — Mark A Shabman
(74) *Attorney, Agent, or Firm* — Conrad J Hsu

(57) ABSTRACT

Techniques for implementing and operating a system that includes a pipe segment, which has tubing that defines a bore and a fluid conduit implemented in an annulus of the tubing, and a test head. The test head includes a shell, which defines an annulus cavity, and an inflatable bladder implemented in the annulus cavity, in which the system maintains the inflatable securing bladder in a less inflated state while pipe segment tubing is not present in the annulus cavity and increases inflation of the inflatable bladder to a more inflated state when the tubing is present in the annulus cavity to facilitate securing and sealing an open end of the pipe segment in the test head to enable integrity of the tubing to be tested at least in part by flowing a test fluid into the annulus of the tubing via a testing port on the shell.

14 Claims, 15 Drawing Sheets

REUSABLE PIPE INTEGRITY TEST HEAD SYSTEMS AND METHODS

CROSS-REFERENCE

The present disclosure is a continuation of U.S. patent application Ser. No. 16/748,538, entitled "REUSABLE PIPE INTEGRITY TEST HEAD SYSTEMS AND METHODS" and filed on Jan. 21, 2020, which is incorporated by reference in its entirety for all purposes.

BACKGROUND

The present disclosure generally relates to pipeline systems and, more particularly, to a test head, which may be coupled to a pipe segment deployed in or to be deployed in a pipeline system, to facilitate testing pipe segment integrity.

Pipeline systems are often implemented and/or operated to facilitate transporting (e.g., conveying) fluid, such as liquid and/or gas, from a fluid source to a fluid destination. For example, a pipeline system may be used to transport one or more hydrocarbons, such as crude oil, petroleum, natural gas, or any combination thereof. Additionally or alternatively, a pipeline system may be used to transport one or more other types of fluid, such as produced water, fresh water, fracturing fluid, flowback fluid, carbon dioxide, or any combination thereof.

To facilitate transporting fluid, a pipeline system may include one or more pipe segments, for example, in addition to one or more pipe (e.g., midline and/or end) fittings (e.g., connectors) used to couple a pipe segment to another pipe segment, to a fluid source, and/or to a fluid destination. Generally, a pipe segment includes tubing, which defines (e.g., encloses) a bore that provides a primary fluid conveyance (e.g., flow) path through the pipe segment. More specifically, the tubing of a pipe segment may be implemented to facilitate isolating (e.g., insulating) fluid being conveyed within its bore from environmental conditions external to the pipe segment, for example, to reduce the likelihood of the conveyed (e.g., bore) fluid being lost to the external environmental conditions and/or the external environmental conditions contaminating the conveyed fluid.

However, at least in some instances, the presence of one or more defects, such as a breach, a kink, and/or a dent, on pipe segment tubing may affect (e.g., reduce and/or compromise) its integrity and, thus, its ability to provide isolation (e.g., insulation). In other words, at least in some instances, operating a pipeline system while a pipe segment deployed therein has an integrity compromising defect may affect (e.g., reduce) operational efficiency and/or operational reliability of the pipeline system, for example, due to the defect resulting in conveyed fluid being lost and/or contaminated by external environmental conditions. As such, to facilitate improving pipeline system operational efficiency and/or operational reliability, the integrity of one or more pipe segments deployed in or to be deployed in a pipeline system may be tested, for example, before beginning and/or resuming normal operation of the pipeline system.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one embodiment, a system includes a pipe segment and a test head. The pipe segment includes tubing that defines a bore and a fluid conduit implemented in an annulus of the tubing. The test head includes a shell that defines an annulus cavity, in which the shell includes a testing port that enables fluid flow into the annulus cavity. Additionally, the test head includes an inflatable bladder implemented in the annulus cavity, in which the system maintains the inflatable securing bladder in a less inflated state while pipe segment tubing is not present in the annulus cavity of the test head and increases inflation of the inflatable bladder from the less inflated state to a more inflated state when the tubing of the pipe segment is present in the annulus cavity to facilitate securing and sealing an open end of the pipe segment in the test head to enable integrity of the tubing to be tested at least in part by flowing a test fluid into the fluid conduit implemented in the annulus of the tubing via the testing port on the shell of the test head.

In another embodiment, a method of deploying a test head includes maintaining an inflatable fastener mechanism implemented in an annulus cavity of the test head in a less inflated state, in which the inflatable fastener mechanism includes an inflatable bladder implemented on a surface of a shell of the test head and the shell of the test head includes a testing port fluidly coupled to the annulus cavity and an inflation port fluidly coupled to the inflatable bladder of the inflatable fastener mechanism. Additionally, the method includes inserting pipe segment tubing into the annulus cavity of the test head while the inflatable fastener mechanism is in the less inflated state, in which the pipe segment tubing includes a fluid conduit implemented in an annulus of the pipe segment tubing. Furthermore, the method includes securing the pipe segment tubing in the annulus cavity of the test head at least in part by increasing inflation of the inflatable fastener mechanism from the less inflated state to a more inflated state while the pipe segment tubing is in the annulus cavity to enable integrity of the pipe segment tubing to be tested based at least in part on a fluid parameter change resulting from supply of a test fluid to the fluid conduit in the pipe segment tubing via the testing port.

In another embodiment, a reusable test head includes a shell that defines an annulus cavity to be used to interface with tubing of a pipe segment, in which the shell includes a testing port that enables fluid flow through the shell. Additionally, the reusable test head includes an inflatable fastener mechanism directly adjacent the annulus cavity, in which the inflatable fastener mechanism contracts inwardly as the inflatable fastener mechanism is transitioned from a more inflated state to a less inflated state and expands outwardly into the annulus cavity as the inflatable fastener mechanism is transitioned from the less inflated state to the more inflated state to facilitate testing integrity of the pipe segment at least in part by securing and sealing an open end of the tubing in the annulus cavity to enable fluid flow between the testing port on the shell and a fluid conduit implemented within the tubing of the pipe segment.

DETAILED DESCRIPTION

Figure 1:
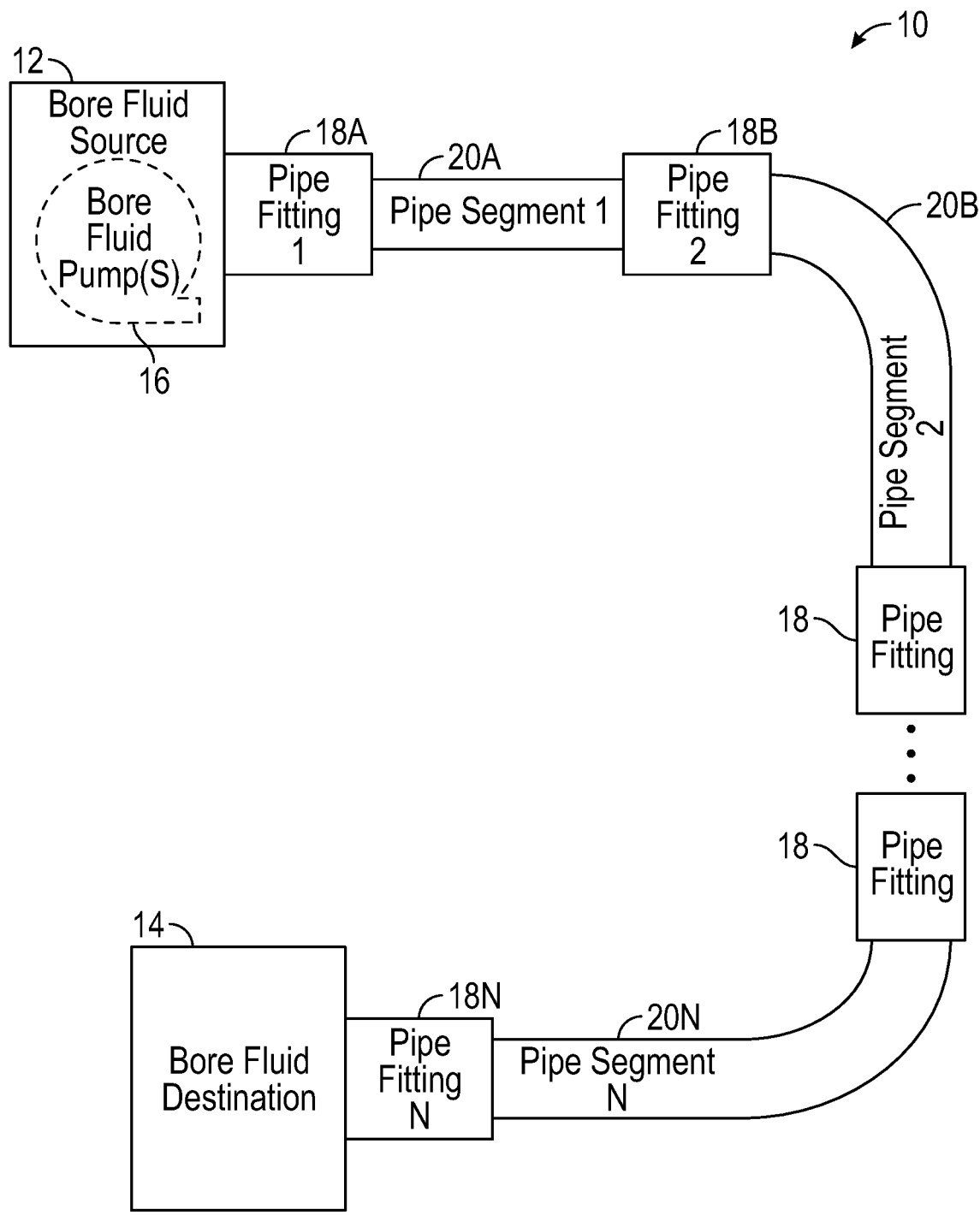
FIG. 1 is a block diagram of an example of a pipeline system including pipe segments and pipe fittings (e.g., connectors), in accordance with an embodiment of the present disclosure.

One or more specific embodiments of the present disclosure will be described below with reference to the figures. As used herein, the term "coupled" or "coupled to" may indicate establishing either a direct or indirect connection and, thus, is not limited to either unless expressly referenced as such. The term "set" may refer to one or more items. Wherever possible, like or identical reference numerals are used in the figures to identify common or the same features. The figures are not necessarily to scale. In particular, certain features and/or certain views of the figures may be shown exaggerated in scale for purposes of clarification.

The present disclosure generally relates to pipeline systems that may be implemented and/or operated to transport (e.g., convey) fluid, such as liquid and/or gas, from a fluid source to a fluid destination. Generally, a pipeline system may include pipe fittings (e.g., connectors), such as a midline pipe fitting and/or a pipe end fitting, and one or more pipe segments. Merely as an illustrative non-limiting example, a pipeline system may include a first pipe end fitting that couples a first pipe segment to a fluid source, a midline pipe fitting that couples the first pipe segment to a second pipe segment, and a second pipe end fitting that couples the second pipe segment to a fluid destination.

In any case, a pipe segment generally includes tubing (e.g., a housing), which defines (e.g., encloses) a bore that provides a primary fluid conveyance (e.g., flow) path through the pipe segment. More specifically, the tubing of a pipe segment may be implemented to facilitate isolating environmental conditions external to the pipe segment from conditions within its bore and, thus, fluid that flows therethrough. In particular, the tubing of a pipe segment may primarily be implemented to block fluid flow directly between the bore of the pipe segment and its external environmental conditions, for example, in addition to providing thermal, pressure, and/or electrical isolation (e.g., insulation).

To facilitate providing fluid isolation, in some instances, the tubing of a pipe segment may be implemented with multiple layers. For example, the tubing of a pipe segment may include an inner (e.g., innermost) layer and an outer (e.g., outermost) layer that each run (e.g., span) the length of the pipe segment. To facilitate blocking fluid flow directly therethrough, the inner layer and the outer layer may each be a continuous layer of solid material, such as plastic and/or a composite material, that runs the length of the pipe segment.

In some instances, pipe segment tubing may additionally include one or more intermediate layers implemented between its inner layer and its outer layer, for example, to facilitate improving tensile strength of the pipe segment tubing. Additionally, to facilitate improving deployment (e.g., installation) efficiency, in some such instances, an intermediate layer of pipe segment tubing may include solid material, such as metal and/or a composite material, with one or more openings devoid of solid material. In other words, in such instances, the intermediate layer may have one or more gaps in which the solid material is not implemented and, thus, included in the annulus of the pipe segment tubing. Due to the reduced amount of solid material, at least in some instances, implementing an intermediate layer of pipe segment tubing with one or more openings may facilitate improving flexibility of the pipe segment, for example, to facilitate reducing its minimum bend radius (MBR). In fact, at least in some instances, a flexible pipe segment may be spooled (e.g., on a reel and/or in a coil) and, thus, increasing its flexibility may facilitate improving deployment efficiency, for example, by enabling the pipe segment to be transported and/or deployed using a tighter spool.

Nevertheless, in some instances, a defect, such as a breach, a kink, and/or a dent, on pipe segment tubing may affect (e.g., compromise and/or reduce) its integrity and, thus, its ability to provide isolation (e.g., insulation) between the bore of a corresponding pipe segment and environmental conditions external to the pipe segment. For example, a defect on the tubing of a pipe segment may result in excessive (e.g., undesired) fluid flow from the pipe segment directly out into environmental conditions external to the pipe segment and/or from the external environmental conditions directly into the pipe segment. In other words, at least in some instances, operating a pipeline system while pipe segment tubing deployed therein has an integrity compromising defect may affect (e.g., reduce) operational efficiency and/or operational reliability of the pipeline system, for example, due to the defect resulting in conveyed fluid being lost and/or contaminated by external environmental conditions.

As such, to facilitate improving operational efficiency and/or operational reliability of a pipeline system, the integrity of one or more pipe segments deployed in or to be deployed in the pipeline system may be tested, for example, via a testing process performed by a testing system before beginning and/or resuming normal operation of the pipeline system. In fact, to facilitate testing its integrity, in some instances, one or more openings (e.g., gaps) in an intermediate layer (e.g., annulus) of pipe segment tubing may each be implemented such that it runs the length of a corresponding pipe segment, thereby providing a fluid conduit (e.g., paths) through which fluid can flow within the pipe segment tubing. In fact, in such instances, an outer layer of the pipe segment tubing may facilitate isolating conditions within the tubing annulus (e.g., fluid conduit implemented in one or more intermediate layers) from environmental conditions external to the pipe segment while an inner layer of the pipe segment tubing may facilitate isolating the conditions within the tubing annulus from conditions within the pipe segment bore. In other words, in such instances, the pipe segment may be implemented to enable fluid flow in its bore as well as fluid flow in the annulus of its tubing.

Leveraging this fact, to facilitate testing integrity of pipe segment tubing, in some instances, a testing process and/or a testing system may inject (e.g., supply and/or pump) test fluid into the annulus (e.g., fluid conduit implemented in an intermediate layer) of the pipe segment tubing and determine one or more fluid parameters that result downstream due to the test fluid injection, for example, via one or more test fluid sources (e.g., pumps and/or compressed air tanks) and one or more sensors, respectively. Merely as an illustrative non-limiting example, the one or more downstream fluid parameters may include a downstream fluid temperature determined (e.g., measured and/or sensed) by a temperature sensor. Additionally or alternatively, the one or more downstream fluid parameters may include a downstream fluid pressure determined by a pressure sensor, a downstream fluid composition (e.g., constituent percentages) determined by a fluid composition sensor, or both.

Furthermore, in some instances, the test fluid used by a testing process and/or a testing system may be an inert fluid, such as nitrogen (e.g., $N_2$) gas, for example, to facilitate reducing the likelihood that the test fluid itself affects (e.g., compromises and/or corrodes) integrity of pipe segment tubing. Moreover, in some instances, one or more fluid parameters of the test fluid may be pre-determined, for example, offline by a test lab and/or a fluid supplier. Additionally or alternatively, one or more fluid parameters of the test fluid may be determined while the test fluid is being supplied to a fluid conduit implemented in an intermediate layer of pipe segment tubing being tested, for example, online and/or in real-time via one or more sensors.

In other words, a fluid parameter of the test fluid may be an upstream fluid parameter and, thus, comparison with a corresponding downstream fluid parameter may indicate the change in the fluid parameter that results from fluid flow in the tubing annulus (e.g., fluid conduit implemented in an intermediate layer) of a pipe segment. As described above, pipe segment tubing may generally be implemented to provide isolation, such as thermal isolation (e.g., insulation), fluid flow isolation, and/or pressure isolation, and, thus, facilitate reducing the amount fluid parameters change due to fluid flow therein. Although some amount of change in a fluid parameter may nevertheless occur, the change may generally be predictable, for example, based at least in part on a model, empirical testing, external environmental conditions, fluid parameters of the injected test fluid, implementation parameters, such as material and/or thickness, of the pipe segment tubing, or any combination thereof.

In other words, at least in some instances, an unexpected change in downstream fluid parameters may indicate that the integrity of a pipe segment is compromised by one or more defects, such as a dent, a kink, and/or a breach. For example, an unexpected change (e.g., drop) in downstream fluid pressure relative to pressure of injected test fluid may be indicative of fluid leaking from the tubing annulus of a pipe segment and, thus, that the pipe segment is potentially defective. Additionally, an unexpected change (e.g., increase or decrease) in downstream fluid temperature relative to temperature of injected test fluid may be indicative of increased heat transfer between fluid in the annulus of pipe segment tubing and conditions external to the pipe segment tubing and, thus, that the pipe segment tubing is potentially defective and/or that the external (e.g., environmental and/or bore) conditions will potentially shorten the lifespan of the pipe segment tubing. Furthermore, an unexpected change in downstream fluid composition relative to composition of injected test fluid may be indicative of conditions external to pipe segment tubing contaminating fluid in its tubing annulus and, thus, that the pipe segment tubing is potentially defective.

As such, at least in some instances, efficacy (e.g., accuracy) of an integrity test for pipe segment tubing may be premised on its tubing annulus (e.g., one or more fluid conduits implemented in one or more of its intermediate layers) being fluidly isolated from conditions external to the pipe segment tubing. To facilitate providing fluid isolation, an open end of pipe segment tubing may be secured to a test head that seals the open end of the pipe segment tubing and, thus, its tubing annulus. In some instances, a test head may be secured to a pipe segment using one or more mechanical fastener mechanisms. For example, a swage machine may compress a shell (e.g., body) of the test head such that resulting deformation on an inner surface of the test head shell conforms with resulting deformation on an outer surface of the pipe segment tubing, thereby mechanically securing (e.g., fastening) the test head to the pipe segment and sealing an open end of its tubing annulus.

However, at least in some instances, securing a test head to a pipe segment using a purely mechanical fastener mechanism may affect (e.g., reduce) testing efficiency for a pipeline system. For example, at least in some instances, the conformal deformation of a test head shell and a pipe segment produced by a swage machine may result in the test head effectively being permanently coupled to the pipe segment. Thus, at least in some such instances, the test head and at least the portion of the pipe segment mechanically secured to the test head may be cut off before the pipe segment is deployed in and/or used in normal operation of a pipeline system. Moreover, even when the portion of a pipe segment mechanically secured to a test head is removable from the test head, at least in some instances, deformation of the test head shell may limit the ability of the test head to be reused for testing another pipe segment. In other words, at least in some instances, a test head that utilizes a purely mechanical (e.g., swaged) fastener mechanism may effectively be a one-time-use (e.g., sacrificial) test head and, thus, potentially limit testing efficiency for a pipeline system, for example, due to at least one new (e.g., different) test head being used to test integrity of each pipe segment deployed in or to be deployed in the pipeline system.

Accordingly, to facilitate improving testing efficiency for pipeline systems, the present disclosure provides techniques for implementing and/or operating a reusable test head that may be utilized in a testing system and/or during a testing process. As will be described in more detail below, a reusable test head may include a shell implemented to define (e.g., enclose) an annulus (e.g., tubing) cavity, which is to be used to interface with the tubing of a pipe segment and, thus, its tubing annulus. In some embodiments, the shell of the reusable test head may additionally be implemented to define a bore cavity, which is to be used to interface with at least a portion of the bore of the pipe segment.

To facilitate defining an annulus cavity and a bore cavity, in some embodiments, the shell of a reusable test head may include an outer tube and an inner tube concentrically coupled (e.g., welded) to an end cap (e.g., wall). In other words, in such embodiments, the annulus cavity of a reusable test head may be defined by the space between an inner surface of the outer tube and an outer surface of the inner tube while the bore cavity of the reusable test head is defined by the space within an inner surface of the inner tube. Additionally, in some such embodiments, the outer tube, the inner tube, and/or the end cap may initially be a discrete (e.g., separate) component and, thus, coupled (e.g., welded) with another discrete component of the reusable test head shell during a shell manufacturing process. In other embodiments, a reusable test head shell may be implemented as a single component, for example, by milling the reusable test head shell (e.g., outer tube, inner tube, and end cap) from a single block of metal.

Moreover, in other embodiments, the shell of a reusable test head may be implemented with a solid central portion internal to the annulus cavity of the reusable test head, for example, instead of a bore cavity. To facilitate defining an annulus cavity and a solid internal portion, in some embodiments, the shell of a reusable test head may include an outer tube and an inner cylinder concentrically coupled (e.g., welded) to an end cap (e.g., wall). In other words, in such embodiments, the annulus cavity of a reusable test head may be defined by the space between an inner surface of the outer tube and an outer surface of the inner cylinder. Additionally, in some such embodiments, the outer tube, the inner cylinder, and/or the end cap may initially be a discrete (e.g., separate) component and, thus, coupled (e.g., welded) with another discrete component of the reusable test head shell during a shell manufacturing process. In other embodiments, a reusable test head shell may be implemented as a single component, for example, by milling the reusable test head shell (e.g., outer tube, inner cylinder, and end cap) from a single block of metal.

In other words, in some embodiments, the shell of a reusable test head may be implemented at least in part using metal, such as carbon steel, stainless steel, duplex stainless steel, super duplex stainless steel, or any combination. Additionally or alternatively, the shell of the reusable test head may be implemented at least in part using plastic, such as high-density polyethylene (HDPE) and/or raised temperature polyethylene (PE-RT). Furthermore, in some embodiments, the shell of the reusable test head may additionally or alternatively be implemented at least in part using one or more composite materials.

In any case, to facilitate testing pipe segment tubing integrity, the shell of a reusable test head may include one or more testing ports (e.g., openings) that each opens therethrough, thereby providing a corresponding fluid path through which fluid can flow into and/or out from its annulus cavity. In particular, in some embodiments, a testing port on a reusable test head shell may be fluidly coupled to one or more test fluid sources (e.g., pumps and/or compressed air tanks), which are implemented and/or operated to selectively supply (e.g., inject and/or pump) test fluid into its annulus cavity, for example, via one or more test fluid injection conduits. Additionally or alternatively, a testing port on a reusable test head shell may be fluidly coupled to one or more external sensors, which are implemented and/or operated to determine (e.g., measure and/or sense) one or more fluid parameters (e.g., temperature, pressure, and/or composition) of fluid extracted from its annulus cavity, for example, via one or more fluid extraction conduits.

In fact, in some embodiments, a shell of a reusable test head may include multiple testing ports, for example, dedicated for different purposes. In other words, in such embodiments, the shell of the reusable test head may include multiple different types of testing ports. For example, a reusable test head shell may include a first testing port fluidly coupled to one or more test fluid sources and, thus dedicated for test fluid injection as well as a second (e.g., different) testing port fluidly coupled to one or more one or more external sensors and, thus, dedicated for (e.g., upstream and/or downstream) fluid parameter determination.

In other embodiments, the same testing port on the shell of a reusable test head may be selectively used for different purposes. For example, a testing portion on reusable test head shell may be fluidly coupled to one or more test fluid sources (e.g., pumps and/or compressed air tanks) and, thus dedicated for test fluid injection during a first time period while being fluidly coupled to one or more external sensors and, thus, dedicated for fluid parameter determination during a second (e.g., subsequent and/or non-overlapping) time period. In some embodiments, one or more sensors may additionally or alternatively be implemented internal to a reusable test head shell and/or proximate (e.g., directly adjacent) the tubing annulus of a pipe segment.

To facilitate providing test head reusability and, thus, improving testing efficiency, in some embodiments, a reusable test head may include one or more reusable fastener mechanism, for example, instead of a purely mechanical (e.g., one-time use and/or swaged) fastener mechanism. In some embodiments, a reusable fastener mechanism implemented in a reusable test head shell may be an electromagnetic fastener mechanism, for example, which allows pipe segment tubing to move within the annulus cavity of the reusable test head shell while unenergized (e.g., unpowered and/or off) and attracts electrically conductive material in the pipe segment tubing to facilitate securing (e.g., fastening) the pipe segment tubing in the annulus cavity while energized (e.g., powered and/or on). Additionally or alternatively, a reusable fastener mechanism implemented in a reusable test head shell may be an inflatable (e.g., pneumatic) fastener mechanism.

In particular, in some embodiments, an inflatable fastener mechanism may include an inflatable bladder made of elastic material, such as rubber. When fluid is injected therein, the inflatable bladder may inflate and expand outwardly, thereby increasing the force it exerts on its surroundings. On the other hand, when fluid is extracted therefrom, the inflatable bladder may deflate and contract inwardly, thereby decreasing the force it exerts on its surroundings.

As such, to facilitate selectively sealing and/or securing an open end of pipe segment tubing therein, in some embodiments, a reusable test head may include one or more inflatable fastener mechanisms (e.g., bladders) implemented in and/or directly adjacent to its annulus cavity. For example, the reusable test head may include an (e.g., a first) inflatable bladder implemented along an outer surface of its inner shell tube. Additionally or alternatively, the reusable test head may include an (e.g., second) inflatable bladder implemented along an inner surface of its outer shell tube.

Accordingly, in some embodiments, a reusable test head may be deployed by inserting (e.g., sliding) an open end of the tubing of a pipe segment into its annulus cavity while an inflatable fastener mechanism (e.g., bladder) implemented therein is in a less than fully inflated (e.g., partially inflated or uninflated) state. The open end of the pipe segment tubing and, thus, the tubing annulus may then be sealed and/or secured in the annulus cavity of the reusable test head by increasing the inflation of the inflatable fastener mechanism from the less than fully inflated state to a more inflated (e.g., fully inflated or partially inflated) state. More specifically, as inflation of the inflatable fastener mechanism increases its contact surface with the pipe segment tubing may increase, thereby increasing the resistance (e.g., force) it exerts against movement (e.g., circumferential movement, radial movement, and/or axial movement) of the pipe segment as well as the resistance it exerts against fluid flow along its contact surface with the pipe segment tubing.

On the other hand, in some embodiments, a reusable test head secured to an open end of pipe segment tubing may be selectively removed at least in part by decreasing inflation of an inflatable fastener mechanism (e.g., bladder) implemented therein to a less inflated (e.g., partially inflated or uninflated) state. More specifically, as inflation of the inflatable fastener mechanism decreases its contact surface with the pipe segment tubing may decrease, thereby decreasing the resistance it exerts against movement (e.g., circumferential movement, radial movement, and/or axial movement) of the pipe segment, for example, in addition to the resistance it exerts against fluid flow along its contact surface with the pipe segment tubing. As such, the open end of the pipe segment tubing may then be slid out from the annulus cavity of the reusable test head while the inflatable fastener mechanism is in the less inflated state.

Due to the exertion of force, in some instances, securing a reusable test head using an inflatable fastener mechanism (e.g., bladder) may nevertheless result in some amount of deformation, for example, on the shell of the reusable test head and/or the tubing of a pipe segment secured to the reusable test head. However, deformation resulting from an inflatable fastener mechanism is generally minimal and may even self-correct with the removal of the reusable test head from the pipe segment, for example, due to material springback. Moreover, deformation resulting from an inflatable fastener mechanism may generally be substantially (e.g., one or more orders of magnitude) less than the deformation resulting from a purely mechanical (e.g., swaged) fastener mechanism, for example, due to the purely mechanical fastener mechanism relying on deformation of a test head shell to secure as well as seal an open end of a pipe segment. As such, implementing a (e.g., reusable) test head with one or more inflatable fastener mechanisms may facilitate increasing the likelihood that the test head is suitable for reuse in testing the pipe segment integrity of a different pipe segment, which, at least in some instances, may facilitate improving testing efficiency of a pipeline system, for example, by obviating the use of a new (e.g., different) test head for testing each of multiple pipe segments deployed and/or to be deployed in the pipeline system.

To facilitate controlling inflation of an inflatable fastener mechanism implemented therein, in some embodiments, the shell of a reusable test head may include one or more inflation ports (e.g., openings) that each opens therethrough, thereby providing a corresponding fluid path through which fluid can flow into and/or out from the inflatable fastener mechanism. In particular, in some embodiments, an inflation port on a reusable test head shell may be coupled between an inflatable bladder of an inflatable fastener mechanism and one or more inflation fluid sources (e.g., pumps and/or tanks), which are implemented and/or operated to selectively supply (e.g., pump and/or inject) inflation fluid into the inflatable bladder and/or to selectively extract (e.g., remove) inflation fluid from the inflatable bladder, for example, via one or more inflation fluid conduits fluidly coupled to and/or extending through the inflation port. In other embodiments, an inflation port on a shell of a reusable test head may be selectively coupled to an inflation fluid source or to environmental conditions external to the reusable test head, for example, to enable selectively increasing inflation of the inflatable fastener mechanism by operating the inflation fluid source to inject inflation fluid into its inflatable bladder and selectively decreasing inflation of the inflatable fastener mechanism by releasing inflation fluid from its inflatable bladder into the external environmental conditions (e.g., via a release valve).

Similar to test fluid injected into the tubing annulus of a pipe segment, in some embodiments, the inflation fluid selectively injected into an inflatable fastener mechanism may also be an inert fluid (e.g., liquid and/or gas). In fact, to facilitate improving testing efficacy (e.g., accuracy), in some embodiments, the composition of the inflation fluid may match the composition of the test fluid, for example, to reduce the likelihood that leakage of the inflation fluid into the annulus cavity of a reusable test head results in pipe segment tubing secured thereto inadvertently being identified as defective. In other words, at least in some such embodiments, the test fluid may also be used as the inflation fluid that is selectively injected into and/or extracted from one or more inflatable fastener mechanisms implemented in a reusable test head.

Moreover, in some embodiments, the test fluid supplied to the tubing annulus of a pipe segment may be pressurized (e.g., at forty pounds per square inch) and, thus, attempt to push the pipe segment away from a reusable test head secured thereto. To facilitate increasing the strength with which a reusable test head is secured to a pipe segment, in some embodiments, an outer (e.g., contact) surface of an inflatable fastener mechanism (e.g., bladder) may be contoured (e.g., rough) and/or coated with a substance that provides a higher coefficient of friction than the base material of the inflatable fastener mechanism. To facilitate further improving security strength, in some embodiments, a reusable test head may include one or more axial fastener mechanism implemented external to its shell, for example, in addition to an inflatable fastener mechanism implemented within its shell.

In particular, in some embodiments, an axial fastener mechanism external to a reusable test head shell may include a tubing engaging component implemented to engage with the tubing of a pipe segment. For example, the tubing engaging component of an axial fastener mechanism may include one or more cables, which are implemented to wrap around pipe segment tubing at a first end and secured (e.g., coupled) to the reusable test head shell at a second (e.g., opposite) end. Additionally or alternatively, the tubing engaging component of an axial fastener mechanism may include one or more clamps, which are secured to the reusable test head shell and implemented to wrap circumferentially around pipe segment tubing.

To facilitate securing an axial fastener mechanism to the shell of a reusable test head, in some embodiments, the reusable test head shell may include one or more anchor components, such as a flange. To help illustrate, continuing with the above examples, the second end of a tubing engaging cable may loop through an opening in a flange implemented on the reusable test head shell and connect back to itself. Additionally or alternatively, a tubing engaging clamp may be coupled to a first end of a support arm and a flange implemented on the reusable test head shell may be coupled to a second (e.g., opposite) end of the support arm. In other embodiments, a support arm may be directly implemented as part of a reusable test head shell and, thus, a tubing engaging clamp may be coupled to the reusable test head shell.

Moreover, in some embodiments, an axial fastener mechanism may be implemented to enable a tubing engaging clamp to be selectively tightened and/or loosened around pipe segment tubing. For example, a tubing engaging clamp may be coupled to a support arm via a bolt that extends through at least a first opening (e.g., hole) on a clamp flange and a second opening on the support arm. As such, tightening a nut on a threaded end of the bolt may pull the tubing engaging clamp inwardly, thereby tightening its grip on pipe segment tubing inserted therethrough. In fact, to facilitate improving its grip strength, in some embodiments, an inner (e.g., contact) surface of a tubing engaging clamp may be contoured (e.g., rough) and/or coated with a substance that provides a higher coefficient of friction than the base material of the tubing engaging clamp. On the other hand, loosening the nut on the threaded end of the bolt may enable the tubing engaging clamp to expand outwardly (e.g., due at least in part to material spring-back), thereby loosening its grip on pipe segment tubing inserted therethrough.

Accordingly, in some embodiments, a reusable test head may be secured to pipe segment tubing at least in part by transitioning and subsequently maintaining a tubing engaging clamp coupled to its shell (e.g., via a support arm) in a tightened state. In other words, in such embodiments, a reusable test head may be deployed by sliding an open end of pipe segment tubing into its annulus cavity and/or removed by sliding the open end of the pipe segment tubing out from its annulus cavity while the tubing engaging clamp is not in the tightened state. For example, in some such embodiments, the open end of the pipe segment tubing may be inserted into the annulus cavity before the tubing engaging clamp is coupled to the shell of the reusable test head and/or removed from the annulus cavity after the tubing engaging clamp is disconnected from the shell. In other embodiments, the open end of the pipe segment tubing may be inserted into the annulus cavity and/or removed from the annulus cavity while the tubing engaging clamp coupled to the shell of the reusable test head is in a loosened state.

To facilitate further improving security strength, in some embodiments, a reusable test head may additionally or alternatively include one or more pneumatically actuated mechanical fastener mechanisms implemented therein in addition to an inflatable fastener mechanism, for example, instead of a purely mechanical (e.g., one-time-use, sacrificial, and/or swaged) fastener mechanism. In particular, in some embodiments, a pneumatically actuated mechanical fastener mechanism may be implemented directly adjacent to an inflatable fastener mechanism in the annulus cavity of a reusable test head, for example, such that pneumatic inflation and/or deflation of the inflatable fastener mechanism actuates the mechanical fastener mechanism. Merely as an illustrative non-limiting example, a pneumatically actuated mechanical fastener mechanism be implemented directly adjacent to the inflatable bladder of a corresponding inflatable fastener mechanism and have a wedged cross-section profile, which is disposed at least in part on a ramp (e.g., bevel) formed in the shell of the reusable test head, for example, with one or more serrations (e.g., teeth) that extend out from its wedged cross-section profile. As such, increasing inflation of the inflatable bladder may push the pneumatically actuated mechanical fastener mechanism up the ramp, for example, such that the pneumatically actuated mechanical fastener mechanism engages (e.g., contacts) pipe segment tubing present in the annulus cavity. On the other hand, decreasing inflation of the inflatable bladder may enable the pneumatically actuated mechanical fastener mechanism to move down the ramp, for example, such that the pneumatically actuated mechanical fastener mechanism disengages pipe segment tubing present in the annulus cavity.

Additionally or alternatively, in some embodiments, a pneumatically actuated mechanical fastener mechanism in a reusable test head may be implemented on a surface of its annulus cavity that is opposite (e.g., facing) the surface of the annulus cavity on which a corresponding inflatable fastener mechanism (e.g., bladder) is implemented. For example, when an inflatable bladder is implemented on an outer surface of the annulus cavity (e.g., inner surface of outer shell tube), a corresponding pneumatically actuated mechanical fastener mechanism may be implemented on an inner surface of the annulus cavity (e.g., outer surface of inner shell tube or inner shell cylinder). Additionally or alternatively, when an inflatable bladder is implemented on an inner surface of the annulus cavity, a corresponding pneumatically actuated mechanical fastener mechanism may be implemented on an outer surface of the annulus cavity.

To facilitate securing pipe segment tubing in the annulus cavity of a reusable test head, in some embodiments, a pneumatically actuated mechanical fastener mechanism implemented opposite an inflatable fastener mechanism may include one or more serrations (e.g., teeth) that extend into the annulus cavity. As such, when pipe segment tubing is present in the annulus cavity, increasing inflation of the inflatable fastener mechanism may push the pipe segment tubing toward the pneumatically actuated mechanical fastener mechanism, for example, such that one or more serrations of the pneumatically actuated mechanical fastener mechanism engage the pipe segment tubing. On the other hand, decreasing inflation of the inflatable fastener mechanism may enable the pipe segment tubing to move away from the pneumatically actuated mechanical fastener mechanism, for example, such that one or more serrations of the pneumatically actuated mechanical fastener mechanism disengage the pipe segment tubing.

In this manner, as will be described in more detail below, the techniques described in the present disclosure may facilitate implementing and/or operating a (e.g., reusable) test head such that the test head is reusable to test multiple different pipe segments. For example, implementing and/or operating a reusable test head in accordance with the techniques described in the present disclosure may enable the reusable test head to be secured to a first pipe segment to test its integrity, removed from the first pipe segment after completing a testing cycle for the first pipe segment, secured to a second (e.g., different) pipe segment to test its integrity, and so on. Thus, at least in some instances, implementing and/or operating a reusable test head in accordance with the techniques described in the present disclosure may facilitate improving testing efficiency for a pipeline system, for example, by obviating the use of a new (e.g., different) test head for testing each pipe segment deployed or to be deployed in the pipeline system.

To help illustrate, an example of a pipeline system 10 is shown in FIG. 1. As in the depicted example, the pipeline system 10 may be coupled between a bore fluid source 12 and a bore fluid destination 14. Merely as an illustrative non-limiting example, the bore fluid source 12 may be a production well and the bore fluid destination 14 may be a fluid storage tank. In other instances, the bore fluid source 12 may be a first (e.g., lease facility) storage tank and the bore fluid destination 14 may be a second (e.g., refinery) storage tank.

In any case, the pipeline system 10 may generally be implemented and/or operated to facilitate transporting (e.g., conveying) fluid, such as gas and/or liquid, from the bore fluid source 12 to the bore fluid destination 14. In fact, in some embodiments, the pipeline system 10 may be used in many applications, including without limitation, both onshore and offshore oil and gas applications. For example, in such embodiments, the pipeline system 10 may be used to transport one or more hydrocarbons, such as crude oil, petroleum, natural gas, or any combination thereof. Additionally or alternatively, the pipeline system 10 may be used to transport one or more other types of fluid, such as produced water, fresh water, fracturing fluid, flowback fluid, carbon dioxide, or any combination thereof.

To facilitate flowing fluid to the bore fluid destination 14, in some embodiments, the bore fluid source 12 may include one or more bore fluid pumps 16 that are implemented and/or operated to inject (e.g., pump and/or supply) fluid from the bore fluid source 12 into a bore of the pipeline system 10. However, it should be appreciated that the depicted example is merely intended to be illustrative and not limiting. In particular, in other embodiments, one or more bore fluid pumps 16 may not be implemented at a bore fluid source 12, for example, when fluid flow through the bore of the pipeline system 10 is produced by gravity. Additionally or alternatively, in other embodiments, one or more bore fluid pumps 16 may be implemented in a pipeline system 10 and/or at a bore fluid destination 14.

To facilitate transporting fluid from the bore fluid source 12 to the bore fluid destination 14, as in the depicted example, a pipeline system 10 may include one or more pipe fittings (e.g., connectors) 18 and one or more pipe segments 20. For example, the depicted pipeline system 10 includes a first pipe segment 20A, a second pipe segment 20B, and an Nth pipe segment 20N. Additionally, the depicted pipeline system 10 includes a first pipe (e.g., end) fitting 18A, which couples the bore fluid source 12 to the first pipe segment 20A, a second pipe (e.g., midline) fitting 18B, which couples the first pipe segment 20A to the second pipe segment 20B, and an Nth pipe (e.g., end) fitting 18N, which couples the Nth pipe segment 20N to the bore fluid destination 14.

However, it should again be appreciated that the depicted example is merely intended to be illustrative and not limiting. In particular, in other embodiments, a pipeline system 10 may include fewer (e.g., one) pipe segments 20. Additionally or alternatively, in other embodiments, a pipeline system 10 may include fewer (e.g., two) pipe fittings 18.

In any case, as described above, a pipe segment 20 generally includes tubing that may be used to convey or transfer (e.g., transport) water, gas, oil, and/or any other suitable type of fluid. The tubing of a pipe segment 20 may be made of any suitable type of material, such as plastic, metal, and/or a composite (e.g., fiber-reinforced composite) material. In fact, as will be described in more detail below, in some embodiments, the tubing of flexible pipe may be implemented using multiple different layers. For example, the tubing of a pipe segment 20 may include a first high-density polyethylene (e.g., internal corrosion protection) layer, one or more reinforcement (e.g., steel strip) layers external to the first high-density polyethylene layer, and a second high-density polyethylene (e.g., external corrosion protection) layer external to the one or more reinforcement layers.

Additionally, as in the depicted example, one or more (e.g., second and/or Nth) pipe segments 20 in the pipeline system 10 may be curved. To facilitate implementing a curve in a pipe segment 20, in some embodiments, the pipe segment 20 may be flexible, for example, such that the pipe segment 20 is spoolable on a reel and/or in a coil (e.g., during transport and/or before deployment of the pipe segment 20). In other words, in some embodiments, one or more pipe segments 20 in the pipeline system 10 may be a flexible pipe, such as a bonded flexible pipe, an unbonded flexible pipe, a flexible composite pipe (FCP), a thermoplastic composite pipe (TCP), or a reinforced thermoplastic pipe (RTP). In fact, at least in some instances, increasing flexibility of a pipe segment 20 may facilitate improving deployment efficiency of a pipeline system 10, for example, by obviating a curved (e.g., elbow) pipe fitting 18 and/or enabling the pipe segment 20 to be transported to the pipeline system 10, deployed in the pipeline system 10, or both using a tighter spool.

To facilitate improving flexibility, in some embodiments, the tubing of a pipe segment 20 that defines (e.g., encloses) its bore may include one or more openings devoid of solid material. In fact, in some embodiments, an opening in the tubing of a pipe segment 20 may run (e.g., span) the length of the pipe segment 20 and, thus, define (e.g., enclose) a fluid conduit in the tubing annulus separate (e.g., distinct) from the pipe segment bore. In other words, in such embodiments, fluid may flow through a pipe segment 20 via its bore, a fluid conduit implemented within its tubing annulus, or both.

Figure 2:
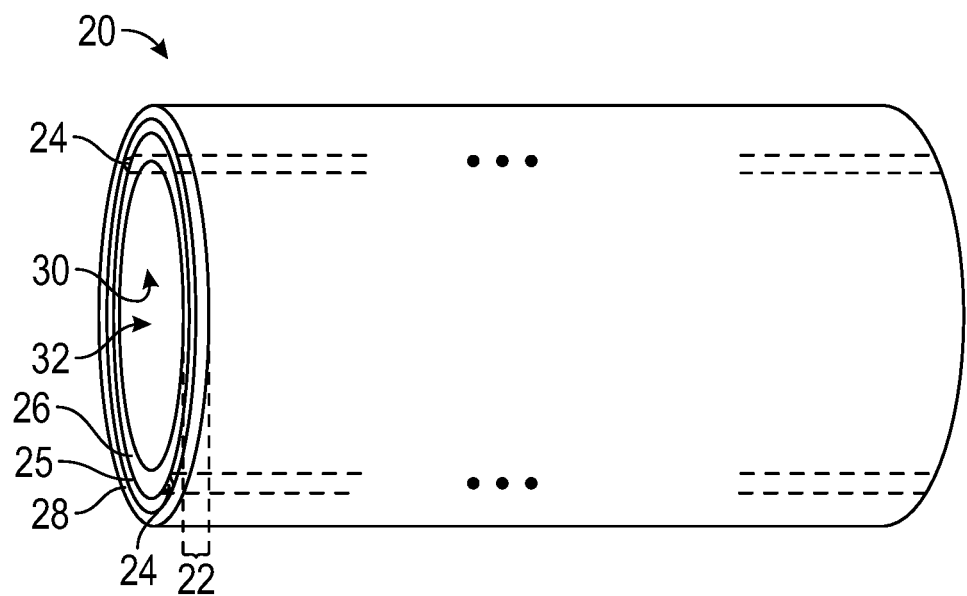
FIG. 2 is a side view of an example of a pipe segment of FIG. 1 that includes a bore defined by its tubing as well as fluid conduits implemented within an annulus of its tubing, in accordance with an embodiment of the present disclosure.

To help illustrate, an example of a pipe segment 20, which includes a tubing 22 with fluid conduits 24 implemented within its annulus 25, is shown in FIG. 2. As depicted, the pipe segment tubing 22 is implemented with multiple layers including an inner (e.g., innermost) layer 26 and an outer (e.g., outermost) layer 28. In some embodiments, the inner layer 26 and/or the outer layer 28 of the pipe segment tubing 22 may be implemented using composite material and/or plastic, such as high-density polyethylene (HDPE) and/or raised temperature polyethylene (PE-RT). In any case, as depicted an inner surface 30 of the inner layer 26 defines (e.g., encloses) a bore 32 through which fluid can flow, for example, to facilitate transporting the fluid from a bore fluid source 12 to a bore fluid destination 14.

Additionally, as depicted, the annulus 25 of the pipe segment tubing 22 is implemented between its inner layer 26 and its outer layer 28. As will be described in more detail below, the tubing annulus 25 may include one or more intermediate layer of the pipe segment tubing 22. Furthermore, as depicted, fluid conduits 24 running along the length of the pipe segment 20 are defined (e.g., enclosed) in the tubing annulus 25. As described above, a fluid conduit 24 in the tubing annulus 25 may be devoid of solid material. As such, pipe segment tubing 22 that includes one or more fluid conduits 24 therein may include less solid material and, thus, exert less resistance to flexure, for example, compared to a solid pipe segment tubing 22 and/or pipe segment tubing 22 that does not include fluid conduits 24 implemented therein. Moreover, to facilitate further improving flexibility, in some embodiments, one or more layers in the tubing 22 of a pipe segment 20 may be unbonded from one or more other layers in the tubing 22 and, thus, the pipe segment 20 may be an unbonded pipe segment 20.

However, it should be appreciated that the depicted example is merely intended to be illustrative and not limiting. In particular, in other embodiments, pipe segment tubing 22 may include fewer (e.g., one) or more (e.g., three, four, or more) fluid conduits 24 defined in its tubing annulus 25. Additionally or alternatively, in other embodiments, a fluid conduit 24 defined in the tubing annulus 25 of a pipe segment 20 may run non-parallel to the bore 32 of the pipe segment 20, for example, such that the fluid conduit 24 is skewed relative to the axial (e.g., longitudinal) extent of the bore 32.

Figure 3:
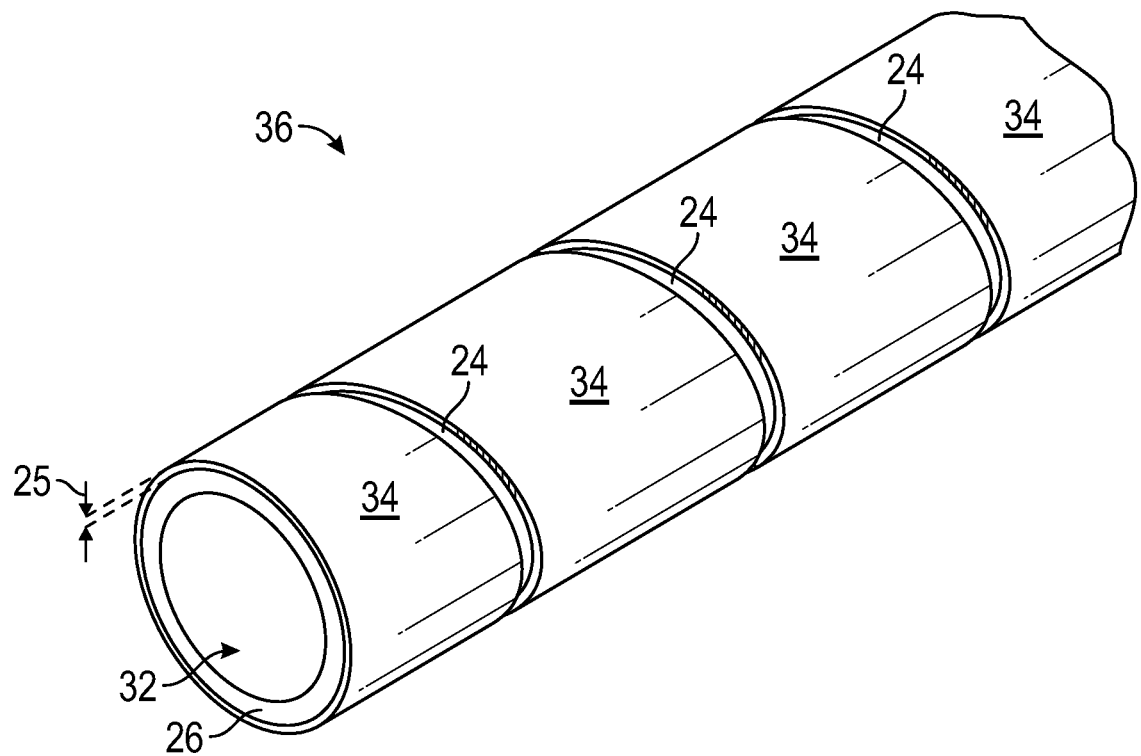
FIG. 3 is a perspective view of an example of the pipe segment of FIG. 2 with a helically shaped fluid conduit implemented within the annulus of its tubing, in accordance with an embodiment of the present disclosure.

To help illustrate, an example of a portion 36 of a pipe segment 20, which includes an inner layer 26 and an intermediate layer 34 included in the annulus 25 of its pipe segment tubing 22, is shown in FIG. 3. In some embodiments, one or more intermediate layers 34 of pipe segment tubing 22 may be implemented using composite material and/or metal, such as carbon steel, stainless steel, duplex stainless steel, super duplex stainless steel, or any combination thereof. In other words, at least in some such embodiments, the intermediate layer 34 of the pipe segment tubing 22 may be implemented using electrically conductive, which, at least in some instances, may facilitate testing integrity of the pipe segment tubing 22, for example, by enabling communication of electrical (e.g., command and/or sensor) signals via the intermediate layer 34.

In any case, as depicted, the intermediate layer 34 is helically disposed (e.g., wound and/or wrapped) on the inner layer 26 such that gaps (e.g., openings) are left between adjacent windings to define a fluid conduit 24. In other words, in some embodiments, the intermediate layer 34 may be implemented at least in part by winding a metal (e.g., steel) strip around the inner layer 26 at a non-zero lay angle (e.g., fifty-four degrees) relative to the axial (e.g., longitudinal) extent of the bore 32. In any case, as depicted, the resulting fluid conduit 24 runs helically along the pipe segment 20, for example, such that the fluid conduit 24 is skewed fifty-four degrees relative to the axial extent of the pipe segment bore 32.

In some embodiments, an outer layer 28 may be disposed directly over the depicted intermediate layer 34 and, thus, cover and/or define (e.g., enclose) the depicted fluid conduit 24. However, in other embodiments, the tubing annulus 25 pipe segment tubing 22 may include multiple (e.g., two, three, or four) intermediate layers 34. In other words, in such embodiments, one or more other intermediate layers 34 may be disposed over the depicted intermediate layer 34. In fact, in some such embodiments, the one or more other intermediate layers 34 may also each be helically disposed such that gaps are left between adjacent windings to implement one or more corresponding fluid conduits 24 in the pipe segment tubing 22.

For example, a first other intermediate layer 34 may be helically disposed on the depicted intermediate layer 34 using the same non-zero lay angle as the depicted intermediate layer 34 to cover (e.g., define and/or enclose) the depicted fluid conduit 24 and to implement another fluid conduit 24 in the first other intermediate layer 34. Additionally, a second other intermediate layer 34 may be helically disposed on the first other intermediate layer 34 using another non-zero lay angle, which is the inverse of the non-zero lay angle of the depicted intermediate layer 34 to implement another fluid conduit 24 in the second other intermediate layer 34. Furthermore, a third other intermediate layer 34 may be helically disposed on the second other intermediate layer 34 using the same non-zero lay angle as the second other intermediate layer 34 to cover the other fluid conduit 24 in the second other intermediate layer 34 and to implement another fluid conduit 24 in the third other intermediate layer 34. In some embodiments, an outer layer 28 may be disposed over the third other intermediate layer 34 and, thus, cover (e.g., define and/or enclose) the other fluid conduit 24 in the third other intermediate layer 34.

In any case, as described above, the tubing 22 of a pipe segment 20 may generally be implemented to facilitate isolating conditions within its bore 32 from environmental conditions external to the pipe segment 20. Even when implemented with multiple layers, in some instances, a defect, such as a breach, a kink, and/or a dent, on pipe segment tubing 22 may compromise its integrity and, thus, its ability to provide isolation, for example, due to the defect resulting in excessive (e.g., undesired) fluid flow from the pipe segment directly out into environmental conditions external to the pipe segment 20 and/or from the external environmental conditions directly into the pipe segment 20. As such, at least in some instances, operating a pipeline system 10 while pipe segment tubing 22 deployed therein has an integrity compromising defect may affect (e.g., reduce) operational efficiency and/or operational reliability of the pipeline system, for example, due to the defect resulting in conveyed fluid being lost and/or contaminated by external environmental conditions. As such, to facilitate improving operational efficiency and/or operational reliability of a pipeline system 10, in some embodiments, the integrity of a pipe segment 20 deployed in or to be deployed in the pipeline system 10 may be tested by a testing system, for example, which is implemented and/or operated to perform a testing process before beginning and/or resuming normal operation of the pipeline system 10.

Figure 4:
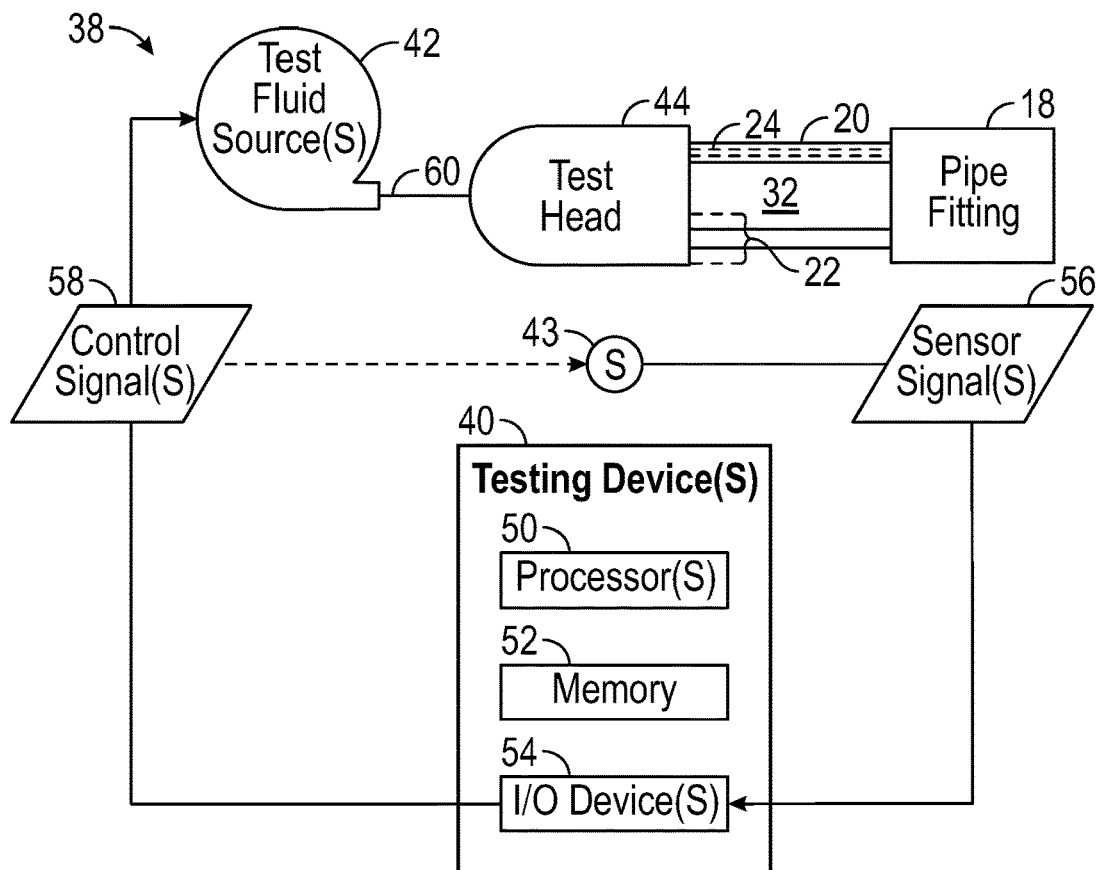
FIG. 4 is a block diagram of an example of a testing system implemented and/or operated to test integrity of one or more pipe segments deployed in or to be deployed in the pipeline system of FIG. 1, in accordance with an embodiment of the present disclosure.

To help illustrate, an example of a testing system 38, which may be used to test integrity of a pipe segment 20, is shown in FIG. 4. As in the depicted example, a testing system 38 may include one or more testing devices 40, one or more test fluid sources 42, one or more sensors 43, and at least one test head 44. In particular, as depicted, the test head 44 is coupled to an (e.g., first) end of the pipe segment 20 being tested.

However, it should be appreciated that the depicted example is merely intended to be illustrative and not limiting. In particular, although a single pipe segment 20 is depicted, in other embodiments, multiple pipe segments 20 may be concurrently tested, for example, by fluidly coupling the pipe segments 20 between the test head 44 and the depicted pipe fitting 18 via one or more midline pipe fittings 18. Additionally or alternatively, although a pipe fitting 18 is depicted as being coupled to another (e.g., second and/or opposite) end of the pipe segment 20 being tested, in other embodiments, another test head 44 may be used instead. In other words, in such embodiments, a first test head 44 may be coupled to a first end of a pipe segment 20 while a second test head 44 is coupled to a second (e.g., opposite) end of the pipe segment 20.

Additionally, in some embodiments, a test fluid source 42 in the testing system 38 may include a test fluid pump and/or a compressed air tank, which is implemented and/or operated to selectively supply (e.g., inject and/or pump) test fluid to the test head 44 via one or more test fluid conduits 60, for example, based at least in part on a control signal 58 received from a testing device 40 and/or valve position of one or more valves fluidly coupled between the test fluid source 42 and the test head 44. Although testing examples that utilize test fluid injection are described, in other embodiments, the techniques described in the present disclosure may additionally or alternatively be utilized in testing processes and/or testing systems 38 that are based on test fluid extraction. In other words, in such embodiments, the test fluid source 42 in the testing system 38 may include a test fluid pump, which is implemented and/or operated to selectively extract (e.g., vacuum and/or pump) test fluid out from the test head 44 via one or more test fluid conduits 60, for example, based at least in part on a control signal 58 received from a testing device 40 and/or valve position of one or more valves fluidly coupled between the test fluid source 42 and the test head 44.

Thus, at least in some embodiments, the one or more testing (e.g., electronic and/or computing) devices 40 may generally control operation of the testing system 38. To facilitate controlling operation, as in the depicted example, a testing device 40 may include one or more processors 50, memory 52, and one or more input/output (I/O) devices 54. In some embodiments, the memory 52 in a testing device 40 may include a tangible, non-transitory, computer-readable medium that is implemented and/or operated to store data and/or executable instructions. For example, the memory 52 may store sensor data based at least in part on one or more sensor signals 56 received from a sensor 43. As such, in some embodiments, the memory 52 may include volatile memory, such as random-access memory (RAM), and/or non-volatile memory, such as read-only memory (ROM), flash memory, a solid-state drive (SSD), a hard disk drive (HDD), or any combination thereof.

Additionally, in some embodiments, a processor 50 in a testing device 40 may include processing circuitry implemented and/or operated to process data and/or execute instructions stored in memory 52. In other words, in some such embodiments, a processor 50 in a testing device 40 may include one or more general purpose microprocessors, one or more application specific integrated circuits (ASICs), one or more field programmable gate arrays (FPGAs), or any combination thereof. For example, a processor 50 in a testing device 40 may process sensor data stored in memory 52 to determine an integrity state of pipe segment tubing 22 being tested.

Additionally or alternatively, a processor 50 in a testing device 40 may execute instructions stored in memory 52 to determine one or more control (e.g., command) signals 58 that instruct the testing system 38 to perform corresponding control actions. For example, the testing device 40 may determine a control signal 58 that instructs a test fluid source 42 to supply (e.g., inject and/or pump) test fluid to the test head 44. Additionally or alternatively, the testing device 40 may determine a control signal 58 that instructs a sensor 43 to return one or more sensor signals 56 indicative of corresponding fluid parameters, such as fluid temperature, fluid pressure, and/or fluid composition, determined (e.g., sensed and/or measured) by the sensor 43.

To facilitate communication with a test fluid source 42 and/or a sensor 43, in some embodiments, the I/O devices 54 of a testing device 40 may include one or more input/output (I/O) ports (e.g., terminals). Additionally, to facilitate communicating the results of an integrity test to a user (e.g., operator), in some embodiments, the I/O devices 54 of a testing device 40 may include one or more user output devices, such as an electronic display that is implemented and/or operated to display a graphical user interface (GUI) that provides a visual representation of integrity test results (e.g., integrity state of tested pipe segment tubing 22). Furthermore, to enable user interaction with the testing system 38, in some embodiments, the I/O devices 54 of a testing device 40 may include one or more user input devices, such as a hard button, a soft button, a keyboard, a mouse, and/or the like. For example, the one or more user input devices may enable an operator to input a user command that instructs the testing system 38 to initiate an integrity test for pipe segment 20.

In any case, as described above, the tubing 22 of a pipe segment 20 is generally implemented to facilitate isolating (e.g., insulating) conditions internal to the pipe segment 20 from environmental conditions external to the pipe segment 20. For example, an outer layer 28 of the pipe segment tubing 22 may be implemented to facilitate isolating the external environmental conditions from conditions in the bore 32 of the pipe segment 20 and, thus, from conditions in a fluid conduit 24 that is implemented in the tubing annulus 25, which is internal to the outer layer 28 of the pipe segment tubing 22. Additionally or alternatively, an inner layer 26 of the pipe segment tubing 22 may be implemented to facilitate isolating the conditions in the bore 32 of the pipe segment 20 from the external environmental condition and, thus, from the conditions in a fluid conduit 24 that is implemented in the tubing annulus 25, which is external to the inner layer 26 of the pipe segment tubing 22.

Nevertheless, in some instances, a defect, such as a dent, a kink, and/or a breach, on the tubing 22 of a pipe segment 20 may affect (e.g., compromise and/or reduce) its integrity and, thus, its ability to provide isolation. For example, a defect in the outer layer 28 of the pipe segment tubing 22 may reduce its ability to provide isolation between environmental conditions external to the pipe segment 20 and the conditions in a fluid conduit 24 that is implemented in the tubing annulus 25, which is internal to the outer layer 28 of the pipe segment tubing 22. Additionally or alternatively, a defect in an inner layer 26 of the pipe segment tubing 22 may reduce its ability to provide isolation between the conditions in the bore 32 of the pipe segment 20 and the conditions in a fluid conduit 24 that is implemented in the tubing annulus 25, which is external to the inner layer 26 of the pipe segment tubing 22.

Generally, when a defect is not present on its tubing 22, one or more parameters (e.g., characteristics and/or properties) of fluid flowing through a pipe segment 20 may nevertheless change as it flows therethrough. However, a fluid parameter change resulting from fluid flow through a pipe segment 20 with a non-defective pipe segment tubing 22 is generally predictable, for example, based at least in part on a model, empirical testing, environmental conditions external to the pipe segment 20, fluid parameters of fluid input (e.g., supplied) to the pipe segment 20, implementation parameters, such as material and/or thickness, of the pipe segment tubing 22, or any combination thereof. In other words, at least in some instances, an unexpected (e.g., unpredicted) change in a fluid parameter resulting from fluid flow through a pipe segment 20 may be indicative of corresponding pipe segment tubing 22 potentially having one or more defects, such as a dent, a kink, and/or a breach.

Leveraging this fact, to facilitate testing pipe segment integrity, in some embodiments, the testing system 38 may inject test fluid into one or more fluid conduits 24 implemented in the tubing annulus 25 (e.g., one or more intermediate layers 34) of the pipe segment tubing 22, for example, via a test fluid source 42 fluidly coupled to the test head 44. In particular, in some embodiments, the test fluid may be an inert fluid, such as nitrogen (e.g., $N_2$) gas. Additionally, in some embodiments, one or more fluid parameters (e.g., temperature, pressure, and/or composition) of the test fluid may be pre-determined before supply to a fluid conduit 24 implemented in an intermediate layer of the pipe segment tubing 22, for example, offline by a test lab and/or a fluid supplier such that the pre-determined fluid parameters of the test fluid are stored in memory 52 of a testing device 40. In some embodiments, one or more fluid parameters of the test fluid may be additionally or alternatively determined (e.g., sensed and/or measured) while the test fluid is being supplied to the tubing annulus 25 of the pipe segment tubing 22, for example, online and/or in real-time via one or more sensors 43 such that the input (e.g., initial) fluid parameters of the test fluid are stored in memory 52 of a testing device 40.

As described above, at least in some instances, a defect in the tubing 22 of a pipe segment 20 may result in one or more parameters of fluid flowing through the pipe segment 20 changing in a manner different than expected (e.g., predicted). To facilitate determining changes in fluid parameters resulting from fluid flow in the annulus 25 of pipe segment tubing 22, in some embodiments, the testing system 38 may determine one or more downstream fluid parameters (e.g., temperature, pressure, and/or composition) via one or more sensors 43, for example, which are internal to the test head 44 and/or fluidly coupled to the test head 44. In other words, in such embodiments, the testing system 38 may test the integrity of pipe segment tubing 22 at least in part by comparing one or more fluid parameters of fluid (e.g., test fluid) supplied to the tubing annulus 25 and corresponding downstream fluid parameters resulting from fluid flow through the tubing annulus 25. Thus, at least in some instances, implementing and/or operating a testing system 38 in this manner may facilitate improving operational reliability of a pipeline system 10, for example, by enabling confirmation of pipe segment integrity and/or amelioration of a pipe segment defect before beginning and/or resuming normal operation of the pipeline system 10.

Figure 5:
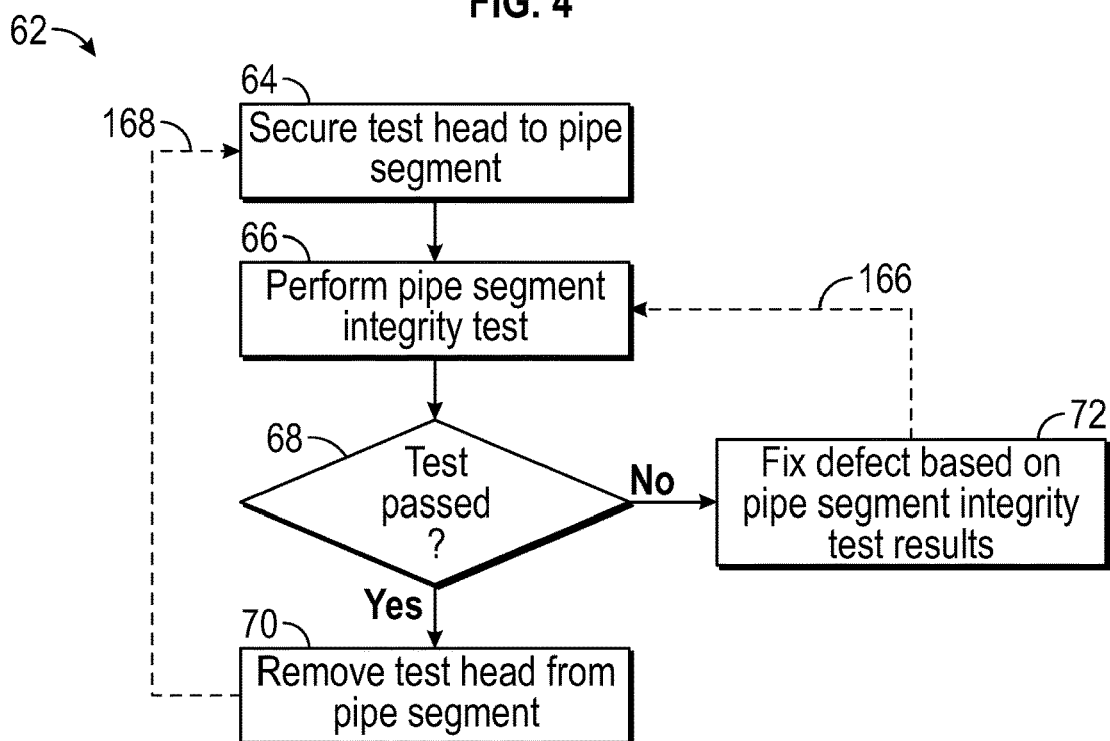
FIG. 5 is a flow diagram of an example of a process for operating the testing system of FIG. 3, in accordance with an embodiment of the present disclosure.

To help further illustrate, an example of a process 62 for operating a testing system 38 is described in FIG. 5. Generally, the process 62 includes securing a test head to a pipe segment (process block 64), performing a pipe segment integrity test (process block 66), and determining whether the pipe segment integrity test has been passed (decision block 68). Additionally, the process 62 generally includes removing the test head from the pipe segment when the pipe segment integrity test has been passed (process block 70) and fixing a defect based on results of the pipe segment integrity test when the pipe segment integrity test has not been passed (process block 72).

Although described in a specific order, which corresponds with an embodiment of the present disclosure, it should be appreciated that the example process 62 is merely intended to be illustrative and non-limiting. In particular, in other embodiments, a process 62 for operating a testing system 38 may include one or more additional process blocks and/or omit one or more of the depicted process blocks. Moreover, in some embodiments, the process 62 may be performed at least in part by executing instructions stored in a tangible, non-transitory, computer-readable medium, such as memory 52 in a testing device 40, using processing circuitry, such as a processor 50 in the testing device 40.

For example, in some such embodiments, a testing device 40 in a testing system 38 may instruct the testing system 38 to secure a test head 44 to a pipe segment 20 (process block 64). Additionally or alternatively, an operator (e.g., user or technician) may manually secure the test head 44 to the pipe segment 20. In any case, as described above, in some instances, a test head 44 may be secured to the tubing 22 of a pipe segment 20 via one or more mechanical fastener mechanisms. For example, a swage machine may compress a shell (e.g., body) of the test head 44 such that resulting deformation on an inner surface of the test head shell conforms with resulting deformation on an outer surface of the pipe segment tubing 22, thereby mechanically securing and sealing an open end of the pipe segment tubing 22 and, thus, its annulus 25 in the test head shell.

However, at least in some instances, securing a test head 44 to a pipe segment 20 using a purely mechanical fastener mechanism may affect (e.g., reduce) testing efficiency for a pipeline system 10. For example, the conformal deformation of a test head shell and pipe segment tubing 22 produced by a swage machine may result in the test head 44 effectively being permanently coupled to the pipe segment tubing 22. Thus, in such instances, the test head 44 and at least the portion of a pipe segment 20 mechanically secured to the test head 44 may be cut off before the pipe segment 20 is used in normal operation of a pipeline system 10. Moreover, even when the portion of a pipe segment 20 mechanically secured to a test head 44 is removable from the test head 44, at least in some instances, deformation of the shell of the test head 44 may limit its ability to be reused for testing another pipe segment 20.

In other words, at least in some instances, a test head 44 that utilizes a purely mechanical fastener mechanism may effectively be a one-time-use (e.g., sacrificial) test head 44. Thus, at least in such instances, utilizing a purely mechanically secured test head 44 may potentially limit testing efficiency of a pipeline system 10, for example, due to at least one new (e.g., different) mechanically secured test head 44 being used to test each pipe segment 20 deployed in or to be deployed in the pipeline system 10. To facilitate improving testing efficiency, a testing system 38 may instead include a test head 44 that is reusable to test multiple different pipe segments 20. In particular, to facilitate providing reusability, a reusable test head 44 may include one or more reusable (e.g., inflatable and/or electromagnetic) fastener mechanism, for example, instead of a purely mechanical (e.g., swaged, one-time-use, and/or sacrificial) fastener mechanism.

Figure 6:
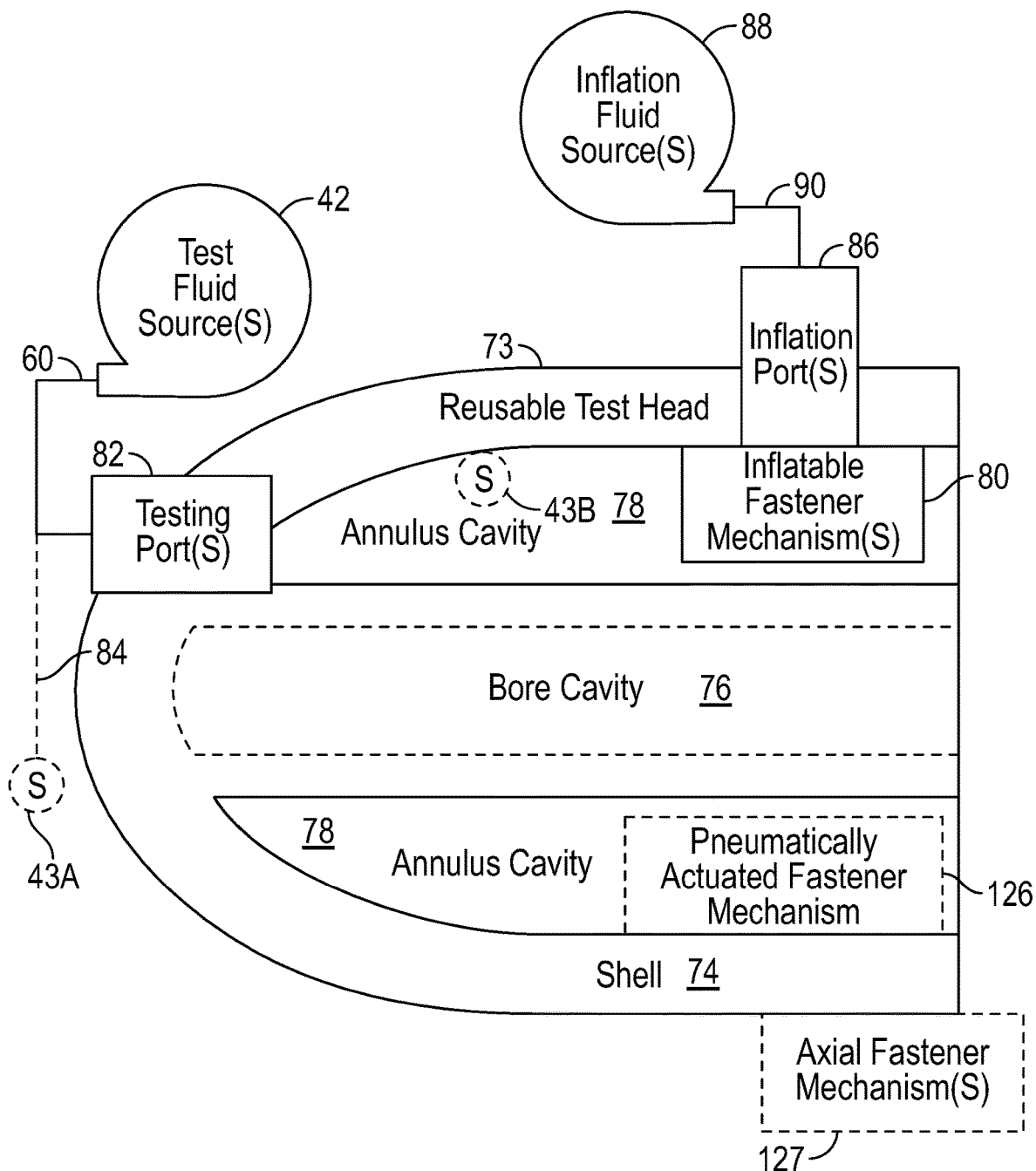
FIG. 6 is a block diagram of an example of a portion of the testing system of FIG. 4, which includes a reusable test head implemented with one or more inflatable (e.g., reusable) fastener mechanisms, in accordance with an embodiment of the present disclosure.

To help illustrate, an example of a test head 44 that is reusable—namely a reusable test head 73—is shown in FIG. 6. As depicted, the reusable test head 73 includes a shell (e.g., body) 74 and one or more reusable fastener mechanisms—namely one or more inflatable fastener mechanisms 80. In some embodiments, the reusable test head shell 74 may be implemented at least in part using metal, plastic, a composite material, or any combination thereof. In any case, as depicted, the reusable test head shell 74 is implemented to define an annulus cavity 78. As will be described in more detail below, the annulus cavity 78 of the reusable test head 73 may generally be implemented to interface with the tubing 22 and, thus, the tubing annulus 25 of a pipe segment 20.

As in the depicted example, in some embodiments, the shell 74 of the reusable test head 73 may additionally be implemented to define a bore cavity 76 internal to the annulus cavity 78. As will be described in more detail below, in such embodiments, the bore cavity 76 may generally be implemented to interface with at least a portion of the bore 32 of a pipe segment 20. However, it should be appreciated that the depicted example is merely intended to be illustrative and not limiting. In particular, in other embodiments, the shell 74 of a reusable test head 73 may include a solid central portion internal to the annulus cavity 78 of the reusable test head 73, for example, instead of a bore cavity 76.

As described above, in some embodiments, integrity of pipe segment tubing 22 may be tested at least in part by injecting test fluid, such as nitrogen (e.g., $N_2$) gas, into a fluid conduit 24 implemented its tubing annulus 25 and determining one or more downstream fluid parameters that result from fluid flow through the tubing annulus 25. In other words, to facilitate testing integrity of a pipe segment 20, fluid may flow into and/or out from the annulus 25 of its pipe segment tubing 22. Since used to seal an open end of pipe segment tubing 22, to enable fluid flow therethrough, as in the depicted example, the reusable test head 73 may include one or more testing ports 82.

In particular, as will be described in more detail below, a testing port 82 may include an opening in the shell 74 of a reusable test head 73 that enables fluid flow into and/or out from an annulus cavity 78 of the reusable test head 73. For example, a testing port 82 on a reusable test head 73 may be fluidly coupled to a test fluid source 42 via one or more test fluid conduits 60, thereby enabling a test fluid (e.g., liquid and/or gas) to selectively injected (e.g., supplied and/or pumped) into its annulus cavity 78 and, thus, a fluid conduit 24 implemented in the annulus 25 of pipe segment tubing 22 secured in its annulus cavity 78. Additionally or alternatively, a testing port 82 on a reusable test head 73 may be fluidly coupled to one or more external sensors 43A (e.g., via one or more fluid extraction conduits 84), thereby enabling fluid that flows from a fluid conduit 24, which is implemented in the annulus 25 of pipe segment tubing 22, into its annulus cavity 78 to be supplied to the one or more external sensors 43A.

To facilitate sealing and/or securing pipe segment tubing 22 in its annulus cavity 78, as in the depicted example, a reusable test head 73 may include one or more inflatable fastener mechanisms 80 implemented in and/or directly adjacent to the annulus cavity 78. In particular, in some embodiments, an inflatable fastener mechanism 80 may include an inflatable bladder made of elastic material, such as rubber. When fluid is injected therein, the inflatable bladder may inflate and expand outwardly, thereby increasing the force it exerts on its surroundings. On the other hand, when fluid is extracted therefrom, the inflatable bladder may deflate and contract inwardly, thereby decreasing the force it exerts on its surroundings.

In other words, at least in such embodiments, decreasing inflation (e.g., deflating) of an inflatable fastener mechanism (e.g., bladder) 80 implemented in the annulus cavity 78 of a reusable test head 73 may reduce the resistance it exerts against movement of pipe segment tubing 22 in the annulus cavity 78. On the other hand, at least in such embodiments, increasing inflation (e.g., inflating) of the inflatable fastener mechanism 80 implemented in the annulus cavity 78 of the reusable test head 73 may increase the resistance it exerts against movement of the pipe segment tubing 22 in the annulus cavity 78. Thus, as will be described in more detail below, in some embodiments, a reusable test head 73 may be deployed on and/or removed from a pipe segment 20 while one or more of its inflatable fastener mechanisms 80 is in a less inflated state and secured to the pipe segment 20 at least in part by transitioning and/or maintaining one or more of its inflatable fastener mechanisms 80 in a more inflated state.

To facilitate controlling inflation, as in the depicted example, the reusable test head 73 may include one or more inflation ports 86. In particular, an inflation port 86 may include an opening in the shell 74 of the reusable test head 73 that enables fluid flow into and/or out from an inflatable fastener mechanism 80 implemented within the shell 74. For example, an inflation port 86 on a reusable test head 73 may be fluidly coupled to one or more inflation fluid sources 88 via one or more inflation fluid conduits 90.

In some embodiments, an inflation fluid source 88 may include an inflation fluid pump and/or a compressed air tank, which is implemented and/or operated to selectively supply (e.g., inject and/or pump) inflation fluid to an inflatable fastener mechanism (e.g., bladder) 80, for example, based at least in part on a control signal 58 received from a testing device 40 and/or valve position of one or more valves fluidly coupled between the inflation fluid source 88 and an inflation port 86 of the reusable test head 73. Additionally or alternatively, an inflation port 86 of the reusable test head 73 may be selectively coupled to environmental conditions external to the reusable test head 73, for example, based at least in part valve position of one or more valves fluidly coupled to the inflation port 86 to enable selectively decreasing inflation of an inflatable fastener mechanism 80 by releasing inflation fluid from its inflatable bladder into the external environmental conditions.

To facilitate increasing security strength, as in the depicted example, in some embodiments, a reusable test head 73 may include one or more pneumatically actuated mechanical fastener mechanisms 126 and/or one or more axial securing (e.g., gripping) mechanisms 127 in addition to one or more inflatable fastener mechanisms 80. As will be described in more detail below, a pneumatically actuated mechanical fastener mechanism 126 may be actuated by pneumatic inflation and/or deflation of a corresponding inflatable fastener mechanism (e.g., bladder) 80 and, thus, implemented within the reusable test head shell 74 along with the inflatable fastener mechanism (e.g., bladder) 80. Additionally, as will be described in more detail below, an axial fastener mechanism 127 may be separately secured to pipe segment tubing and, thus, implemented at least in part external to the reusable test head shell 74. By implementing a reusable test head 73 in this manner, as will be described in more detail below, the reusable test head 73 may be selectively secured to and, thus, used to test annulus (e.g., tubing) integrity of multiple different pipe segments 20, which, at least in some instances, may facilitate improving testing efficiency, for example, by enabling a reduction in the number of test heads 44 used in a testing system 38 and/or during a testing process.

However, it should be appreciated that the depicted example is merely intended to be illustrative and not limiting. In particular, in other embodiments, a reusable test head 73 may not include a pneumatically actuated mechanical fastener mechanisms 126 and/or an axial fastener mechanism 127. Furthermore, in other embodiments, one or more internal sensors 43B may be additionally or alternatively be implemented within the shell 74 of a reusable test head 73.

Figure 7:
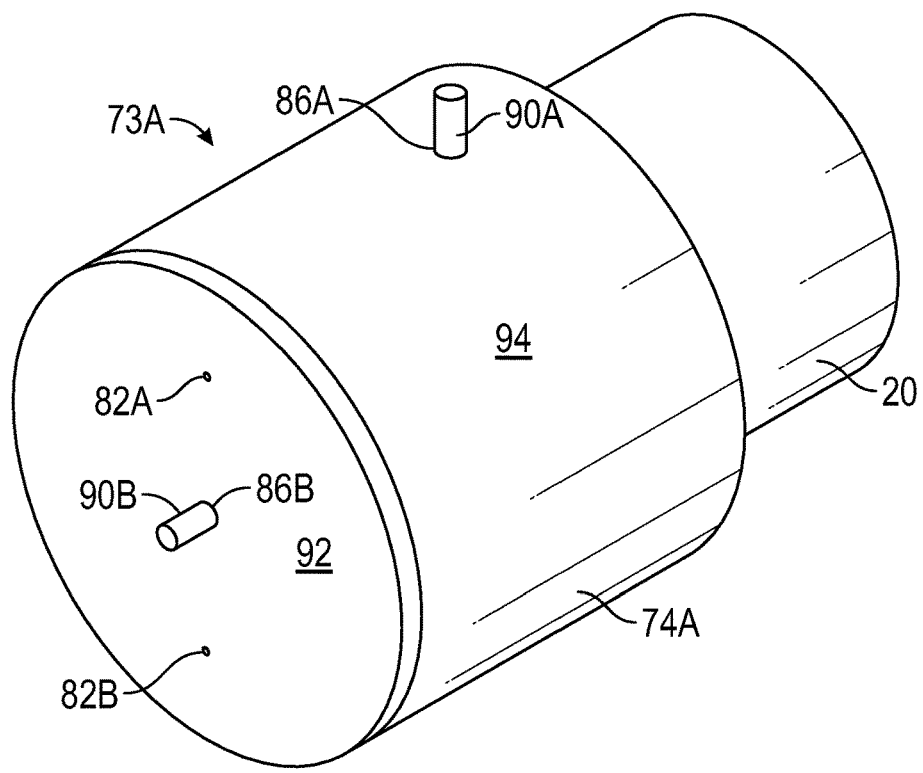
FIG. 7 is a perspective view of an example of the reusable test head of FIG. 6 coupled to the pipe segment of FIG. 2, in accordance with an embodiment of the present disclosure.

To help further illustrate, an example of a reusable test head 73A coupled (e.g., secured) to a pipe segment 20 is shown in FIG. 7. As depicted, the shell 74A of the reusable test head 73A includes an end cap (e.g., wall) 92 and an outer tube 94. Additionally, as depicted, multiple testing ports 82—namely a first testing port 82A and a second testing port 82B—open through the end cap 92. In some embodiments, the first testing port 82A may be fluidly coupled to one or more test fluid sources 42 while the second testing port 82B may be fluidly coupled to one or more external sensors 43A, for example, via one or more test fluid conduits 60 and one or more fluid extraction conduits 84, respectively.

However, it should be appreciated that the depicted example is merely intended to be illustrative and not limiting. In particular, in other embodiments, the shell 74 of a reusable test head 73 may be implemented with a different shape. Additionally or alternatively, in other embodiments, the shell 74 of a reusable test head 73 may include a single testing port 82 or more than two (e.g., three, four, or more) testing ports 82.

In any case, with regard to the depicted example, multiple inflation ports 86—namely a first inflation port 86A and a second inflation port 86B—open through the shell 74A of the reusable test head 73A. In particular, as depicted, the first inflation port 86A opens through the outer tube 94 of the shell 74A to enable a first inflation fluid conduit 90A to extend therethrough. Additionally, as depicted, the second inflation port 86B opens through the end cap 92 of the shell 74A to enable a second inflation fluid conduit 90B to extend therethrough. More specifically, in some embodiments, the first inflation fluid conduit 86A may be fluidly coupled to a first inflatable fastener mechanism 80 implemented within the shell 74A and, thus, used to facilitate controlling inflation of the first inflatable fastener mechanism 80 while the second inflation fluid conduit 86B is fluidly coupled to a second inflatable fastener mechanism 80 implemented within the shell 74A and, thus, used to facilitate controlling inflation of the second inflatable fastener mechanism 80.

Figure 8:
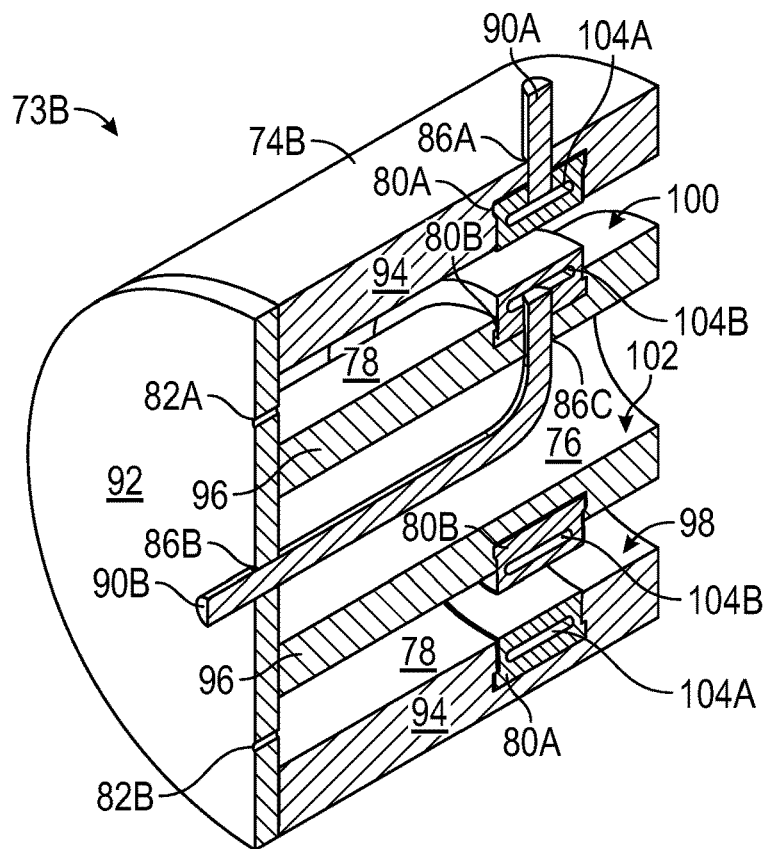
FIG. 8 is a perspective cross-sectional view of an example of the reusable test head of FIG. 7 that includes a bore cavity, in accordance with an embodiment of the present disclosure.

To help illustrate, an example cross-section of a reusable test head 73B is shown in FIG. 8. As depicted, the shell 74B of the reusable test head 73B includes an inner tube 96 in addition to an outer tube 94 and an end cap 92. In some embodiments, the outer tube 94, the inner tube 96, and/or the end cap 92 may initially be discrete (e.g., separate) components and, thus, coupled (e.g., welded) to another discrete component during a shell manufacturing process. In fact, in some such embodiments, the end cap 92 may be selectively disconnected from the outer tube 94 to facilitate improving user access to a corresponding annulus cavity 78, for example, to facilitate dislodging pipe segment tubing 22 secured therein. In other embodiments, the reusable test head shell 74B (e.g., outer tube 94, the inner tube 96, and the end cap 92) may be implemented as a single component, for example, by milling the reusable test head shell 74B from a single block of metal.

As described above, in some embodiments, the shell 74 of a reusable test head 73 may be implemented to define (e.g., enclose) a bore cavity 76 and an annulus (e.g., tubing) cavity 78. To facilitate defining an annulus cavity 78 and a bore cavity 76, in some embodiments, the outer tube 94 and the inner tube 96 of the reusable test head shell 74B may be concentric. In such embodiments, the bore cavity 76 of the reusable test head 73B may be defined by the space within an inner surface (e.g., circumference and/or diameter) 102 of the inner tube 96. Additionally, in such embodiments, the annulus cavity 78 of the reusable test head 73B may be defined by the space between an inner surface 98 of the outer tube 94 and an outer surface (e.g., circumference and/or diameter) 100 of the inner tube 96.

Furthermore, as depicted, the reusable test head 73B includes multiple inflatable fastener mechanisms 80—namely a first inflatable fastener mechanisms 80A and a second inflatable fastener mechanism 80B—in its annulus cavity 78. In particular, as depicted, the first inflatable fastener mechanism 80A runs circumferentially along the inner surface 98 of the outer tube 94 while the second inflatable fastener mechanism 80B runs circumferentially along the outer surface 100 of the inner tube 96. Additionally, as in the depicted example, an inflatable fastener mechanism 80 in the reusable test head 73B may include an inflatable bladder 104. For example, a first inflatable bladder 104A of the first inflatable fastener mechanism 80A may run circumferentially along the inner surface 98 of the outer tube 94 while a second inflatable bladder 104B of the second inflatable fastener mechanism 80B runs circumferentially along the outer surface 100 of the inner tube 96.

Moreover, as depicted, a first inflation fluid conduit 90A that extends through a first inflation port 86A on the reusable test head shell 74B is fluidly coupled to the first inflatable bladder 104A of the first inflatable fastener mechanism 80A and, thus, may be used to facilitate controlling inflation of the first inflatable fastener mechanism 80A. Similarly, as depicted, a second inflation fluid conduit 90B that extends through a second inflation port 86B on the reusable test head shell 74B is fluidly coupled to the second inflatable bladder 104B of the second inflatable fastener mechanism 80B and, thus, may be used to facilitate controlling inflation of the second inflatable fastener mechanism 80B. However, as depicted, the second inflation fluid conduit 90B additionally extends through a third inflation port 86C in the shell 74B (e.g., inner tube 96) of the reusable test head 73B.

Nevertheless, it should again be appreciated that the depicted example is merely intended to be illustrative and not limiting. In particular, in other embodiments, the inflatable bladder 104 of multiple inflatable fastener mechanism 80 may be fluidly coupled to enable inflation of the inflatable fastener mechanism 80 to be relatively concurrently controlled. Additionally or alternatively, in other embodiments, a reusable test head 73 may include a single inflatable fastener mechanism 80 or more than two (e.g., three, four, or more) inflatable fastener mechanisms 80. Furthermore, in other embodiments, a reusable test head 73 may not include a bore cavity 76.

Figure 9:
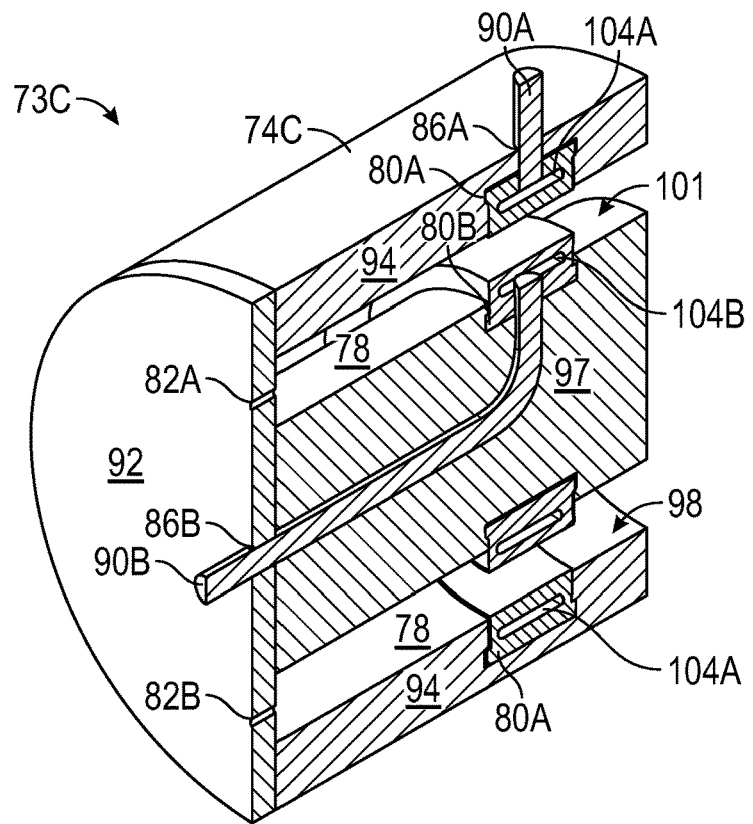
FIG. 9 is a perspective cross-sectional view of another example of the reusable test head of FIG. 7 that does not include a bore cavity, in accordance with an embodiment of the present disclosure.

To help illustrate, another example cross-section of a reusable test head 73C is shown in FIG. 9. As depicted, the shell 74C of the reusable test head 73C includes an outer tube 94, an end cap 92, and an inner cylinder 97, for example, instead of an inner shell tube 96. In some embodiments, the outer tube 94, the inner cylinder 97, and/or the end cap 92 may initially be discrete (e.g., separate) components and, thus, coupled (e.g., welded) to another discrete component during a shell manufacturing process. In fact, in some such embodiments, the end cap 92 may be selectively disconnected from the outer tube 94 to facilitate improving user access to a corresponding annulus cavity 78, for example, to facilitate dislodging pipe segment tubing 22 secured therein. In other embodiments, the reusable test head shell 74C (e.g., outer tube 94, the inner cylinder 96, and the end cap 92) may be implemented as a single component, for example, by milling the reusable test head shell 74C from a single block of metal.

As described above, in some embodiments, the shell 74 of a reusable test head 73 may be implemented to define an annulus (e.g., tubing) cavity 78. To facilitate defining an annulus cavity 78, in some embodiments, the outer tube 94 and the inner cylinder 97 of the reusable test head shell 74C may be concentric. In such embodiments, the annulus cavity 78 of the reusable test head 73C may be defined by the space between an inner surface 98 of the outer tube 94 and an outer surface (e.g., circumference and/or diameter) 101 of the inner cylinder 97.

Moreover, as depicted, a first inflation fluid conduit 90A that extends through a first inflation port 86A on the reusable test head shell 74C is fluidly coupled to the first inflatable bladder 104A of the first inflatable fastener mechanism 80A and, thus, may be used to facilitate controlling inflation of the first inflatable fastener mechanism 80A. Similarly, as depicted, a second inflation fluid conduit 90B that extends through a second inflation port 86B on the reusable test head shell 74C is fluidly coupled to the second inflatable bladder 104B of the second inflatable fastener mechanism 80B and, thus, may be used to facilitate controlling inflation of the second inflatable fastener mechanism 80B. In particular, to facilitate fluidly coupling the second inflation fluid conduit 90B to the second inflatable bladder 104B, as depicted, the second inflation port 86B extends through the end cap 92 as well as the inner cylinder 97 of the reusable test head shell 74C.

However, it should be appreciated that the depicted example is merely intended to be illustrative and not limiting. In particular, in other embodiments, an inflatable fastener mechanism 80 of a reusable test head 73 may include an inflatable bladder 104 implemented with a different shape. Additionally or alternatively, in other embodiments, the shell 74 of a reusable test head 73 may not include an inner shell tube 96 or an inner shell cylinder 97.

Figure 10:
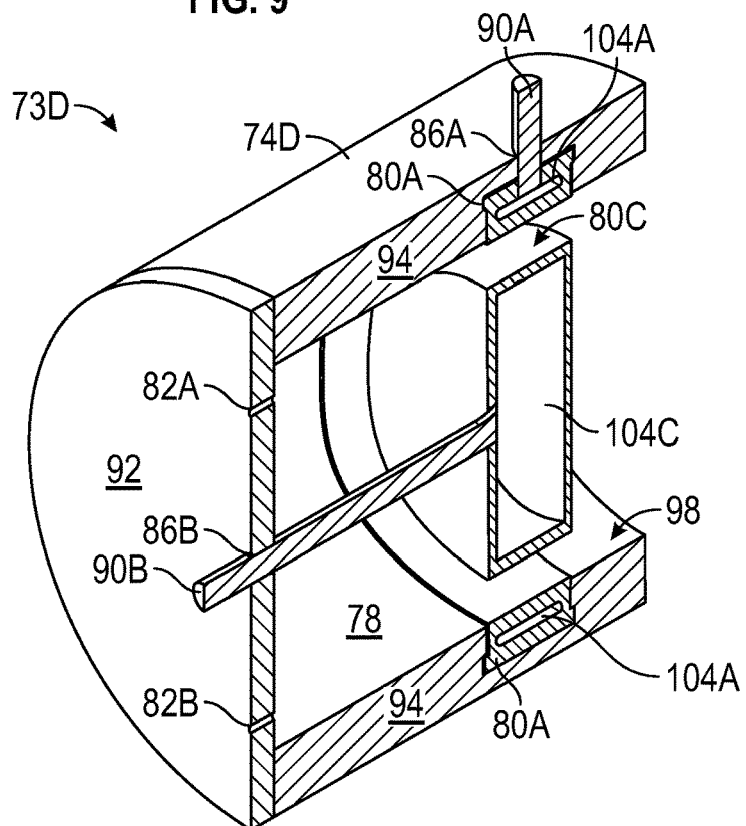
FIG. 10 is a perspective cross-sectional view of another example of the reusable test head of FIG. 7, in accordance with an embodiment of the present disclosure.

To help illustrate, another example cross-section of a reusable test head 73D is shown in FIG. 10. As depicted, the shell 74D of the reusable test head 73D includes an outer tube 94 and an end cap 92, for example, without an inner shell tube 96 or an inner shell cylinder 97. In some embodiments, the outer tube 94 and the end cap 92 may initially be discrete (e.g., separate) components and, thus, coupled (e.g., welded) to together during a shell manufacturing process. In fact, in some such embodiments, the end cap 92 may be selectively disconnected from the outer tube 94 to facilitate improving user access to a corresponding annulus cavity 78, for example, to facilitate dislodging pipe segment tubing 22 secured therein. In other embodiments, the reusable test head shell 74D (e.g., outer tube 94 and the end cap 92) may be implemented as a single component, for example, by milling the reusable test head shell 74D from a single block of metal.

Additionally, as depicted, the reusable test head 73D includes multiple inflatable fastener mechanisms 80—namely an outer (e.g., first) inflatable fastener mechanisms 80A and an inner (e.g., second) inflatable fastener mechanism 80C—in its annulus cavity 78. Furthermore, as depicted, a first inflation fluid conduit 90A that extends through a first inflation port 86A on the reusable test head shell 74D is fluidly coupled to the outer (e.g., first) inflatable bladder 104A of the outer inflatable fastener mechanism 80A and, thus, may be used to facilitate controlling inflation of the outer inflatable fastener mechanism 80A. Similarly, as depicted, a second inflation fluid conduit 90B that extends through a second inflation port 86B on the reusable test head shell 74D is fluidly coupled to an inner (e.g., second) inflatable bladder 104C of the inner inflatable fastener mechanism 80C and, thus, may be used to facilitate controlling inflation of the inner inflatable fastener mechanism 80C. Moreover, as depicted, the outer inflatable bladder 104A of the outer inflatable fastener mechanism 80A runs circumferentially along the inner surface 98 of the outer tube 94 while the inner inflatable bladder 104C of the inner inflatable fastener mechanism 80C floats within the reusable test head shell 74D, for example, with the support of the second inflation fluid conduit 90B.

In any case, as described above, the inflatable bladder 104 of an inflatable fastener mechanism 80 may be implemented using elastic material, such as rubber. As such, when fluid is injected therein, the inflatable bladder may inflate and expand outwardly, thereby increasing the force it exerts on its surroundings. On the other hand, when fluid is extracted therefrom, the inflatable bladder may deflate and contract inwardly, thereby decreasing the force it exerts on its surroundings. In other words, when pipe segment tubing 22 is present in the annulus cavity of a reusable test head 73, an inflatable fastener mechanism 80 may exert more force on the pipe segment tubing 22 when its inflatable bladder 104 is in a more inflated state and less force on the pipe segment tubing 22 when its inflatable bladder 104 is in a less inflated state. Thus, as will be described in more detail below, implementing a reusable test head 73 in this manner may enable the reusable test head 73 to be selectively secured to and, thus, used to test integrity of multiple different pipe segments 20, which, at least in some instances, may facilitate reducing the number of test heads 44 used in a testing system 38 and, thus, improving testing efficiency for a pipeline system 10.

Figure 11:
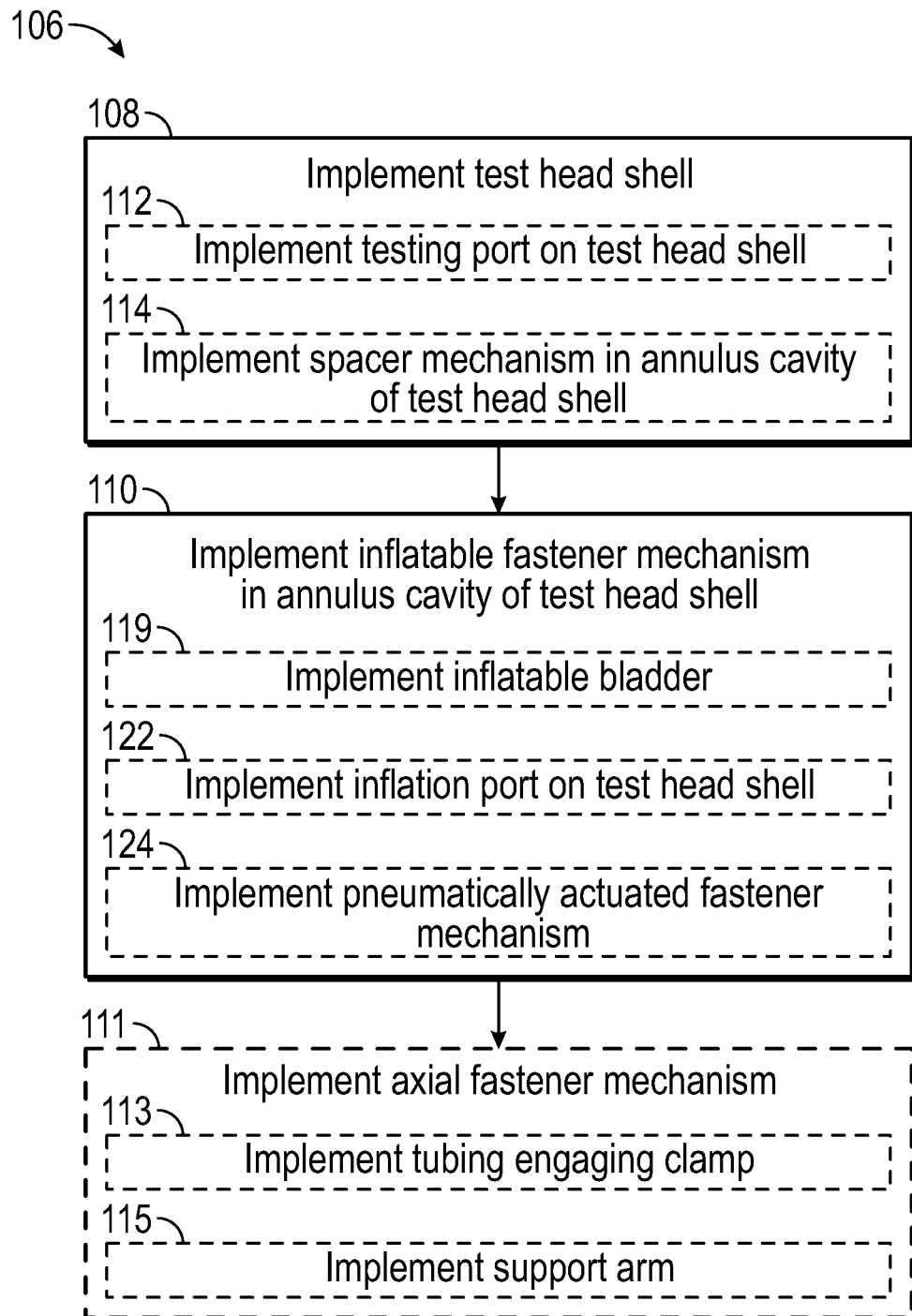
FIG. 11 is a flow diagram of an example of a process for implementing (e.g., manufacturing) the reusable test head of FIG. 6, in accordance with an embodiment of the present disclosure.

To help further illustrate, an example of a process 106 for implementing (e.g., manufacturing) a reusable test head 73 is described in FIG. 11. Generally, the process 106 includes implementing a test head shell (process block 108) and implementing an inflatable fastener mechanism within an annulus cavity of the test head shell (process block 110). Although described in a specific order, which corresponds with an embodiment of the present disclosure, it should be appreciated that the example process 106 is merely intended to be illustrative and non-limiting. In particular, in other embodiments, a process 106 for implementing a reusable test head 73 may include one or more additional process blocks and/or omit one or more of the depicted process blocks. For example, some embodiments of the process 106 additionally includes implementing an axial fastener mechanism (process block 111) while other embodiments of the process 106 do not.

As described above, the shell 74 of a reusable test head 73 may be implemented to define (e.g., enclose) an annulus cavity 78, for example, in addition to a bore cavity 76 (process block 108). To facilitate defining the bore cavity 76, as described above, in some embodiments, a reusable test head shell 74 may include an end cap 92, an outer tube 94, and an inner tube 96 or an inner cylinder. In such embodiments, the annulus cavity 78 may be defined by the space between an inner surface 98 of the outer tube 94 and an outer surface 100 of the inner tube 96 or the space between the inner surface 98 of the outer tube 94 and an outer surface 101 of the inner cylinder 97.

Additionally, as described above, in some embodiments, a reusable test head shell 74 may be implemented as a single component, for example, by milling the reusable test head shell 74 from a single block of metal. In other embodiments, a reusable test head shell 74 may be implemented by combining multiple discrete components. For example, in such embodiments, the reusable test head shell 74 may be implemented at least in part by coupling (e.g., welding) the outer tube 94 and the inner tube 96 or the inner cylinder 97 to the end cap 92. In fact, in some such embodiments, the end cap 92 may be selectively disconnected from the outer tube 94 to facilitate improving user access to a corresponding annulus cavity 78, for example, to facilitate dislodging pipe segment tubing 22 secured therein.

Furthermore, to facilitate testing integrity of pipe segment tubing 22 secured in its annulus cavity 78, as described above, in some embodiments, a reusable test head shell 74 may include a testing port 82 that enables fluid flow into and/or out from the annulus cavity 78 and, thus, a fluid conduit 24 implemented in the annulus 25 of the pipe segment tubing 22. In other words, in such embodiments, implementing a reusable test head shell 74 may include implementing one or more testing ports 82 on the reusable test head shell 74 (process block 112). In particular, in some embodiments, a testing port 82 may be implemented at least in part by forming (e.g., drilling and/or milling) an opening (e.g., hole) in the reusable test head shell 74.

Moreover, to facilitate improving fluid flow between a testing port 82 on a reusable test head shell 74 and a fluid conduit 24 implemented in an intermediate layer 34 of pipe segment tubing 22, in some embodiments, the reusable test head shell 74 may include a spacer mechanism in its annulus cavity 78. In other words, in such embodiments, implementing a reusable test head shell 74 may include implementing one or more spacer mechanism in its annulus cavity 78 (process block 114). In particular, in some embodiments, a spacer mechanism may be a ring with one or more openings disposed in the annulus cavity 78 of a reusable test head shell 74.

Figure 12:
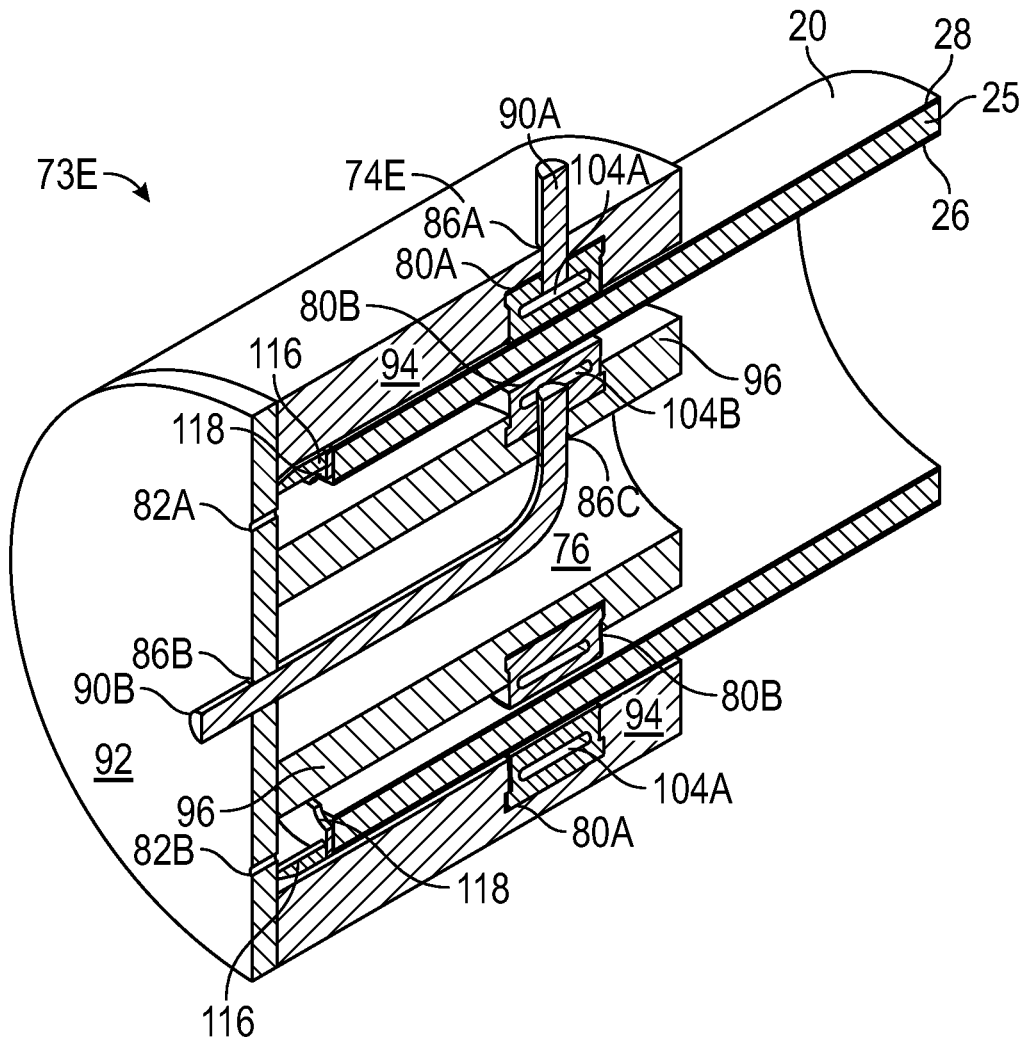
FIG. 12 is perspective cross-sectional view of another example of the reusable test head, which includes a spacer mechanism, and pipe segment of FIG. 7, in accordance with an embodiment of the present disclosure.

To help illustrate, an example cross-section of a reusable test head 73E, which includes a spacer mechanism 116, and a pipe segment 20, which is disposed in an annulus cavity 78 of the reusable test head 73E, is shown in FIG. 12. As depicted, the tubing 22 of the pipe segment 20 includes an inner layer 26, an outer layer 28, and an annulus (e.g., one or more intermediate layers 34) 25. Additionally, as described above, to facilitate testing integrity of pipe segment tubing 22, fluid may be flowed into and/or extracted from a fluid conduit 24 implemented in the annulus 25 of the pipe segment tubing 22 via a testing port 82 on a reusable test head shell 74.

However, at least in some instances, inserting the pipe segment tubing 22 until it directly abuts the end cap 92 of a reusable test head shell 74 may inadvertently impede (e.g., block) a flow path between a testing port 82 on the reusable test head shell 74 and a fluid conduit 24 implemented in the tubing annulus 25. Thus, to facilitate reducing the likelihood of the pipe segment tubing 22 directly abutting the end cap 92, as in the depicted example, the shell 74E of the reusable test head 73E may include a spacer mechanism 116 implemented in its annulus cavity 78. Moreover, to facilitate preserving a flow path between a testing port 82 and a fluid conduit 24 implemented in an intermediate layer 34 of the pipe segment tubing 22, as in the depicted example, the spacer mechanism 116 may include one or more openings 118.

Figure 13:
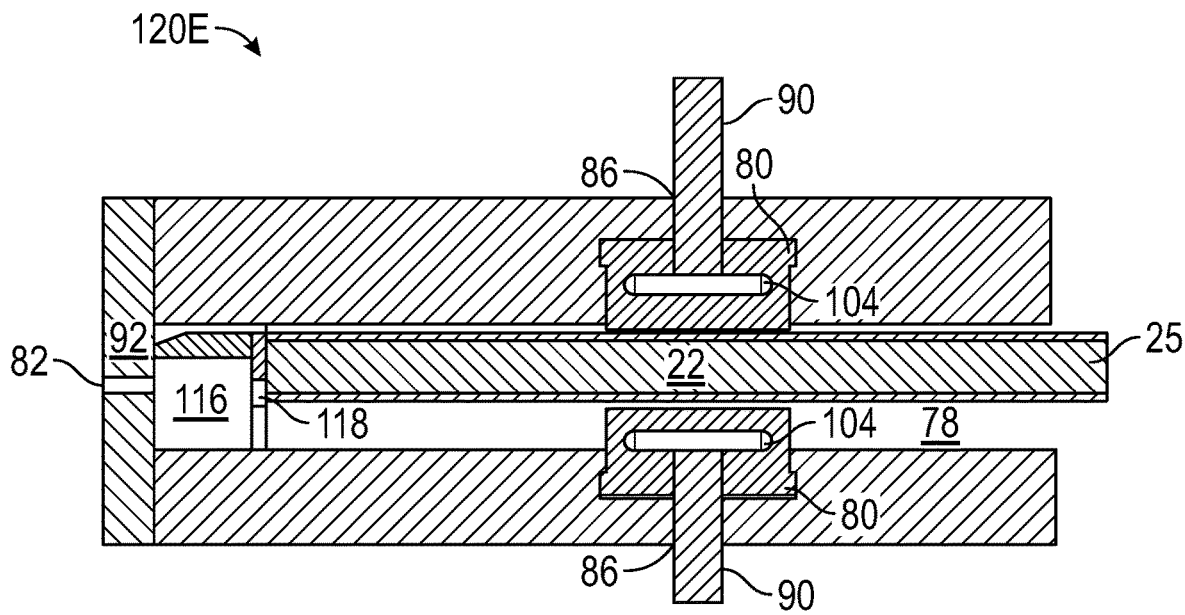
FIG. 13 is a side cross-sectional view of an example of a portion of the reusable test head, which includes axially aligned inflatable fastener mechanisms, and pipe segment of FIG. 7, in accordance with an embodiment of the present disclosure.

To help illustrate, an example cross-section of a portion 120E of a reusable test head 73, which includes a spacer mechanism 116, and pipe segment tubing 22, which is disposed in an annulus cavity 78 of the reusable test head 73, is shown in FIG. 13. As depicted, when the pipe segment tubing 22 is present in the annulus cavity 78, the opening 118 in the spacer mechanism 116 may at least partially align with the annulus 25 of the pipe segment tubing 22 and, thus, a fluid conduit 26 implemented in the tubing annulus 25. As such, the opening 118 in the spacer mechanism 116 may enable fluid to flow into and/or out from a fluid conduit 24 implemented in the tubing annulus 25 even when the pipe segment tubing 22 directly abuts the spacer mechanism 116.

However, it should be appreciated that the depicted example is merely intended to be illustrative and not limiting. In particular, in other embodiments, a spacer mechanism 116 may not be implemented in a reusable test head shell 74. To facilitate preserving a flow path between a testing port 82 on the shell 74 of a reusable test head 73 and a fluid conduit 24 implemented in its tubing annulus 25, in some such embodiments, the pipe segment tubing 22 may nevertheless be secured in the reusable test head 73 such that the pipe segment tubing 22 does not directly abut its end cap 92, for example, by inserting the pipe segment tubing 22 until it directly abuts the end cap 92 and withdrawing the pipe segment tubing 22 some distance before securing the reusable test head 73 to the pipe segment tubing 22. Additionally or alternatively, in other embodiments, a reusable test head shell 74 may include a spacer mechanism 116 as well as an inner shell cylinder 97, for example, instead of an inner shell tube 96. Furthermore, in some embodiments, the end cap 92 may be selectively disconnected facilitate improving user access to the annulus cavity 78, for example, to facilitate dislodging pipe segment tubing 22 secured therein.

Returning to the process 106 of FIG. 11, as described above, one or more inflatable fastener mechanisms 80 may be implemented in the annulus cavity 78 of the reusable test head shell 74 (process block 110). Additionally, as described above, in some embodiments, an inflatable fastener mechanism 80 may include an inflatable bladder 104. Thus, in such embodiments, implementing an inflatable fastener mechanism 80 may include implementing (e.g., disposing and/or attaching) an inflatable bladder 104 in the annulus cavity 78, for example, along an inner surface (e.g., outer surface 100 of inner tube 96) of the annulus cavity 78 and/or an outer surface (e.g., inner surface 98 of outer tube 94) of the annulus cavity 78 (process block 119). To facilitate increasing security strength, in some embodiments, an outer (e.g., contact) surface of an inflatable bladder 104 may be contoured (e.g., rough) and/or coated with a substance that provides a higher coefficient of friction than the base material of the inflatable bladder 104.

Moreover, as in the example portion 120E of FIG. 13, in some embodiments, multiple inflatable fastener mechanisms 80 may be implemented in a reusable test head 73 such that they are axially aligned. However, it should be appreciated that the depicted example is merely intended to be illustrative and not limiting. In particular, in other embodiments, a reusable test head 73 may additionally or alternatively include axially offset (e.g., unaligned) inflatable fastener mechanisms 80.

Figure 14:
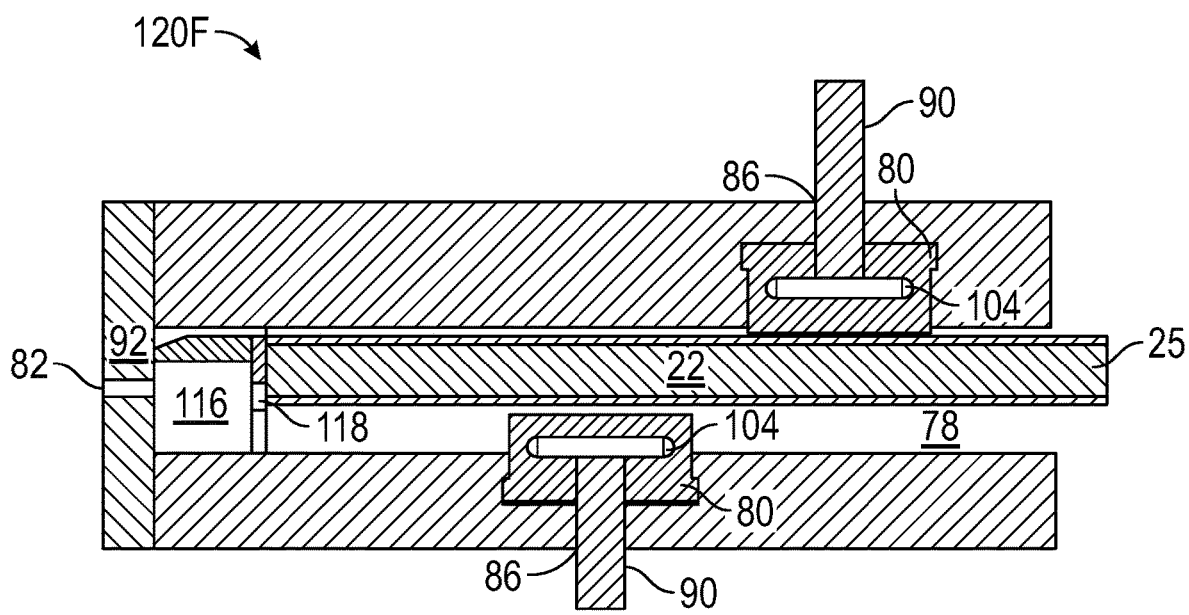
FIG. 14 is a side cross-sectional view of another example of a portion of the reusable test head, which includes axially offset inflatable fastener mechanisms, and pipe segment of FIG. 7, in accordance with an embodiment of the present disclosure.

To help illustrate, another example of a portion 120F of a reusable test head 73, which includes axially offset inflatable fastener mechanisms 80, and pipe segment tubing 22, which is disposed in an annulus cavity 78 of the reusable test head 73, is shown in FIG. 14. However, it should be appreciated that the depicted example is merely intended to be illustrative and not limiting. For example, in some embodiments, the end cap 92 may be selectively disconnected facilitate improving user access to the annulus cavity 78, for example, to facilitate dislodging pipe segment tubing 22 secured therein. Additionally or alternatively, in other embodiments, inflatable fastener mechanisms 80 in a reusable test head 73 may include inflatable bladders 104 with differently sized cross-section profiles.

Figure 15:
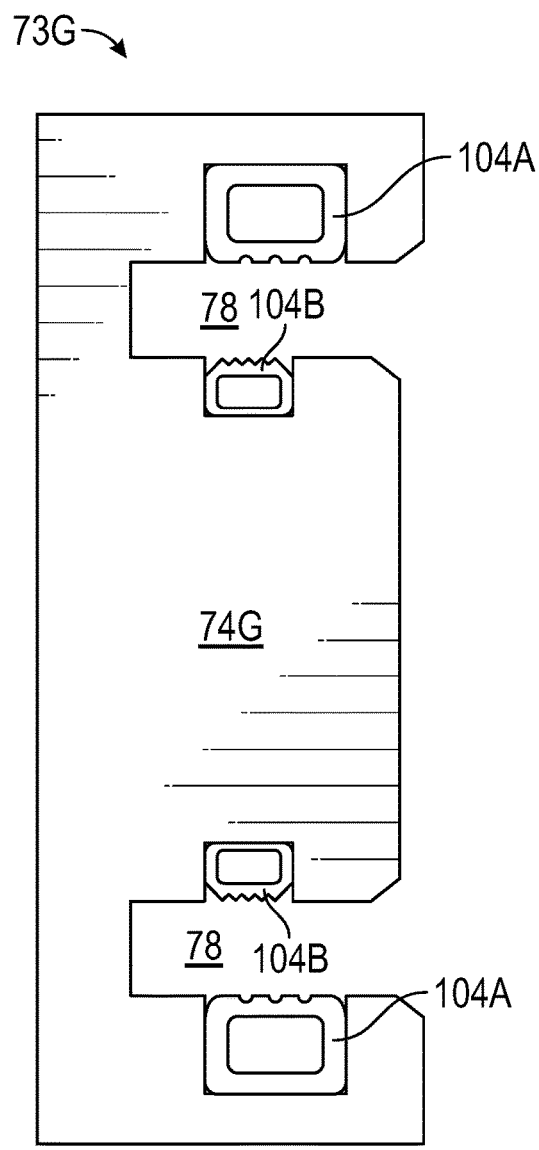
FIG. 15 is a side cross-sectional view of another example of a portion of the reusable test head of FIG. 6 that includes a set of inflatable bladders with different cross-section profiles, in accordance with an embodiment of the present disclosure.

To help illustrate, another example of a reusable test head 73G is shown in FIG. 15. As depicted, the shell 74G of the reusable test head 73G is implemented to define (e.g., enclose) an annulus cavity 78. However, it should be appreciated that the depicted example is merely intended to be illustrative and not limiting. In other particular, in other embodiments, the reusable test head shell 74G may be implemented to additionally define a bore cavity 76.

Additionally, as depicted, the reusable test head 73G includes a first (e.g., outer) inflatable bladder 104A of a first (e.g., outer) inflatable fastener mechanism 80A. Furthermore, as depicted, the reusable test head 73G includes a second (e.g., inner) inflatable bladder 104B of a second (e.g., inner) inflatable fastener mechanism 80B. However, as depicted, the cross-section profile of the first inflatable bladder 104A is larger (e.g., greater) than the cross-section profile of the second inflatable bladder 104B.

Nevertheless, it should again be appreciated that the depicted example is merely intended to be illustrative and not limiting. For example, in other embodiments, the cross-section profile of the second (e.g., inner) inflatable bladder 104B may be larger than the cross-section profile of the first (e.g., outer) inflatable bladder 104A. In fact, in some embodiments, a reusable test head 73 may be implemented to enable an inflatable bladder 104 to be selectively swapped out for another inflatable bladder 104 that has a different cross-section profile, for example, to enable the reusable test head 73 to be secured to and, thus, used to test pipe segments 20 with varying diameters. In other words, in such embodiments, implementing an inflatable bladder 104 in the reusable test head 73 may include selecting an inflatable bladder 104 with a cross-section profile that is expected to be sufficient to secure and/or seal a pipe segment 20 to be tested in the annulus cavity of the reusable test head 73.

Figure 16:
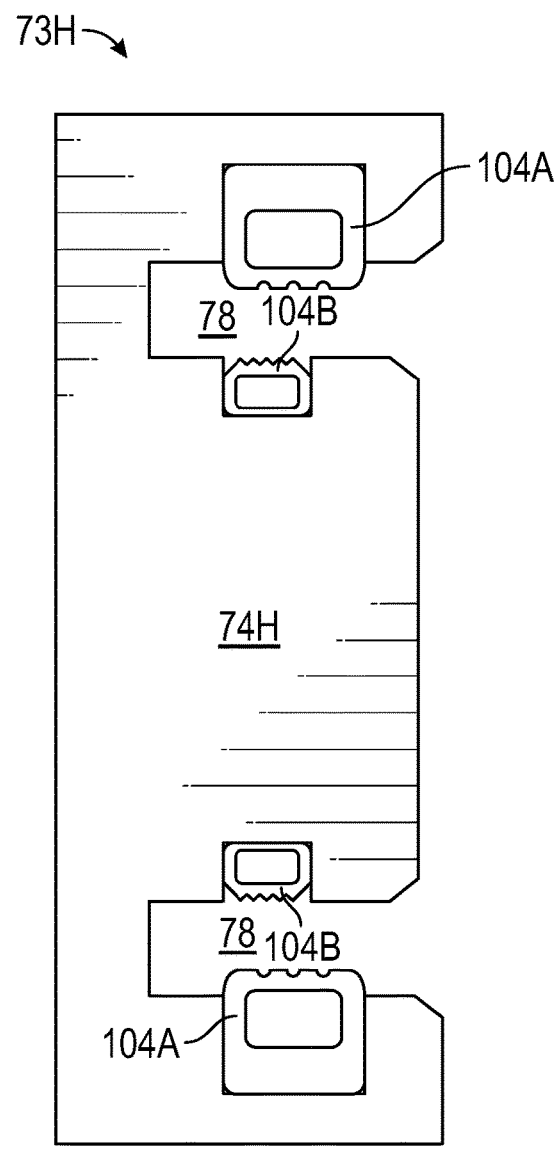
FIG. 16 is a side cross-sectional view of another example of a portion of the reusable test head of FIG. 6 that includes another set of inflatable bladders with different cross-section profiles, in accordance with an embodiment of the present disclosure.

To help illustrate, another example of a reusable test head 73H is shown in FIG. 16. Similar to the reusable test head shell 74G of FIG. 15, the shell 74H of the reusable test head 73H in FIG. 16 is implemented to define (e.g., enclose) an annulus cavity 78. However, it should be appreciated that the depicted example is merely intended to be illustrative and not limiting. In other particular, in other embodiments, the reusable test head shell 74H may be implemented to additionally define a bore cavity 76.

Furthermore, similar to the reusable test head shell 74G of FIG. 15, as depicted, the reusable test head 73H of FIG. 16 includes a first (e.g., outer) inflatable bladder 104A of a first (e.g., outer) inflatable fastener mechanism 80A as well as a second (e.g., inner) inflatable bladder 104B of a second (e.g., inner) inflatable fastener mechanism 80B. However, as depicted, the cross-section profile of the first inflatable bladder 104A in FIG. 16 is larger (e.g., greater and/or taller) than the cross-section profile of the first inflatable bladder 104A in FIG. 15. In particular, as depicted, the first inflatable bladder 104A in FIG. 16 extends (e.g., protrudes) into the annulus cavity 78 more than the first inflatable bladder 104A in FIG. 15.

As such, in some embodiments, the first inflatable bladder 104A of FIG. 15 may be suitable for securing and/or sealing pipe segments 20 with a larger diameter whereas the first inflatable bladder 104A of FIG. 16 is suitable for securing and/or sealing pipe segments 20 with a smaller diameter. In other words, in such embodiments, the first inflatable bladder 104A of FIG. 15 may be swapped out for the first inflatable bladder 104A of FIG. 16 when the reusable test head 73 is to be used to test a pipe segment 20 with the smaller diameter. Additionally or alternatively, the first inflatable bladder 104A of FIG. 16 may be swapped out for the first inflatable bladder 104A of FIG. 15 when the reusable test head 73 is to be used to test a pipe segment 20 with the larger diameter.

However, it should again be appreciated that the depicted example is merely intended to be illustrative and not limiting. In particular, in other embodiments, the second (e.g., inner) inflatable bladder 104B of a reusable test head 73 may additionally or alternatively be selectively swapped out, for example, to facilitate further accounting for variations in pipe segment diameters. In fact, to facilitate selectively (e.g., adaptively) adjusting the amount the inflatable bladder 104 of an inflatable fastener mechanism 80 protrudes into its annulus cavity 78, in some embodiments, the shell 74 of a reusable test head 73 may include a removable end ring, for example, implemented at an open end of the reusable test head 73 that is opposite its end cap 92.

Figure 17:
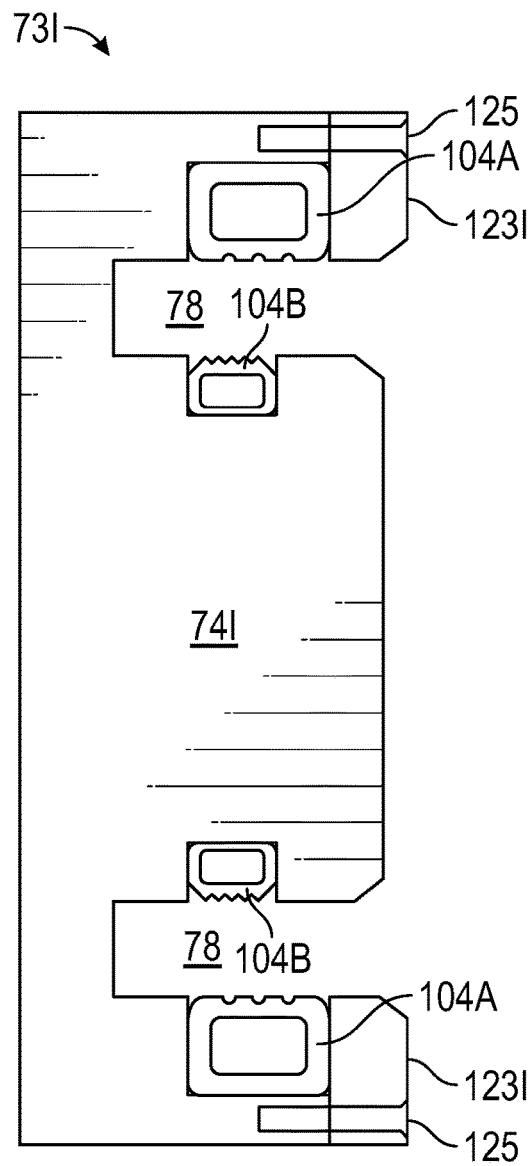
FIG. 17 is a side cross-sectional view of another example of a portion of the reusable test head of FIG. 6 that includes another removable end ring, in accordance with an embodiment of the present disclosure.

To help illustrate, another example of a reusable test head 73I is shown in FIG. 17. Similar to the reusable test head shell 74G of FIG. 15, the shell 74I of the reusable test head 73I in FIG. 17 is implemented to define (e.g., enclose) an annulus cavity 78. However, it should be appreciated that the depicted example is merely intended to be illustrative and not limiting. In other particular, in other embodiments, the reusable test head shell 74I may be implemented to additionally define a bore cavity 76.

Furthermore, similar to the reusable test head shell 74G of FIG. 15, as depicted, the reusable test head 73I of FIG. 17 includes a first (e.g., outer) inflatable bladder 104A of a first (e.g., outer) inflatable fastener mechanism 80A as well as a second (e.g., inner) inflatable bladder 104B of a second (e.g., inner) inflatable fastener mechanism 80B. However, as depicted, the reusable test head 73G of FIG. 17 additionally includes an end ring 123I, which is removably coupled at an open end of the reusable test head 73I. For example, in some embodiments, the end ring 123I may be removably coupled to an outer tube 94 of the reusable test head shell 74I.

To facilitate removably coupling the end ring 123I to the rest of the reusable test head 73I, as in the depicted example, in some embodiments, the reusable test head shell 74I may include one or more threaded openings 125 that extend through the end ring 123I into a directly adjacent portion of the reusable test head shell 74I. For example, in some such embodiments, a first portion of a threaded opening 125 may be implemented in the end ring 123I and a second (e.g., different) portion of the threshold opening 125 may be implemented in an outer tube 94 of the reusable test head shell 74I. As such, inserting a threaded fastener through the first portion of threaded opening 125 in the end ring 123I and at least partially into the second portion of the threaded opening 125 in the outer tube 94 may facilitate securing the end ring 123I to the reusable test head shell 74I.

On the other hand, removing a threaded fastener at least from the second portion of the threaded opening 125 in the outer tube 94 may enable the end ring 123I to be removed from the rest of the reusable test head 73I. As depicted, removing the end ring 123I from the reusable test head 73I of FIG. 17 may facilitate improving access to the first inflatable bladder 104A, for example, compared to the reusable test head 73G of FIG. 15, which limits access to the first inflatable bladder 104A to its annulus cavity 78. Merely as an illustrative non-limiting example, the end ring 123I may be removed from the reusable test head 73I to enable the first inflatable bladder 104A of FIG. 17 to be swapped out for the first inflatable bladder 104A of FIG. 16, which has a larger (e.g., taller) cross-section profile, and reattached to the reusable test head 73I after the swap.

However, it should again be appreciated that the depicted example is merely intended to be illustrative and not limiting. In particular, in other embodiments, a reusable test head 73 may additionally or alternatively include a removable end ring 123 implemented to facilitate selectively swapping out its second (e.g., inner) inflatable bladder 104B. Moreover, to facilitate adaptively adjusting protrusion of an inflatable bladder 104, in some embodiments, a reusable test head 73 may be implemented to enable differently sized and/or differently shaped end rings 123 to be selectively coupled thereto.

Figure 18:
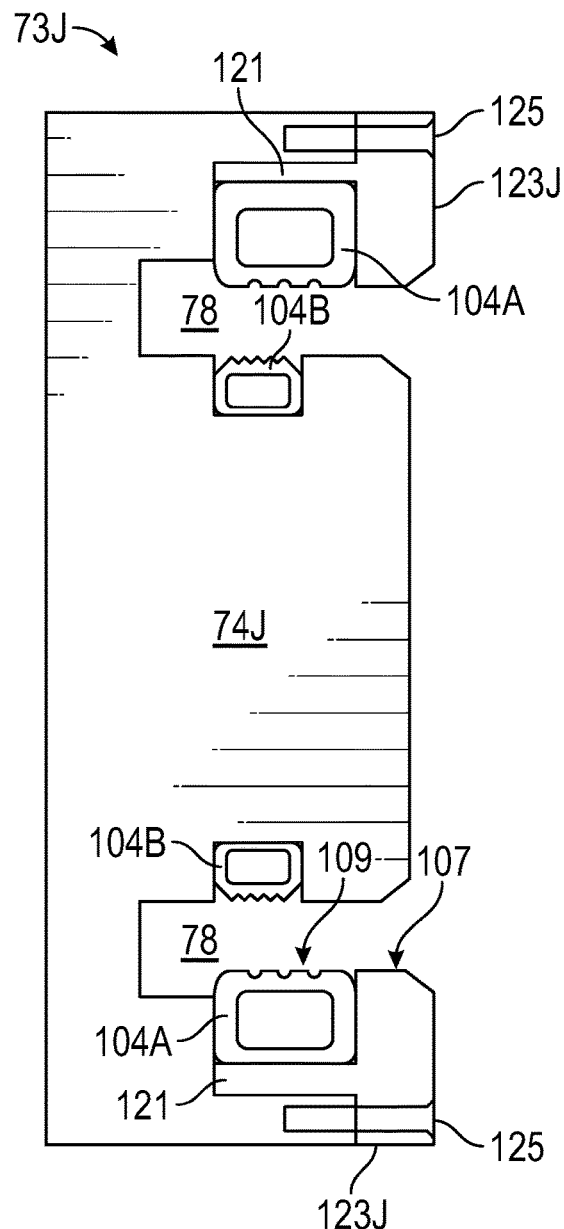
FIG. 18 is a side cross-sectional view of another example of a portion of the reusable test head of FIG. 6 that includes a removable end ring, in accordance with an embodiment of the present disclosure.

To help illustrate, another example of a reusable test head 73J is shown in FIG. 18. Similar to the reusable test head shell 74I of FIG. 17, the shell 74J of the reusable test head 73I in FIG. 18 is implemented to define (e.g., enclose) an annulus cavity 78. However, it should be appreciated that the depicted example is merely intended to be illustrative and not limiting. In particular, in other embodiments, the reusable test head shell 74J may be implemented to additionally define a bore cavity 76.

Furthermore, similar to the reusable test head shell 74I of FIG. 17, as depicted, the reusable test head 73J of FIG. 18 includes a first (e.g., outer) inflatable bladder 104A of a first (e.g., outer) inflatable fastener mechanism 80A as well as a second (e.g., inner) inflatable bladder 104B of a second (e.g., inner) inflatable fastener mechanism 80B. In fact, the cross-section profile of the first inflatable bladder 104A in FIG. 18 may match the cross-section profile of the first inflatable bladder 104A in FIG. 17. Nevertheless, as depicted, the first inflatable bladder 104A in FIG. 18 protrudes farther into the annulus cavity 78 than the first inflatable bladder 104A in FIG. 17.

To facilitate increasing protrusion distance of the first inflatable bladder 104A, as depicted in FIG. 18, a different end ring 123J is utilized in place of the end ring 123I in FIG. 17. In particular, as depicted, the end ring 123J of FIG. 18 additionally includes a spacer component 121 implemented around the first inflatable bladder 104A. Despite the increased protrusion distance, as depicted, an inward-facing surface 107 of the end ring 123J is nevertheless approximately flush with an inward-facing surface 109 of the first inflatable bladder 104A, which, at least in some instances, may facilitate improving securing and/or sealing strength provided by the first inflatable bladder 104A, for example, at least in part by reducing the likelihood that pressure in the annulus cavity 78 extrudes the first inflatable bladder 104A such that its contact with pipe segment tubing 22 in the annulus cavity 78 is disrupted (e.g., broken).

However, it should again be appreciated that the depicted example is merely intended to be illustrative and not limiting. In particular, in other embodiments, corresponding surfaces of an inflatable bladder 104 and an end ring 123 may not be flush. Merely as an illustrative non-limiting example, the end ring 123I of FIG. 17 may also be used with the first inflatable bladder 104A of FIG. 16, which has a larger (e.g., taller) cross-section profile compared to the first inflatable bladder 104A of FIG. 17.

Returning to the process 106 of FIG. 11, as described above, to facilitate controlling inflation of an inflatable fastener mechanism 80 in a reusable test head 73, in some embodiments, its inflatable bladder 104 may be fluidly coupled to an inflation port 86 implemented on the shell 74 of the reusable test head 73 and/or an inflation fluid conduit 90 that extends through the inflation port 86 4. In other words, in such embodiments, implementing an inflatable fastener mechanism 80 may include implementing one or more inflation ports 86 on the reusable test head shell 74 (process block 122). In particular, in some embodiments, an inflation port 86 may be implemented at least in part by forming (e.g., drilling and/or milling) an opening (e.g., hole) in the reusable test head shell 74.

Moreover, as described above, to facilitate improving its security (e.g., holding) strength, in some embodiments, a reusable test head 73 may additionally into one or more mechanical fastener mechanisms that are actuated by an inflatable fastener mechanism 80. In other words, in such embodiments, the process 106 for implementing a reusable test head 73 may additionally include implementing one or more pneumatically actuated mechanical fastener mechanisms 126 (process block 124). In particular, as described above, actuation of a pneumatically actuated mechanical fastener mechanism 126 in a reusable test head 73 may be produced by pneumatic inflation and/or deflation of a corresponding inflatable fastener mechanism 80, for example, as compared to a swaged (e.g., purely mechanical) fastener mechanism that relies at least in part on static deformation of a test head 44.

Figure 19:
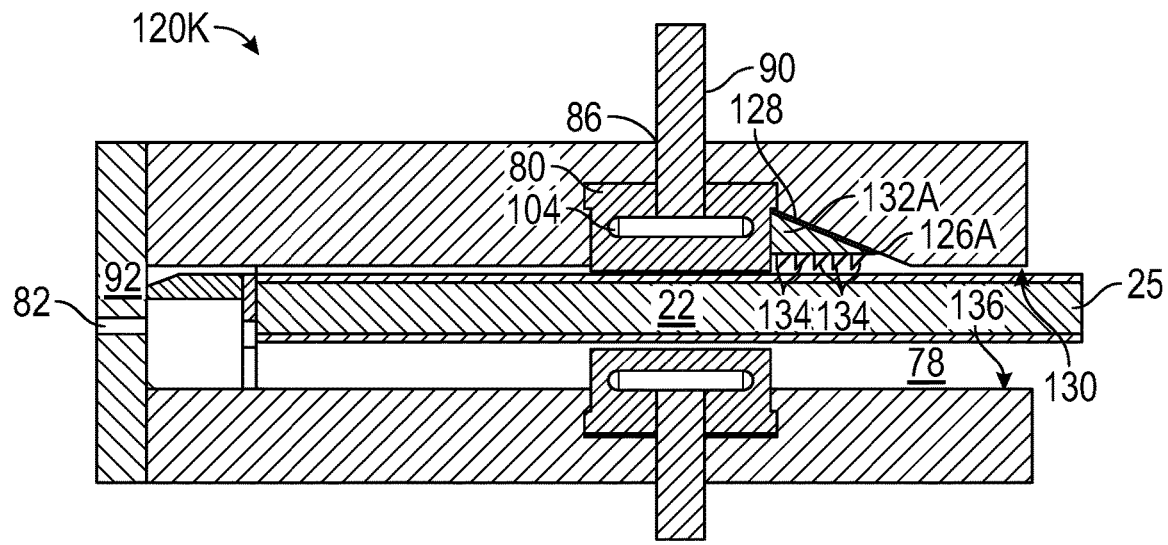
FIG. 19 is a side cross-sectional view of another example of a portion of the reusable test head, which includes a pneumatically actuated mechanical fastener mechanism, and pipe segment of FIG. 7, in accordance with an embodiment of the present disclosure.

To help illustrate, another example cross-section of a portion 120K of a reusable test head 73, which includes a pneumatically actuated mechanical fastener mechanism 126A, and pipe segment tubing 22, which is disposed in an annulus cavity 78 of the reusable test head 73, is shown in FIG. 19 As depicted, a ramp 128 is implemented on a portion of a shell surface 130 that is directly adjacent the annulus cavity 78. In some embodiments, the shell surface 130 on which a ramp 128 is implemented may be an inner surface 98 of an outer shell tube 94 or an outer surface 100 of an inner shell tube 96.

Additionally, as depicted, the pneumatically actuated mechanical fastener mechanism 126A includes a body 132A that is implemented with a (e.g., substantially and/or relatively) wedged cross-sectional profile that interfaces with the ramp 128. In some embodiments, the pneumatically actuated mechanical fastener mechanism 126A may run along the length of a corresponding inflatable bladder 104 and, thus, its body 132A may be a ring. Additionally, as in the depicted example, in some embodiments, a pneumatically actuated mechanical fastener mechanism 126A may include one or more serrations (e.g., teeth) 134 that extend from its body 132A.

In any case, as described above, the inflatable bladder 104 of an inflatable fastener mechanism 80 may generally expand outwardly as its inflation state is pneumatically increased. Thus, at least in some instances, pneumatically increasing inflation of the inflatable bladder 104 adjacent the pneumatically actuated mechanical fastener mechanism 126A may push (e.g., force) the pneumatically actuated mechanical fastener mechanism 126A up the ramp 128. In other words, when pipe segment tubing 22 is disposed in the annulus cavity 78, pneumatically increasing inflation of the inflatable bladder 104 may move the pneumatically actuated mechanical fastener mechanism 126A toward the pipe segment tubing 22, for example, such that one or more of its serrations 134 and/or its body 132A engages the pipe segment tubing 22.

On the other hand, as described above, the inflatable bladder 104 of an inflatable fastener mechanism 80 may generally contract inwardly as its inflation state is pneumatically decreased (e.g., deflated). Thus, at least in some instances, pneumatically decreasing inflation of the inflatable bladder 104 adjacent the pneumatically actuated mechanical fastener mechanism 126A may enable the pneumatically actuated mechanical fastener mechanism 126A to move back down the ramp 128, for example, due to material spring-back and/or with the assistance of gravity. In other words, when pipe segment tubing 22 is disposed in the annulus cavity 78, pneumatically decreasing inflation of the inflatable bladder 104 may result in the pneumatically actuated mechanical fastener mechanism 126A moving away from the pipe segment tubing 22, for example, such that one or more of its serrations 134 and/or its body 132A disengages the pipe segment tubing 22.

Accordingly, in some embodiments, implementing a pneumatically actuated mechanical fastener mechanism 126, such as the pneumatically actuated mechanical fastener mechanism 126A of FIG. 19, in a reusable test head 73 may include forming a body 132A of the pneumatically actuated mechanical fastener mechanism 126 such that it has a (e.g., substantially) triangular cross-sectional profile, for example, in addition to one or more serrations 134 that extend therefrom. In such embodiments, implementing the pneumatically actuated mechanical fastener mechanism 126 may additionally include forming a ramp 128 along a portion of a shell surface 130, which is directly adjacent to the inflatable bladder 104 of a corresponding inflatable fastener mechanism 80 and the annulus cavity 78 of the reusable test head 73. The body 132A of the pneumatically actuated mechanical fastener mechanism 126 may then be disposed in the annulus cavity 78 such that it interfaces (e.g., slidably contacts) with the ramp 128.

However, it should be appreciated that the depicted example is merely intended to be illustrative and not limiting. In particular, although multiple inflatable fastener mechanisms 80 are depicted, in other embodiments, a reusable test head 73 may include fewer (e.g., one) or more (e.g., three, four, or more) inflatable fastener mechanisms 80. Additionally or alternatively, although a single pneumatically actuated mechanical fastener mechanism 126A is depicted, in other embodiments, a reusable test head 73 may include multiple pneumatically actuated mechanical fastener mechanism 126A, for example, including another pneumatically actuated mechanical fastener mechanism 126A that is disposed in a ramp 128 implemented on another (e.g., opposite) shell surface 136 of the reusable test head 73. Furthermore, in some embodiments, the end cap 92 may be selectively disconnected facilitate improving user access to the annulus cavity 78, for example, to facilitate dislodging pipe segment tubing 22 secured therein. Moreover, in other embodiments, a reusable test head 73 may additionally or alternatively include one or more other types of pneumatically actuated mechanical fastener mechanisms 126.

Figure 20:
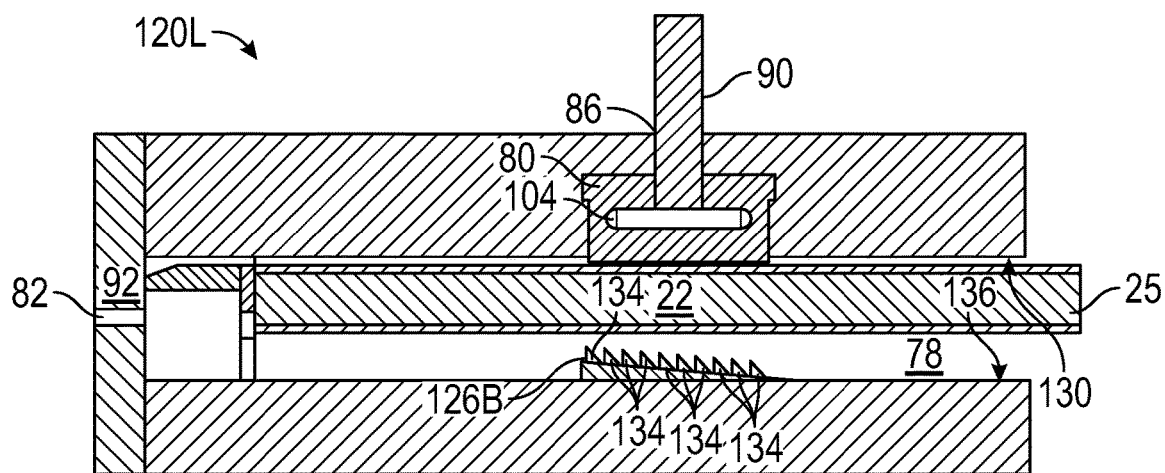
FIG. 20 is a side cross-sectional view of another example of a portion of the reusable test head, which includes another pneumatically actuated mechanical fastener mechanism, and pipe segment of FIG. 7, in accordance with an embodiment of the present disclosure.

To help illustrate, another example cross-section of a portion 120L of a reusable test head 73, which includes a pneumatically actuated mechanical fastener mechanism 126B, and pipe segment tubing 22, which is disposed in an annulus cavity 78 of the reusable test head 73, is shown in FIG. 20. As depicted, the pneumatically actuated mechanical fastener mechanism 126B includes one or more serrations (e.g., teeth) 134 that extend into the annulus cavity 78. Additionally, as depicted, an inflatable fastener mechanism 80 is implemented along a shell surface 130 of the reusable test head 73 and the pneumatically actuated mechanical fastener mechanism 126B is implemented along another (e.g., opposite) shell surface 136 of the reusable test head 73. In other words, in some embodiments, implementing a pneumatically actuated mechanical fastener mechanism 126, such as the pneumatically actuated mechanical fastener mechanism 126B of FIG. 20, may include implementing one or more serrations (e.g., teeth) 134 on a surface of a reusable test head shell 74 that is opposite a surface of the reusable test head shell 74 on which a corresponding inflatable fastener mechanism 80 is implemented.

When implemented in this manner, pneumatically increasing inflation of the inflatable fastener mechanism 80 may generally result in its inflatable bladder 104 expanding outwardly toward the pneumatically actuated mechanical fastener mechanism 126B. In other words, when pipe segment tubing 22 is disposed in the annulus cavity 78, pneumatically increasing inflation of the inflatable bladder 104 may push the pipe segment tubing 22 toward the pneumatically actuated mechanical fastener mechanism 126B, for example, such that the pipe segment tubing 22 engages one or more serrations 134 of the pneumatically actuated mechanical fastener mechanism 126B. On the other hand, pneumatically decreasing inflation of the inflatable fastener mechanism 80 may result in its inflatable bladder 104 contracting inwardly away from the pneumatically actuated mechanical fastener mechanism 126B. In other words, when pipe segment tubing 22 is disposed in the annulus cavity 78, pneumatically decreasing inflation of the inflatable bladder 104 may enable the pipe segment tubing 22 to move away from the pneumatically actuated mechanical fastener mechanism 126B, for example, such that the pipe segment tubing 22 disengages one or more serrations 134 of the pneumatically actuated mechanical fastener mechanism 126B due to material spring-back and/or with the assistance of external force, such as gravity.

However, it should be appreciated that the depicted example is merely intended to be illustrative and not limiting. In particular, although a single pneumatically actuated mechanical fastener mechanism 126B is depicted, in other embodiments, multiple pneumatically actuated mechanical fastener mechanism 126B may be implemented in a reusable test head 73. Additionally, in some embodiments, a reusable test head 73 may include the pneumatically actuated mechanical fastener mechanisms 126B of FIG. 20 as well as the pneumatically actuated mechanical fastener mechanisms 126A of FIG. 19. Furthermore, in other embodiments, a reusable test head 73 may include an inflatable fastener mechanism 80, but not a pneumatically actuated mechanical fastener mechanism 126. Additionally or alternatively, in some embodiments, the end cap 92 may be selectively disconnected facilitate improving user access to the annulus cavity 78, for example, to facilitate dislodging pipe segment tubing 22 secured therein. Moreover, as described above, in some embodiments, a reusable test head 73 may additionally include an axial fastener mechanism 127. Thus, in such embodiments, implementing the reusable test head 73 may additionally include implementing one or more axial fastener mechanisms 127 (process block 111).

Figure 21:
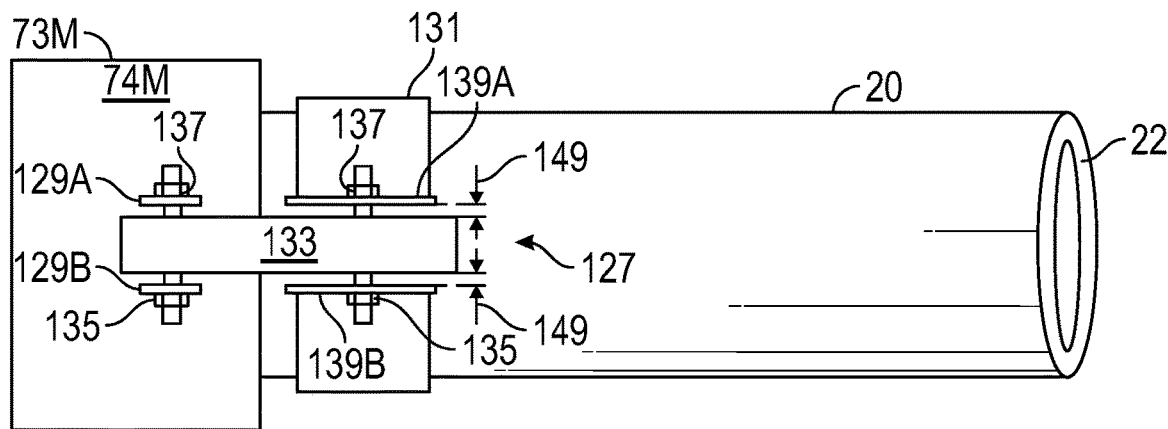
FIG. 21 is side view of another example of the reusable test head of FIG. 6, which includes an axial fastener mechanism, coupled to a pipe segment, in accordance with an embodiment of the present disclosure.

To help illustrate, another example of a reusable test head 73M, which includes an axial fastener mechanism 127, coupled (e.g., secured) to a pipe segment 20 is shown in FIG. 21. As depicted, the shell 74M of the reusable test head 73M includes multiple shell flanges 129—namely a first shell flange 129A and a second shell flange 129B—that extend therefrom. Additionally, as depicted, the axial fastener mechanism 127 includes a tubing engaging component—namely a tubing engaging clamp 131—and a support arm 133, which is coupled to the reusable test head shell 74M and the tubing engaging clamp 131.

Thus, returning to the process 106 of FIG. 11, in some embodiments, implementing an axial fastener mechanism 127 may include implementing one or more tubing engaging components, such as a tubing engaging clamp 131, (process block 113) and implementing one or more support arms 133 (process block 115). As in the example reusable test head 73M of FIG. 21, in some embodiments, a tubing engaging clamp 131 may be coupled to a support arm 133 via one or more nut 135 and bolt 137 pairs. For example, a bolt 137 may extend through an opening (e.g., hole) in a first clamp flange 139A, an opening in the support arm 133, and an opening in a second clamp flange 139B.

As such, tightening a nut 135 on a threaded end of the bolt 137 may pull the second clamp flange 139B toward the first clamp flange 139A. In other words, tightening the nut 135 may pull the tubing engaging clamp 131 inwardly, for example, such that an inner surface of the tubing engaging clamp 131 engages (e.g., grips and/or squeezes) the outer surface of pipe segment tubing 22 present therein and, thus, resists movement of the pipe segment tubing 22. On the other hand, loosening the nut 135 may enable the second clamp flange 139B to move away from the first clamp flange 139A and, thus, the tubing engaging clamp 131 to expand outwardly, for example, such that an inner surface of the tubing engaging clamp 131 disengages the outer surface of pipe segment tubing 22 present therein.

Figure 22:
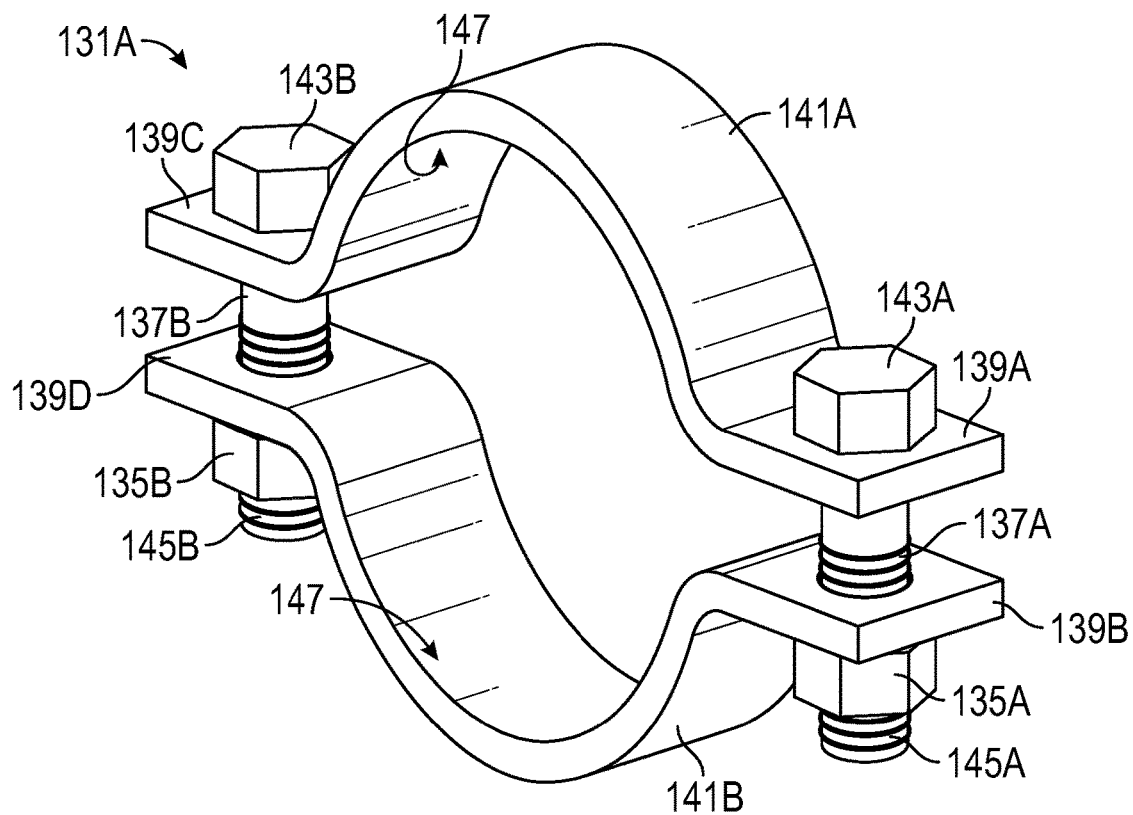
FIG. 22 is a perspective view of an example of an axial fastener clamp included in the axial fastener mechanism of FIG. 21, in accordance with an embodiment of the present disclosure.

To help further illustrate, an example of a tubing engaging clamp 131A, which may be included in an axial fastener mechanism 127 of a reusable test head 73, is shown in FIG. 22. As depicted, the tubing engaging clamp 131A includes multiple clamp segments 141—namely a first clamp segment (e.g., halve) 141A, which has a first clamp flange 139A that extends out from its body, and a second clamp segment (e.g., halve) 141B, which has a second clamp flange 139B that extends out from its body. In other words, in some embodiments, implementing a tubing engaging clamp 131 may include implementing one or more clamp segments 141.

Furthermore, as depicted, the first clamp segment 141A includes a third clamp flange 139C in addition to the first clamp flange 139A and the second clamp segment 141B includes a fourth clamp flange 139D in addition to the second clamp flange 139B. In other words, in some embodiments, implementing a clamp segment 141 of a tubing engaging clamp 131 may include implementing one or more clamp flanges 139 that extend out from its body. Moreover, as depicted, a first bolt 137A extends through an opening (e.g., hole) in the first clamp flange 139A of the first clamp segment 141A and an opening in the second clamp flange 139B of the second clamp segment 141B while a second bolt 137B extends through an opening in the third clamp flange 139C of the first clamp segment 141C and an opening in the fourth clamp flange 139D of the second clamp segment 141B. As such, in some embodiments, implementing a clamp segment 141 may include implementing (e.g., drilling and/or milling) one or more openings in one or more of its clamp flanges 139.

In particular, as depicted, the first bolt 137A extends through the first clamp flange 139A of the first clamp segment 141A and the second clamp flange 139B of the second claim segment 141B such that its head—namely a first bolt head 143A—is on an outward-facing side of the first clamp flange 139A and at least a threaded portion of its shank (e.g., shaft)—namely a first bolt shank 145A—is on an outward-facing side of the second clamp flange 139B. Similarly, as depicted, the second bolt 137B extends through the third clamp flange 139C of the first clamp segment 141A and the fourth clamp flange 139D of the second claim segment 141B such that its head—namely a second bolt head 143B—is on an outward-facing side of the third clamp flange 139C and at least a threaded portion of its shank—namely a second bolt shank 145B—is on an outward-facing side of the fourth clamp flange 139D. As such, tightening a first nut 139A on a threaded end of the first bolt shank 145A and/or tightening a second nut 135B on a threaded end of the second bolt shank 145B may pull (e.g., force) an inner surface 147 of the second clamp segment 141B toward an inner surface 147 of the first clamp segment 141A.

In other words, when a pipe segment 20 is present therein, tightening a nut 135 on a threaded end of a bolt shank 145 that extends through a clamp flange 139 of a tubing engaging clamp 131A may compress an inner surface 147 of the tubing engaging clamp 131 inwardly around the tubing 22 of the pipe segment 20, for example, such that the inner surface 147 of the tubing engaging clamp 131 grips (e.g., engages) an outer surface of the pipe segment tubing 22 and, thus, resists movement of the pipe segment tubing 22. In fact, to facilitate improving its grip strength, in some embodiments, an inner surface 147 of a tubing engaging clamp 131 may be contoured (e.g., rough) and/or coated with a substance that provides a higher coefficient of friction than the base material of the tubing engaging clamp 131. On the other hand, loosening the nut 135 on the threaded end of the bolt shank 145 may enable the inner surface 147 of the tubing engaging clamp 131 to expand outwardly, for example, due to gravity, material spring-back of the tubing engaging clamp 131, and/or material spring-back of the pipe segment tubing 22 such that the inner surface 147 of the tubing engaging clamp 131 disengages the outer surface of the pipe segment tubing 22.

However, it should be appreciated that the depicted example is merely intended to illustrative and not limiting.

In particular, in other embodiments, multiple nut 135 and bolt 137 pairs may be coupled through a clamp flange 139. Additionally or alternatively, in other embodiments, a tubing engaging clamp 131 may be implemented using more than two (e.g., three, four, or more) clamp segments 141A or a single clamp segment 141, such as a C-shaped clamp segment 141. Furthermore, in other embodiments, an axial fastener mechanism 127 may include and/or utilize other types of threaded fasteners. Moreover, as described above, to facilitate securing a tubing engaging clamp 131 to the shell 74 of a reusable test head 73, one or more support arms 133 may be coupled between pairs of clamp flanges 139. In other words, with regard to the example tubing engaging clamp 131A of FIG. 22, a first support arm 133 may be coupled between the first clamp flange 139A and the second clamp flange 139B while a second support arm 133 may be coupled between the third clamp flange 139C and the fourth clamp flange 139D.

In fact, as in the example reusable test head 73M of FIG. 21, in some embodiments, a tubing engaging clamp 131 and a corresponding support arm 133 may be implemented such that space 149 is left between its clamp flanges 139 and the support arm 133 even after an inner surface of the tubing engaging clamp 131 initially contacts the outer surface of pipe segment tubing 22. In other words, in such embodiments, the remaining space 149 may enable the tubing engaging clamp 131 to be further compressed even after it initially contacts the pipe segment tubing 22, which, at least in some instances, may facilitate increasing its grip strength. Moreover, as described above, to facilitate further improving its grip strength, in some embodiments, an inner surface 147 of a tubing engaging clamp 131 may additionally or alternatively be contoured (e.g., rough) and/or coated with a substance that provides a higher coefficient of friction than the base material of the tubing engaging clamp 131.

Furthermore, as described above, a tubing engaging clamp 131 may be secured to the shell 74 of a reusable test head 73 via a corresponding support arm 133. In some embodiments, as in the example reusable test head 73M of FIG. 21, a support arm 133 of an axial fastener mechanism 127 may be a discrete component separate from the reusable test head shell 74M. Thus, as depicted, the support arm 133 is secured to the reusable test head shell 74M via a bolt 137, which extends through an opening in its first shell flange 129A, an opening in the support arm 133, and an opening in its second shell flange 129B, and a nut 135 coupled to a threaded end of the bolt 137. In other words, in such embodiments, an axial fastener mechanism 127 may be anchored (e.g., secured) to a reusable test head shell 74 via a shell flange 129 that extends therefrom and, thus, implementing the reusable test head shell 74 may include implementing one or more anchor components, such as a shell flange 129, thereon.

However, it should be appreciated that the depicted example is merely intended to be illustrative and not limiting. In particular, in other embodiments, an axial fastener mechanism 127 of a reusable test head 73 may include multiple tubing engaging clamps 131. Additionally or alternatively, in other embodiments, a support arm 133 of an axial fastener mechanism 127 may be secured to a shell flange 129 using multiple (e.g., two or more) nut 135 and bolt 137 pairs. Furthermore, in other embodiments, a support arm 133 of an axial fastener mechanism 127 may directly be implemented (e.g., integrated) as part of a reusable test head shell 74.

Figure 23:
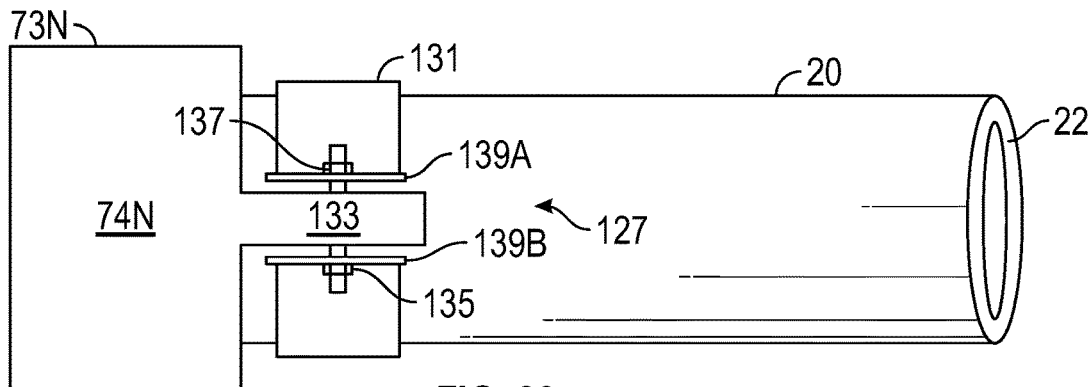
FIG. 23 is a side view of another example of the reusable test of FIG. 6, which includes another axial fastener mechanism, coupled to a pipe segment, in accordance with an embodiment of the present disclosure.

To help illustrate, another example of a reusable test head 73N, which includes an axial fastener mechanism 127, coupled (e.g., secured) to a pipe segment 20 is shown in FIG. 23. As depicted, a support arm 133 of the axial fastener mechanism 127 is integrated as part of the shell 74N of the reusable test head 73N. For example, in some embodiments, the support arm 133 may be integrated with and extend from an outer tube 94 of the reusable test head shell 74N. Accordingly, as depicted, one or more shell flanges 129 may be obviated and, thus, not implemented on the reusable test head shell 74N.

In any case, as described above, implementing one or more axial fastener mechanisms 127 in a reusable test head 73 may facilitate securing pipe segment tubing 22 and, thus, its tubing annulus 25 in the annulus cavity 78 of the reusable test head 73, for example, at least in part by increasing the resistance (e.g., force) the reusable test head 73 exerts against movement (e.g., axial movement) of the pipe segment tubing 22. In other words, in some embodiments, an axial fastener mechanism 127 of a reusable test head 73 may be implemented and/or operated to supplement the security provided by one or more inflatable fastener mechanisms 80 of the reusable test head 73. In any case, as described above, implementing a reusable test head 73 with one or more inflatable fastener mechanisms 80 may enable the reusable test head 73 to be selectively secured to and, thus, used to facilitate testing integrity of multiple different pipe segments 20, which, at least in some instances, may facilitate improving testing efficiency for a pipeline system 10 in which the pipe segments 20 are or are to be deployed.

Figure 24:
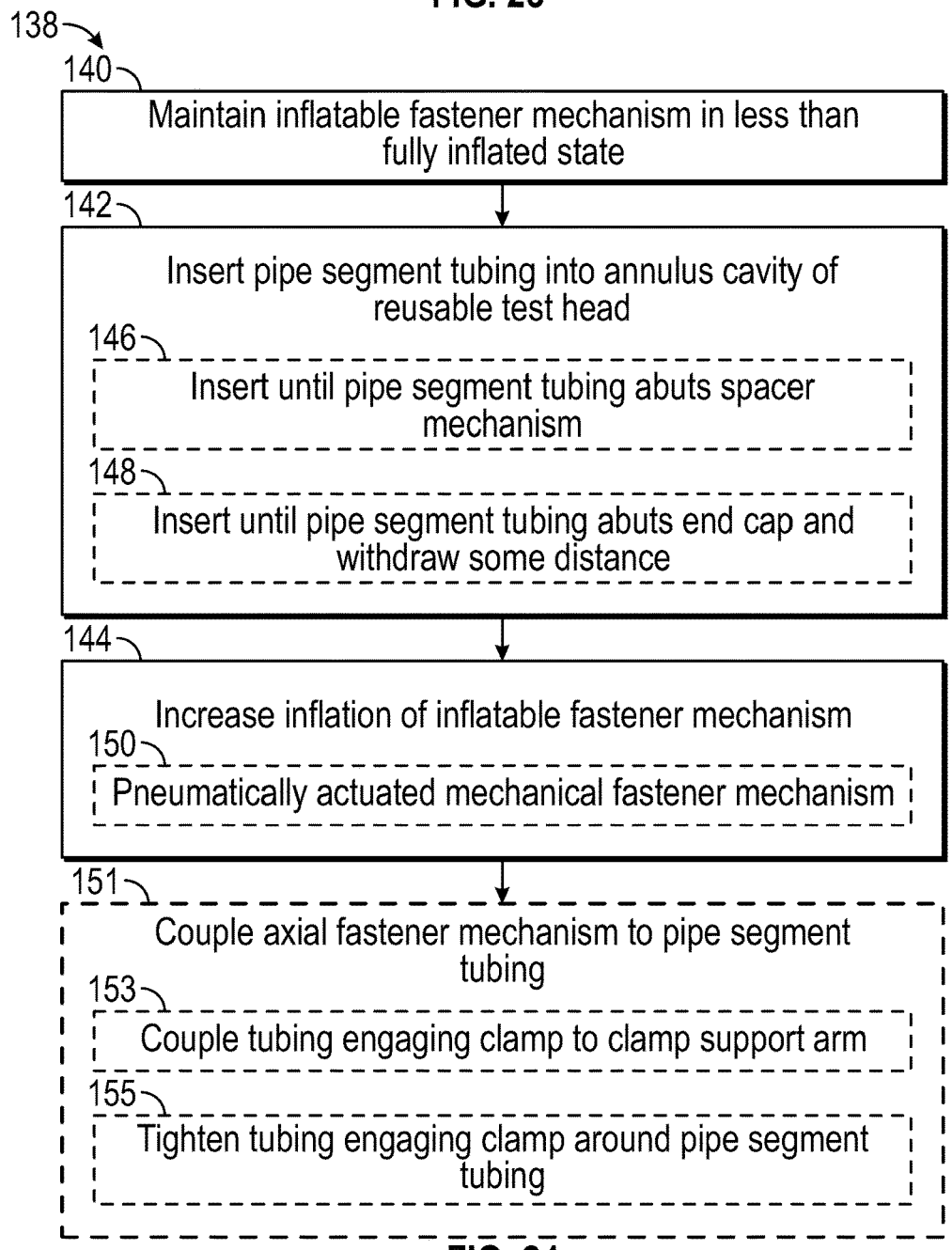
FIG. 24 is a flow diagram of an example process for deploying the reusable test head of FIG. 6 on a pipe segment, in accordance with an embodiment of the present disclosure.

To help illustrate, an example of a process 138 for selectively securing a reusable test head 73 to a pipe segment 20 is described in FIG. 24. Generally, the process 138 includes maintaining an inflatable fastener mechanism in a less than fully inflated state (process block 140) and inserting pipe segment tubing into an annulus cavity of a reusable test head (process block 142). Additionally, the process 138 includes increasing inflation of the inflatable fastener mechanism (process block 144).

Although described in a specific order, which corresponds with an embodiment of the present disclosure, it should be appreciated that the example process 138 is merely intended to be illustrative and non-limiting. In particular, in other embodiments, a process 138 for selectively securing a reusable test head 73 to a pipe segment 20 may include one or more additional process blocks and/or omit one or more of the depicted process blocks. For example, some embodiments of the process 138 may additionally include coupling an axial fastener mechanism to pipe segment tubing (process block 151) while other embodiments of the process 138 do not. Moreover, in some embodiments, the process 138 may be performed at least in part by executing instructions stored in a tangible, non-transitory, computer-readable medium, such as memory 52 in a testing device 40, using processing circuitry, such as a processor 50 in the testing device 40.

For example, in some such embodiments, a testing device 40 in a testing system 38 may instruct the testing system 38 to maintain an inflatable fastener mechanism (e.g., bladder) 80 of a reusable test head 73 in a less than fully inflated state (process block 140). As described above, in some embodiments, an inflatable fastener mechanism 80 may include an inflatable bladder 104 that is fluidly coupled to an inflation port 86 on a reusable test head shell 74 and/or an inflation fluid conduit 90 that extends through the inflation port 86. Additionally, as described above, in some embodiments, an inflation port 86 on a reusable test head shell 74 and/or an inflation fluid conduit 90 that extends therethrough may be fluidly coupled to one or more inflation fluid sources 88.

Thus, to facilitate maintaining an inflatable fastener mechanism 80 in a less than fully inflated state, in such embodiments, a testing device 40 may selectively instruct an inflation fluid source 88 in the testing system 38 to inject inflation fluid into and/or extract inflation fluid out from the inflatable bladder 104 of the inflatable fastener mechanism 80. Additionally or alternatively, the testing device 40 may selectively instruct the testing system 38 to release inflation fluid from the inflatable bladder 104, for example, into its external environment. In other embodiments, an operator (e.g., user) may manually control inflation of an inflatable fastener mechanism 80, for example, by selectively turning on an inflation fluid pump and/or adjusting valve position of a value fluidly coupled to the inflatable fastener mechanism 80.

Furthermore, in some embodiments, the less than fully inflated state of the inflatable fastener mechanism 80 may be a fully deflated state. In other embodiments, the less than fully inflated state of the inflatable fastener mechanism 80 may be a partially inflated state. In any case, as described above, the size of the inflatable bladder 104 of an inflatable fastener mechanism 80 and, thus, the force it exerts on its surroundings generally varies with its inflation state. In other words, an inflatable fastener mechanism 80 in the reusable test head 73 may exert less resistance against movement in the annulus cavity 78 while in a less inflated state and more resistance against movement in the annulus cavity 78 while in a more (e.g., fully) inflated state.

As such, the tubing 22 of a pipe segment 20 to be secured and/or sealed in the reusable test head 73 may be inserted (e.g., slid) into its annulus cavity 78 while one or more of its inflatable fastener mechanisms 80 is in the less than fully inflated state (process block 142). As described above, in some embodiments, a reusable test head 73 may include a spacer mechanism 116 implemented in its annulus cavity 78, for example, to facilitate reducing the likelihood that an end cap 92 of its shell 74 inadvertently impedes (e.g., blocks) a flow path between a testing port 82 on the shell 74 and a fluid conduit 24 implemented in an intermediate layer 34 of the pipe segment tubing 22. Thus, in such embodiments, inserting the pipe segment tubing 22 may include inserting the pipe segment tubing 22 into the annulus cavity 78 until the pipe segment tubing 22 abuts the spacer mechanism 116 (process block 146).

However, in other embodiments, the reusable test head 73 may not include a spacer mechanism 116 implemented in its annulus cavity 78. To facilitate preserving the flow path between a testing port 82 and a fluid conduit 24 implemented in the annulus 25 of pipe segment tubing 22, in such embodiments, inserting the pipe segment tubing 22 may include inserting the pipe segment tubing 22 into the annulus cavity 78 until the pipe segment tubing 22 abuts the end cap 92 of the reusable test head 73 and then withdrawing the pipe segment tubing 22 some distance (process block 148). In other words, in such embodiments, the pipe segment tubing 22 may be inserted into the annulus cavity 78 a first distance and then partially withdrawn from the annulus cavity 78 a second distance that is less than the first distance.

To facilitate sealing and/or securing pipe segment tubing 22 in the annulus cavity 78 of a reusable test head 73, in some embodiments, a testing device 40 in a testing system 38 may instruct the testing system 38 to increase inflation of one or more inflatable fastener mechanisms 80 implemented in the reusable test head 73 (process block 144). In other words, in such embodiments, the testing device 40 may instruct the testing system 38 to increase inflation of an inflatable fastener mechanism 80 in the reusable test head 73 from the less than fully inflated state to a more inflated state, for example, in addition to subsequently instructing the testing system 38 to maintain the inflatable fastener mechanism 80 in the more inflated state. In particular, to facilitate increasing to and/or maintaining the more inflated state, in some embodiments, the testing device 40 may selectively instruct an inflation fluid source 88 in the testing system 38 to inject inflation fluid into the inflatable bladder 104 of the inflatable fastener mechanism 80. In other embodiments, an operator (e.g., user) may manually control inflation of the inflatable fastener mechanism 80, for example, by selectively turning on an inflation fluid pump and/or adjusting valve position of a value fluidly coupled to the inflatable fastener mechanism 80.

Furthermore, in some embodiments, the more inflated state that is used to secure and/or seal the reusable test head 73 to the pipe segment tubing 22 may be a fully inflated state. However, in other embodiments, the more inflated state may nevertheless be a partially inflated state. In fact, in some embodiments, different inflation states may be used to secure a reusable test head 73 to different pipe segments 20, for example, to enable the reusable test head 73 to be used for testing multiple different types of pipe segments 20. Merely as an illustrative non-limiting example, the more inflated state may be a fully inflated state when the reusable test head 73 is secured to a pipe segment 20 with a thinner tubing 22 and a partially inflated state when the reusable test head 73 is secured to a pipe segment 20 with a thicker tubing 22.

Moreover, as described above, in some embodiments, pneumatically adjusting inflation of an inflatable fastener mechanism 80 implemented in a reusable test head 73 may enable actuation of a mechanical fastener mechanism— namely a pneumatically actuated mechanical fastener mechanism 126—implemented in the reusable test head 73. In other words, in such embodiments, increasing inflation of the inflatable fastener mechanism 80 may include pneumatically actuating the mechanical fastener mechanism (process block 150). Furthermore, as described above, in some embodiments, a reusable test head 73 may include one or more axial fastener mechanisms 127 in addition to an inflatable fastener mechanism 80. Thus, in such embodiments, deploying the reusable test head 73 may additionally include coupling one or more axial fastener mechanism 127 to pipe segment tubing (process block 151).

As described above, in some embodiments, an axial fastener mechanism 127 of a reusable test head 73 may include a tubing engaging component, such as a tubing engaging clamp 131, and a support arm 133. Additionally, as described above, a tubing engaging clamp 131 may be secured to the shell 74 of a reusable test head 73 via a corresponding support arm 133. Thus, in such embodiments, deploying an axial fastener mechanism 127 may including coupling its tubing engaging clamp 131 to a corresponding support arm 133 (process block 153). In particular, as described above, in some embodiments, a tubing engaging clamp 131 may be coupled to a support arm 133 at least in part by tightening a nut 135 on a threaded end of a bolt 137 that extends through an opening in a clamp flange 139 of the tubing engaging clamp 131 and an opening in the support arm 133.

However, it should again be appreciated that the depicted example is merely intended to be illustrative and not limiting. In particular, as in the depicted example, in some embodiments, a tubing engaging clamp 131 of a reusable test head 73 may be deployed and, thus, coupled to a corresponding support arm 133 after pipe segment tubing 22 has already been inserted into the annulus cavity 78 of the reusable test head 73. In other embodiments, a tubing engaging clamp 131 of a reusable test head 73 may be coupled to a corresponding support arm 133 before pipe segment tubing 22 has already been inserted into the annulus cavity 78 of the reusable test head 73. Thus, in such embodiments, inserting pipe segment tubing 22 into the annulus cavity 78 of a reusable test head 73 may include sliding (e.g., inserting) the pipe segment tubing 22 though the tubing engaging clamp 131 while the tubing engaging clamp 131 is in a loosened state.

Moreover, as described above, in some embodiments, a tubing engaging clamp 131 may resist movement of pipe segment tubing 22 when its inner surface 147 engages (e.g., contacts and/or squeezes) an outer surface of the pipe segment tubing 22. Thus, in such embodiments, deploying an axial fastener mechanism 127 may include tightening its tubing engaging clamp 131 around the pipe segment tubing 22 (process block 155). In other words, in such embodiments, a tubing engaging clamp 131 may be tightened around pipe segment tubing 22 at least in part by transitioning the tubing engaging clamp 131 from the loosened state to a tighter (e.g., tightened) state. In particular, as described above, in some embodiments, a tubing engaging clamp 131 may be transitioned to a tighter state at least in part by tightening a nut 135 on a threaded end of bolt 137 that expends through an opening in at least one clamp flange 139 of the tubing engaging clamp 131, for example, in addition to an opening in a corresponding support arm 133.

In this manner, one or more axial fastener mechanisms 127 of a reusable test head 73 may be deployed to facilitate securing pipe segment tubing 22 in an annulus cavity 78 of the reusable test head 73, for example, at least in part by increasing the resistance (e.g., force) the reusable test head 73 exerts against movement (e.g., axial movement) of the pipe segment tubing 22. In other words, in some embodiments, an axial fastener mechanism 127 of a reusable test head 73 may be deployed to supplement the security provided by one or more inflatable fastener mechanisms 80 of the reusable test head 73, for example, in addition to the security provided by one or more pneumatically actuated mechanical fastener mechanism 126 of the reusable test head 73. In any case, as described above, increasing inflation of an inflatable fastener mechanism 80 implemented in a reusable test head 73 may increase the resistance it exerts against movement in the annulus cavity 78 of the reusable test head 73 and, thus, deploying the reusable test head 73 in this manner may enable selectively securing the reusable test head 73 to pipe segment tubing 22 present in the annulus cavity 78.

Figure 25:
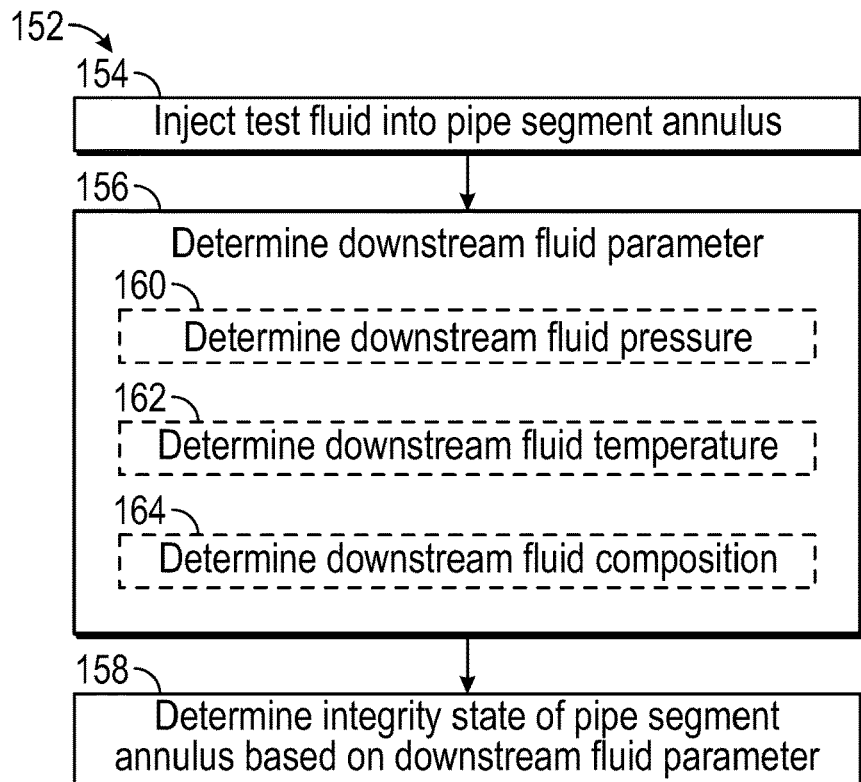
FIG. 25 is a flow diagram of an example of a process for testing integrity of a pipe segment, in accordance with an embodiment of the present disclosure.

Returning to the process 62 of FIG. 5, the testing system 38 may then perform a pipe segment integrity test on a pipe segment 20 secured to the test head 44 (e.g., reusable test head 73) (process block 66). To help illustrate, an example of a process 152 for testing pipe segment integrity is described in FIG. 25. Generally, the process 152 includes injecting test fluid into a pipe segment annulus (process block 154), determining a downstream fluid parameter (process block 156), and determining integrity state of the pipe segment annulus based on the downstream fluid parameter (process block 158).

Although described in a specific order, which corresponds with an embodiment of the present disclosure, it should be appreciated that the example process 152 is merely intended to be illustrative and non-limiting. In particular, in other embodiments, a process 152 for performing a pipe segment integrity test may include one or more additional process blocks and/or omit one or more of the depicted process blocks. Moreover, in some embodiments, the process 152 may be performed at least in part by executing instructions stored in a tangible, non-transitory, computer-readable medium, such as memory 52 in a testing device 40, using processing circuitry, such as a processor 50 in the testing device 40.

For example, in some such embodiments, a testing device 40 in a testing system 38 may instruct the testing system 38 to inject test fluid (e.g., gas and/or liquid) into the tubing annulus 25 of a pipe segment 20 that is secure to a test head 44 (e.g., reusable test head 73) in the testing system 38 (process block 154). As described above, in some embodiments, one or more fluid conduits 24 may be implemented in the annulus 25 (e.g., one or more intermediate layers 34) of pipe segment tubing 22. Additionally, as described above, a fluid conduit 24 implemented in the tubing annulus 25 may be fluidly coupled to a testing port 82 on the shell 74 of a reusable test head 73 when the pipe segment tubing 22 is present in the annulus cavity 78 of the reusable test head 73. Furthermore, as described above, in some embodiments, a testing port 82 on the shell 74 of a reusable test head 73 may be fluidly coupled to one or more test fluid sources 42. Thus, to inject test fluid into the tubing annulus 25, in such embodiments, the testing device 40 may selectively instruct a test fluid source 42 to supply (e.g., pump and/or flow) the test fluid to the testing port 82 implemented on the shell 74 of the reusable test head 73, for example, via one or more control signals 58. In other embodiments, an operator (e.g., user) may manually control injection of the test fluid, for example, by selectively turning on a test fluid pump and/or adjusting valve position of a value fluidly coupled to the testing port 82.

Moreover, as described above, in some embodiments, the test fluid may be an inert fluid, such as nitrogen (e.g., $N_2$) gas, for example, to facilitate reducing the likelihood that the test fluid itself affects (e.g., reduces) integrity of pipe segment tubing 22. In any case, as will be described in more detail below, in some embodiments, the integrity state of pipe segment tubing 22 may be determined based at least in part on one or more fluid parameters, such as temperature, pressure, and/or composition, of the test fluid. In some such embodiments, one or more fluid parameters of the test fluid may be pre-determined, for example, offline by a test lab and/or a fluid supplier and stored in memory 52 of the testing system 38. Additionally or alternatively, one or more fluid parameters of the test fluid may be determined while the test fluid is being supplied to a fluid conduit 24 implemented in an intermediate layer 34 of the pipe segment tubing 22, for example, online and/or in real-time via one or more sensors 43.

Furthermore, the testing system 38 may determine one or more downstream fluid parameters that result from injection of the test fluid into one or more fluid conduits 24 implemented the annulus 25 (e.g., one or more intermediate layers 34) of the pipe segment tubing 22 (process block 154). As described above, in some embodiments, the one or more downstream fluid parameters may include a downstream fluid pressure determined (e.g., measured and/or sensed) by a pressure sensor 43, a downstream fluid temperature determined by a temperature sensor 43, and/or a downstream fluid composition determined by a fluid composition sensor 43. Thus, in such embodiments, determining the one or more downstream fluid parameters may include determining a downstream fluid pressure (process block 160), determining a downstream fluid temperature (process block 162), determining a downstream fluid composition (process block 164), or any combination thereof, for example, based at least in part on corresponding sensor signals 56 received from one or more sensors 43.

The testing system 38 may then determine an integrity state of the pipe segment tubing 22 based at least in part on the one or more downstream fluid parameters (process block 158). As described above, the tubing 22 of a pipe segment 20 is generally implemented to facilitate isolating (e.g., insulating) conditions internal to the pipe segment 20 from environmental conditions external to the pipe segment 20. Generally, when a defect is not present on its tubing 22, one or more parameters (e.g., characteristics and/or properties) of fluid flowing through a pipe segment 20 may nevertheless change as it flows therethrough. However, a fluid parameter change resulting from fluid flow through a pipe segment 20 with a non-defective pipe segment tubing 22 is generally predictable, for example, based at least in part on a model, empirical testing, environmental conditions external to the pipe segment 20, fluid parameters of fluid input (e.g., supplied) to the pipe segment 20, implementation parameters, such as material and/or thickness, of the pipe segment tubing 22, or any combination thereof.

In other words, at least in some instances, an actual fluid parameter change that differs (e.g., deviates) from a corresponding expected (e.g., predicted) fluid parameter change may be indicative of a defect being present on pipe segment tubing 22. For example, an actual fluid pressure change (e.g., drop) that differs from an expected fluid pressure change may be indicative of fluid leaking from a fluid conduit 24 implemented in an intermediate layer 34 of the pipe segment tubing 22 and, thus, that the pipe segment tubing 22 is potentially defective. Additionally, an actual fluid temperature change (e.g., increase or decrease) that differs from an expected fluid temperature change may be indicative increased heat transfer between a fluid conduit 24 implemented in an intermediate layer 34 of the pipe segment tubing 22 and conditions external to the pipe segment tubing 22 and, thus, that the pipe segment tubing is potentially defective and/or that the external (e.g., environmental and/or bore) conditions will potentially shorten the lifespan of the pipe segment tubing 22. Furthermore, an actual fluid composition change that differs from an expected fluid composition change may be indicative of conditions external to the pipe segment tubing 22 contaminating the conditions in a fluid conduit 24 implemented in an intermediate layer 34 of the pipe segment tubing 22 and, thus, that the pipe segment tubing 22 is potentially defective.

To determine an actual fluid parameter change, the testing system 38 may compare a downstream fluid parameter with a corresponding fluid parameter of the test fluid. For example, the testing system 38 may determine an actual fluid pressure change at least in part by comparing the downstream fluid pressure with the fluid pressure of the test fluid. Additionally, the testing system 38 may determine an actual fluid temperature change at least in part by comparing the downstream fluid temperature with the fluid temperature of the test fluid. Furthermore, the testing system 38 may determine an actual fluid temperature change at least in part by comparing the downstream fluid temperature with the fluid temperature of the test fluid.

In some embodiments, the testing system 38 may identify that the integrity state of the pipe segment tubing 22 is a non-defective state when each of the actual fluid parameter changes does not differ from a corresponding expected fluid parameter change by more than an error threshold, for example, which accounts for sensor (e.g., measurement) error. On the other hand, the testing system 38 may identify that the integrity state of the pipe segment tubing 22 is a defective state when one or more of the actual fluid parameter changes differs from a corresponding expected (e.g., predicted) fluid parameter change, for example, by more than a corresponding error threshold. Moreover, when the integrity state is a defective state, in some embodiments, the testing system 38 may identify an expected type and/or an expected location of one or more defects on the pipe segment tubing 22, for example, based at least in part on where the downstream fluid parameters are sensed and/or how an actual fluid parameter change deviates from a corresponding expected fluid parameter change. In this manner, a testing system 38 may be operated to perform a cycle of a pipe segment integrity test.

Returning to the process 62 of FIG. 5, the testing system 38 may determine whether the pipe segment 20 being tested has passed the pipe segment integrity test (decision block 68). In particular, the testing system 38 may determine that the pipe segment 20 has passed when the pipe segment integrity test determines that the integrity state of its tubing 22 is a non-defective state. On the other hand, the testing system 38 may determine that the pipe segment 20 has not passed when the pipe segment integrity test determines that the integrity state of its tubing 22 is a defective state.

To facilitate improving operational efficiency and/or operational reliability of a pipeline system 10 in which the pipe segment 20 is or is to be deployed, when the pipe segment 20 has not passed the pipe segment integrity test, one or more defects on its tubing 22 may be fixed (e.g., ameliorated), for example, by a user (e.g., operator) of the testing system 38 (process block 72). To facilitate communicating results of the pipe segment integrity test, in some embodiments, the testing system 38 may instruct an I/O device 54—namely an electronic display—to display a graphical user interface (GUI) that provides a visual representation of the pipe segment integrity test results. For example, the graphical user interface may include a visual representation of the integrity state of the pipe segment tubing 22, an expected type of defect present on the pipe segment tubing 22, and/or an expected location of a defect on the pipe segment tubing 22. In fact, in some embodiments, another cycle of the pipe segment integrity test may be performed on the pipe segment 20 once a defect in its tubing 22 is believed to have been fixed (arrow 166)

On the other hand, when the pipe segment 20 has passed the pipe segment integrity test, the test head 44 may be removed from the pipe segment 20 (process block 70). As described above, in some embodiments, a test head 44 (e.g., reusable test head 73) may include at least one inflatable fastener mechanism 80. In particular, as described above, in such embodiments, a pipe segment 20 may be sealed and/or secured in the reusable test head 73 while the inflatable fastener mechanism 80 is in a more inflated state. On the other hand, as described above, the inflatable fastener mechanism 80 may allow for more movement in the annulus cavity of the reusable test head 73 while in a less inflated state. Thus, in such embodiments, the reusable test head 73 may be removed from the pipe segment 20 while the inflatable fastener mechanism 80 is in the less inflated state.

Figure 26:
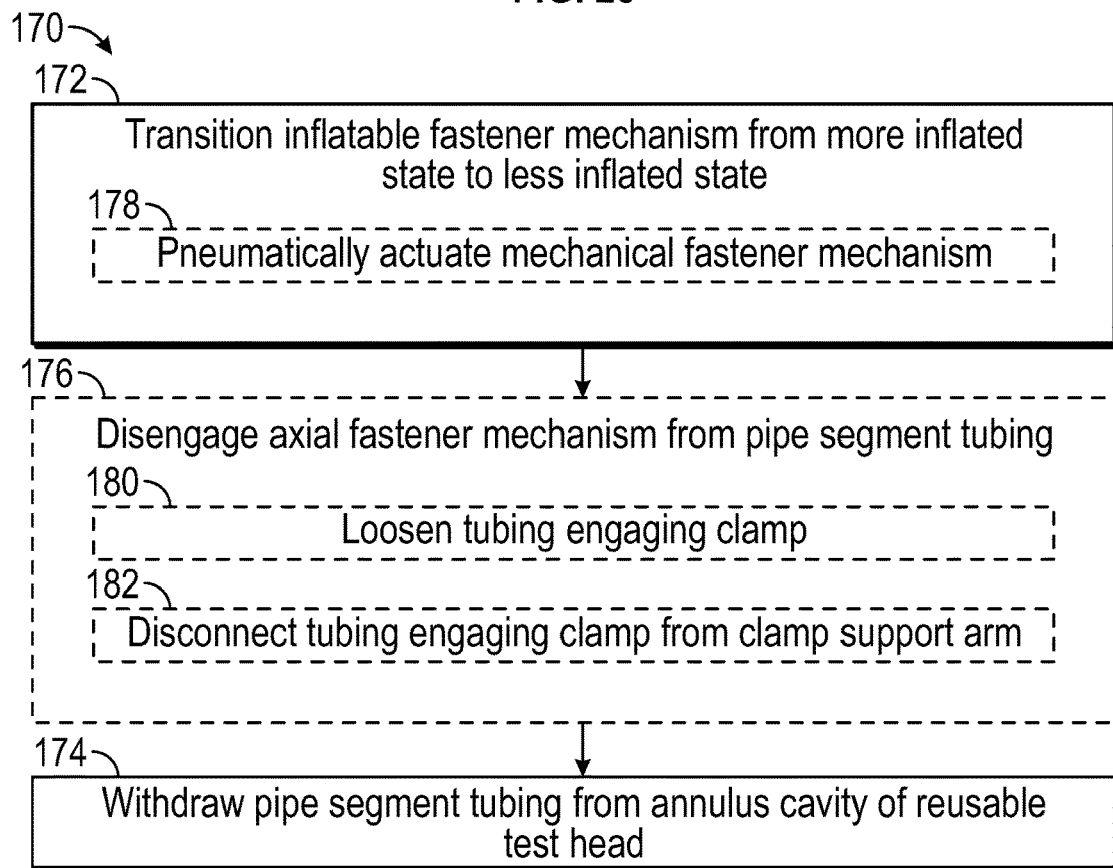
FIG. 26 is a flow diagram of an example process for removing the reusable test head of FIG. 6 from a pipe segment, in accordance with an embodiment of the present disclosure.

To help further illustrate, an example of a process 170 for selectively removing a reusable test head 73 from a pipe segment 20 is described in FIG. 26. Generally, the process 170 includes transitioning an inflatable fastener mechanism of a reusable test head from a more inflated state to a less inflated state (process block 172). Additionally, the process 170 includes withdrawing pipe segment tubing from an annulus cavity of the reusable test head (process block 174).

Although described in a specific order, which corresponds with an embodiment of the present disclosure, it should be appreciated that the example process 170 is merely intended to be illustrative and non-limiting. In particular, in other embodiments, a process 170 for selectively removing a reusable test head 73 from a pipe segment 20 may include one or more additional process blocks and/or omit one or more of the depicted process blocks. For example, some embodiment of the process 170 may additionally include disengaging an axial fastener mechanism from pipe segment tubing (process block 176) while other embodiments of the process 170 do not. Moreover, in some embodiments, the process 170 may be performed at least in part by executing instructions stored in a tangible, non-transitory, computer-readable medium, such as memory 52 in a testing device 40, using processing circuitry, such as a processor 50 in the testing device 40.

For example, in some such embodiments, a testing device 40 in a testing system 38 may instruct the testing system 38 to transition an inflatable fastener mechanism (e.g., bladder) 80 of a reusable test head 73 from a more inflated state to a less inflated state (process block 172). As described above, in some embodiments, an inflatable fastener mechanism 80 may include an inflatable bladder 104 that is fluidly coupled to an inflation port 86 on a reusable test head shell 74 and/or an inflation fluid conduit 90 that extends through the inflation port 86. Additionally, as described above, in some embodiments, an inflation port 86 on a reusable test head shell 74 and/or an inflation fluid conduit 90 that extends therethrough may be fluidly coupled to one or more inflation fluid sources 88.

Thus, to facilitate transitioning an inflatable fastener mechanism 80 to a less inflated state, in such embodiments, a testing device 40 may selectively instruct an inflation fluid source 88 in the testing system 38 extract inflation fluid out from the inflatable bladder 104 of the inflatable fastener mechanism 80. Additionally or alternatively, the testing device 40 may selectively instruct the testing system 38 to release inflation fluid from the inflatable bladder 104, for example, into its external environment. In other embodiments, an operator (e.g., user) may manually control inflation of an inflatable fastener mechanism 80, for example, by selectively turning on an inflation fluid pump and/or adjusting valve position of a value fluidly coupled to the inflatable fastener mechanism 80.

Furthermore, in some embodiments, the less inflated state of the inflatable fastener mechanism 80 may be a fully deflated state. In other embodiments, the less inflated state of the inflatable fastener mechanism 80 may be a partially inflated state. In any case, as described above, the size of the inflatable bladder 104 of an inflatable fastener mechanism 80 and, thus, the force it exerts on its surroundings generally varies with its inflation state. In other words, an inflatable fastener mechanism 80 in the reusable test head 73 may exert more resistance against movement in the annulus cavity 78 while in a more (e.g., fully) inflated state and less resistance against movement in the annulus cavity 78 while in a less inflated state. As such, the tubing 22 of a pipe segment 20 may be removed (e.g., withdrawn and/or slid out) from the annulus cavity 78 of the reusable test head 73 while one or more of its inflatable fastener mechanisms 80 is in the less inflated state (process block 174).

As described above, in some embodiments, pneumatically adjusting inflation of an inflatable fastener mechanism 80 implemented in a reusable test head 73 may enable actuation of a mechanical fastener mechanism—namely a pneumatically actuated mechanical fastener mechanism 126—implemented in the reusable test head 73. In other words, in such embodiments, decreasing inflation of the inflatable fastener mechanism 80 may include pneumatically actuating the mechanical fastener mechanism (process block 178). Furthermore, as described above, in some embodiments, a reusable test head 73 may additionally be secured to pipe segment tubing 22 via engagement of one or more of its axial fastener mechanisms 127 with an outer surface of the pipe segment tubing 22. Thus, in such embodiments, selectively removing the reusable test head 73 from the pipe segment tubing 22 may additionally include disengaging one or more axial fastener mechanisms 127 from the pipe segment tubing 22 (process block 176).

As described above, in some embodiments, an axial fastener mechanism 127 of a reusable test head 73 may include a tubing engaging component, such as a tubing engaging clamp 131, and a support arm 133. Additionally, as described above, in some embodiments, a tubing engaging clamp 131 may resist movement of pipe segment tubing 22 when compressed (e.g., tightened) such that its inner surface 147 engages (e.g., contacts and/or squeezes) an outer surface of the pipe segment tubing 22. Thus, in such embodiments, disengaging an axial fastener mechanism 127 of a reusable test head 73 may include loosening its tubing engaging clamp 131 from around the pipe segment tubing 22 (process block 180). In other words, in such embodiments, a tubing engaging clamp 131 may be loosed from around the pipe segment tubing 22 at least in part by transitioning the tubing engaging clamp 131 from a tightened state to a looser (e.g., loosened) state. In particular, as described above, in some embodiments, a tubing engaging clamp 131 may be transitioned to a looser state at least in part by loosening a nut 135 on a threaded end of bolt 137 that extends through an opening in at least one clamp flange 139 of the tubing engaging clamp 131, for example, in addition to an opening in a corresponding support arm 133.

Moreover, as described above, in some embodiments, a tubing engaging clamp 131 may be secured to the shell 74 of a reusable test head 73 via a corresponding support arm 133. Thus, in such embodiments, disengaging an axial fastener mechanism 127 may include disconnecting (e.g., removing) its tubing engaging clamp 131 from a corresponding support arm 133 (process block 182). In particular, as described above, in some embodiments, a tubing engaging clamp 131 may be coupled to a support arm 133 via a nut 135 tightened on a threaded end of a bolt 137 that extends through an opening in a clamp flange 139 of the tubing engaging clamp 131 and an opening in the support arm 133. Thus, in such embodiments, the tubing engaging clamp 131 may be disconnected from the support arm 133 at least in part by removing the nut 135 from the threaded end of the bolt 137.

In this manner, a reusable test head 73 may be selectively removed from a pipe segment 20. In fact, returning to the process 62 of FIG. 5, in some embodiments, the reusable test head 73 may then be used to test the integrity of another pipe segment 20 and, thus, secured to the tubing 22 of the other pipe segment 20, for example, in accordance with the process 138 of FIG. 24 (arrow 168). Thus, at least in some instances, implementing and/or operating a (e.g., reusable) test head in accordance with the techniques described in the present disclosure may facilitate improving testing efficiency of a pipeline system, for example, by obviating the use of a new (e.g., different) test head for testing each pipe segment deployed or to be deployed in the pipeline system.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A test head comprising:
a shell that defines an annulus cavity in which an open end of pipe segment tubing is to be secured and sealed, wherein the shell comprises a testing port configured to enable fluid flow into the annulus cavity;
an inflatable fastener mechanism implemented in or adjacent to the annulus cavity, wherein:
the inflatable fastener mechanism is configured to be maintained in a less inflated state to enable the open end of the pipe segment tubing to be inserted into the annulus cavity, withdrawn from the annulus cavity, or both; and
the inflatable fastener mechanism is configured to be inflated from the less inflated state to a more inflated state while the open end of the pipe segment tubing is present in the annulus cavity to facilitate securing and sealing the open end of the pipe segment in the test head to enable integrity of the pipe segment tubing to be tested at least in part by flowing a test fluid into a fluid conduit implemented in an annulus of the pipe segment tubing via the testing port on the shell of the test head; and
another inflatable fastener implemented in or adjacent the annulus cavity, wherein:
the other inflatable fastener mechanism is configured to be maintained in another less inflated state to enable the open end of the pipe segment tubing to be inserted into the annulus cavity, withdrawn from the annulus cavity, or both; and
the other inflatable fastener mechanism is configured to be inflated from the other less inflated state to another more inflated state while the open end of the pipe segment tubing is present in the annulus cavity to facilitate securing and sealing the open end of the pipe segment in the test head to enable the integrity of the pipe segment tubing to be tested at least in part by flowing the test fluid into the fluid conduit implemented in the tubing annulus of the pipe segment tubing via the testing port on the shell of the test head.

2. The test head of claim 1, wherein:
the inflatable fastener mechanism of the test head comprises a first inflatable bladder; and
the other inflatable fastener mechanism of the test head comprises a second inflatable bladder that opposes the first inflatable bladder of the inflatable fastener mechanism.

3. The test head of claim 1, wherein the inflatable fastener mechanism is secured to the shell of the test head such that an inflatable bladder of the inflatable fastener mechanism is suspended within the annulus cavity of the test head.

4. The test head of claim 1, wherein, after integrity of the pipe segment tubing has been tested, the inflatable fastener mechanism is configured to be deflated from the more inflated state to the less inflated state to enable the test head to be removed from the open end of the pipe segment tubing.

5. The test head of claim 1, wherein the test head comprises a tubing engaging clamp, wherein:
the tubing engaging clamp is secured to the shell of the test head via a clamp support arm; and
the tubing engaging clamp is configured to be tightened around an outer surface of the pipe segment tubing to facilitate securing the open end of the pipe segment tubing in the annulus cavity of the test head.

6. A test head comprising:
a shell tube configured to be disposed around pipe segment tubing;
an end cap secured to the shell tube to define an annulus cavity in which an open end of the pipe segment tubing is to be secured and sealed;
an inflatable bladder configured to be selectively inflated to facilitate securing and sealing the open end of the pipe segment tubing in the annulus cavity of the test head; and
an inflation fluid conduit that is fluidly coupled to the inflatable bladder, wherein the inflation fluid conduit is secured to the end cap such that the inflatable bladder is suspended within the annulus cavity of the test head via the inflation fluid conduit and
a testing port configured to enable integrity of the pipe segment tubing to be tested at least in part by flowing a test fluid into a fluid conduit in an annulus of the pipe segment tubing while the inflatable bladder is inflated to facilitate securing and sealing the open end of the pipe segment in the annulus cavity of the test head.

7. The test head of claim 6, comprising another inflatable bladder secured along an inner surface of the shell tube, wherein the other inflatable bladder is configured to be selectively inflated to facilitate securing and sealing the open end of the pipe segment tubing in the annulus cavity of the test head.

8. The test head of claim 6, comprising a tubing engaging clamp, wherein:
the tubing engaging clamp is secured to the shell tube of the test head via a clamp support arm; and
the tubing engaging clamp is configured to be tightened around an outer surface of the pipe segment tubing to facilitate securing the open end of the pipe segment tubing in the annulus cavity of the test head.

9. The test head of claim 6, wherein the inflatable bladder has a cylindrical shape.

10. The test head of claim 6, comprising an inflation fluid port that opens through the end cap, wherein the inflation fluid conduit fluidly couples the inflation fluid port to the inflatable bladder.

11. A test head comprising:
a shell tube configured to be disposed around pipe segment tubing;
an end cap secured to the shell tube to define an annulus cavity in which an open end of the pipe segment tubing is to be secured and sealed;
an inflatable bladder configured to be selectively inflated to facilitate securing and sealing the open end of the pipe segment tubing in the annulus cavity of the test head; and
an inflation fluid conduit that is fluidly coupled to the inflatable bladder, wherein the inflation fluid conduit is secured to the end cap such that the inflatable bladder is suspended within the annulus cavity of the test head via the inflation fluid conduit; and
another inflatable bladder secured along an inner surface of the shell tube, wherein the other inflatable bladder is configured to be selectively inflated to facilitate securing and sealing the open end of the pipe segment tubing in the annulus cavity of the test head.

12. The test head of claim 11, comprising an inflation fluid port that opens through the end cap, wherein the inflation fluid conduit fluidly couples the inflation fluid port to the inflatable bladder.

13. The test head of claim 11, wherein the inflatable bladder has a cylindrical shape.

14. The test head of claim 11, comprising a tubing engaging clamp, wherein:
- the tubing engaging clamp is secured to the shell tube of the test head via a clamp support arm; and
- the tubing engaging clamp is configured to be tightened around an outer surface of the pipe segment tubing to facilitate securing the open end of the pipe segment tubing in the annulus cavity of the test head.

\* \* \* \* \*